(12) United States Patent
Mount et al.

(10) Patent No.: US 11,017,611 B1
(45) Date of Patent: May 25, 2021

(54) GENERATION AND MODIFICATION OF ROOMS IN VIRTUAL REALITY ENVIRONMENTS

(71) Applicant: Amazon Technologies, Inc., Seattle, WA (US)

(72) Inventors: Brian James Mount, Seattle, WA (US); Lee David Thompson, Normandy Park, WA (US); Dillon Taylor Baker, Seattle, WA (US); Joonhao Chuah, Seattle, WA (US); Hai Quang Kim, Bellevue, WA (US); Michael Thomas, Seattle, WA (US); Kristian Kane, Seattle, WA (US); Jesse Alan DuPree, Fall City, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/773,445

(22) Filed: Jan. 27, 2020

(51) Int. Cl.
*G06T 19/20* (2011.01)
*G06Q 30/06* (2012.01)
*G06K 9/00* (2006.01)

(52) U.S. Cl.
CPC .......... *G06T 19/20* (2013.01); *G06K 9/00671* (2013.01); *G06Q 30/0643* (2013.01)

(58) Field of Classification Search
CPC ............... G06T 19/20; G06T 2219/012; G06T 2219/2012
USPC .......................................................... 345/420
See application file for complete search history.

(56) References Cited

U.S. PATENT DOCUMENTS

| | | | |
|---|---|---|---|
| 9,965,800 B1 | 5/2018 | Pitstick et al. | |
| 10,417,684 B2 * | 9/2019 | Pearce | G06Q 30/0643 |
| 10,706,457 B2 * | 7/2020 | Damy | G06Q 30/0621 |
| 2017/0132694 A1 * | 5/2017 | Damy | G06F 3/04842 |
| 2018/0060933 A1 * | 3/2018 | Pearce | G06Q 30/0643 |
| 2019/0243809 A1 * | 8/2019 | Shtaygrud | G06F 9/451 |

* cited by examiner

Primary Examiner — Thomas J Lett
(74) Attorney, Agent, or Firm — Athorus, PLLC

(57) ABSTRACT

Systems and methods related to generating and modifying a room or space within a virtual reality environment may comprise addition, removal, placement, modification, and/or resizing of a plurality of environment surfaces, such as a floor, walls, and ceiling, and/or a plurality of fixtures, such as doors, windows, or openings, associated with the environment surfaces, in which each environment surface and fixture includes associated dimensions. The environment surfaces and fixtures may be added, removed, placed, moved, and/or resized by a user. During such interactions, only a subset of dimensions relevant to the current functions or operations by the user may be presented to facilitate such functions or operations. Further, various aspects associated with environment surfaces and fixtures may be modified, such as paints, colors, materials, textures, or others.

20 Claims, 24 Drawing Sheets

GENERATION AND MODIFICATION OF ROOMS IN VIRTUAL REALITY ENVIRONMENTS

BACKGROUND

Virtual reality devices such as headsets with corresponding controllers are increasing in use. Generally, virtual reality devices may allow users to be completely immersed in digital environments, such as video games or other virtual reality environments. However, conventional, text-based menus, associated menu structures, and text-based user interfaces may be difficult, cumbersome, and unnatural to use in such immersive digital environments, and may also reduce the desired immersive effect when using virtual reality devices. Accordingly, there is a need for virtual reality user interfaces that facilitate simple and intuitive interactions by users with objects or other aspects of the digital environments.

DETAILED DESCRIPTION

Figure 1:
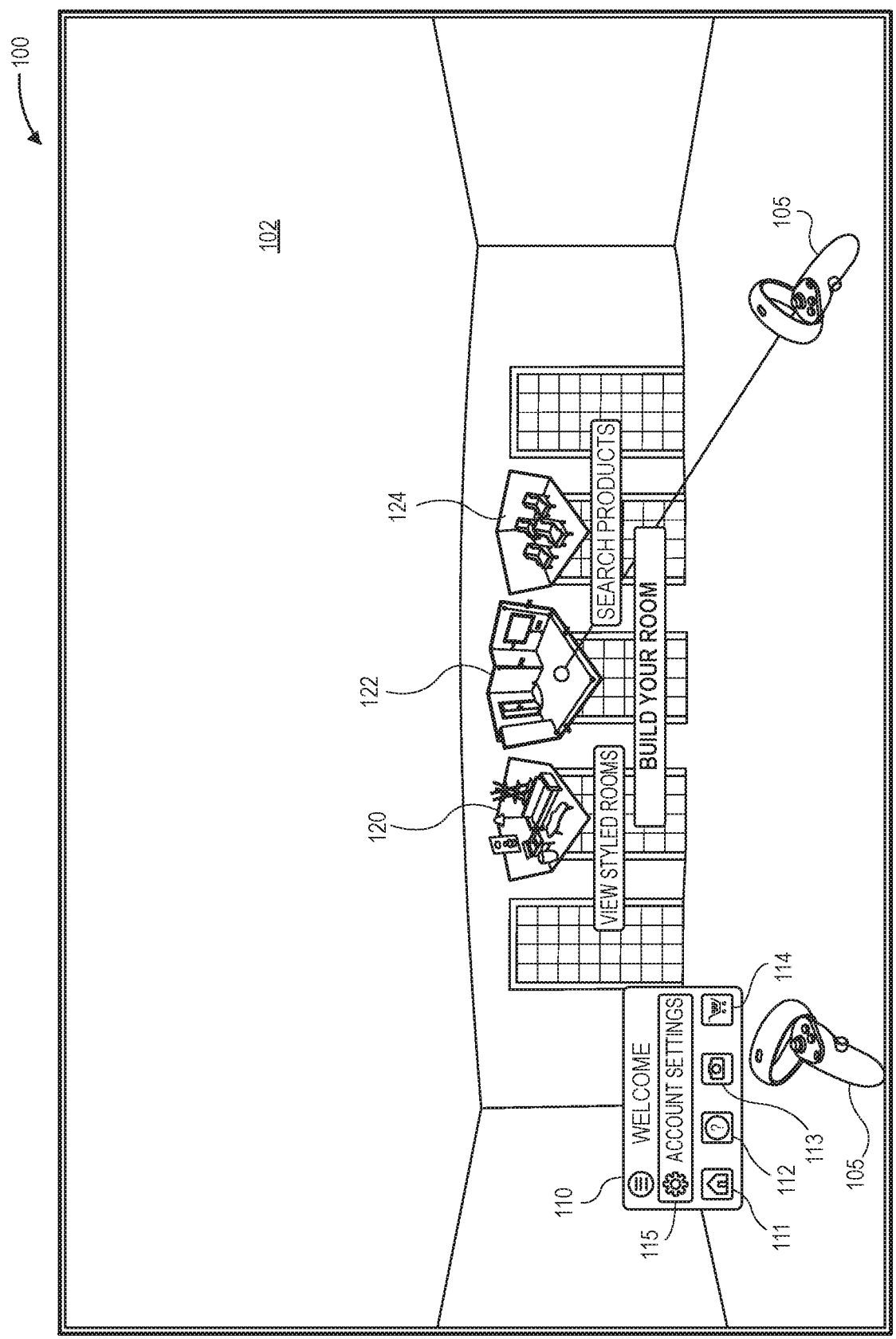
FIG. 1 is a schematic diagram of an example virtual reality environment, in accordance with implementations of the present disclosure.

As is set forth in greater detail below, implementations of the present disclosure are directed to systems and methods related to generating and modifying rooms or spaces within virtual reality, augmented reality, mixed reality, and/or extended reality environments. In addition, implementations of the present disclosure are directed to systems and methods related to dimensional filters presented within virtual reality, augmented reality, mixed reality, and/or extended reality environments that may be used to filter, suggest, and/or recommend products or objects for presentation within the environments.

In example embodiments, a user may generate a room or space within an extended reality environment that includes a plurality of surfaces, such as a floor, a plurality of walls, and a ceiling, e.g., based on one or more templates of types, styles, and/or layouts of rooms. The generated room may be presented with a plurality of dimensions associated with the floor, the plurality of walls, and/or the ceiling, such as lengths and widths of portions of the floor, widths and heights of respective walls, and/or lengths, widths, and heights of portions of the ceiling.

Further, a user may modify a room or space within an extended reality environment by moving one or more walls or the ceiling, e.g., using grab points associated with respective walls or portions of the ceiling. Upon selecting a grab point associated with a wall, the wall may be moved relative to other walls of the room, e.g., in a direction toward or away from an opposing wall. Likewise, upon selecting a grab point associated with a portion of the ceiling, the ceiling may be moved relative to the floor of the room, e.g., in a direction toward or away from the floor. Moreover, upon selecting a grab point, one or more dimensions related to movement of the selected surface may be presented, and various other dimensions that are not related to movement of the selected surface may no longer be presented. In this manner, information that may be relevant to movement of the selected surface may be presented, while other information may be temporarily removed from presentation to facilitate the user interaction. Further, the use of grab points may facilitate simple, intuitive, and immersive movement and modification of three-dimensional rooms or spaces substantially in real-time within extended reality environments, in contrast to conventional methods of environment generation and modification that may require multiple iterations of numerical or textual input, e.g., via text-based menus, of particular dimensions or aspects of a room or space and subsequent compilation or generation of three-dimensional rooms or spaces based on the numerical or textual input.

In addition, various types of fixtures may be placed, moved, and resized in association with the floor, the plurality of walls, and/or the ceiling within the extended reality environment. For example, a fixture may be presented with a plurality of dimensions associated with distances between the fixture and portions of the floor, the plurality of walls, or the ceiling. The various types of fixtures may include doors, windows, baseboards, fireplaces, cased openings, stairs, columns, islands, countertops, shelves, built-in storage, ceiling rafters, vaulted ceilings, crown moldings, electrical outlets, switches, appliances, lighting, vents, radiators, or other fixtures that may be associated with one or more surfaces of a room within the extended reality environment.

Further, a user may move a fixture within an extended reality environment, e.g., by selecting and moving the fixture, and/or a user may resize a fixture by modifying one or more portions of the fixture, e.g., using grab points associated with respective portions of the fixture. Upon selecting the fixture, the fixture may be moved relative to portions of the floor, the plurality of walls, or the ceiling, thereby modifying distances between the fixture and portions of the floor, the plurality of walls, or the ceiling. In addition, upon selecting a grab point associated with a portion of a fixture, the portion of the fixture may be resized, e.g., by increasing or decreasing one or more dimensions of the fixture. Moreover, upon selecting a grab point, one or more dimensions related to resizing of the portion of the fixture may be presented, and one or more dimensions related to distances between the portion of the fixture and portions of the floor, the plurality of walls, or the ceiling may be presented, whereas various other dimensions that are not related to resizing of the portion of the fixture may no longer be presented. In this manner, information that may be relevant to resizing of the portion of the fixture may be presented, while other information may be temporarily removed from presentation to facilitate the user interaction. Further, the use of grab points may facilitate simple, intuitive, and immersive movement and modification of fixtures substantially in real-time within three-dimensional rooms or spaces within extended reality environments, in contrast to conventional methods of fixture generation and modification that may require multiple iterations of numerical or textual input, e.g., via text-based menus, of particular dimensions or aspects of fixtures and subsequent compilation or generation of fixtures within three-dimensional rooms or spaces based on the numerical or textual input.

Furthermore, one or more aspects associated with the room or space presented within the extended reality environment may be modified. For example, paints, colors, materials, textures, or other aspects of the floor, the plurality of walls, or the ceiling may be modified. In addition, outdoor scenes or environments presented outside the room or space may also be modified, e.g., to show a suburban scene, an urban scene, or other outdoor scene or environment.

In further example embodiments, a user may filter products or objects for presentation within a room or space within an extended reality environment based on one or more selected dimensional filters. For example, a user may select one or more dimensions associated with a selected dimensional filter, e.g., by selection of one or more points, lines, edges, or surfaces within an extended reality environment, such that data associated with the selected dimensional filter may comprise a single dimension, e.g., a length, width, or other one-dimensional data, two dimensions, e.g., a two-dimensional area, and/or three dimensions, e.g., a three-dimensional volume. The selected dimensional filter may comprise a line, circle, oval, triangle, rectangle, cylinder, triangular prism, rectangular prism, or other two-dimensional or three-dimensional shapes. In other embodiments, the selected dimensional filter may comprise a three-dimensional model associated with a selected type or category of objects, in which one or more dimensions of the three-dimensional model may be modified by a user.

Based on the selected dimensional filter having one or more associated dimensions, a plurality of objects having dimensional data that matches the selected dimensional filter may be presented to the user for browsing and evaluation. In addition, the plurality of objects having dimensional data that matches the selected dimensional filter may be further selected based on various additional data. For example, the plurality of objects may be selected based on a selected type, category, or subcategory of objects, based on dimensions, type, or style of a room in which the selected dimensional filter is determined, based on a surface on which the selected dimensional filter is determined, based on data or measurements associated with a body of a user, and/or based on various other additional data associated with objects and/or the extended reality environment. Further, responsive to selection of an object from among the plurality of objects that matches the selected dimensional filter, the selected object may be placed and presented within the selected dimensional filter within the extended reality environment.

In example embodiments, the plurality of objects that may be presented based on a selected dimensional filter may comprise two-dimensional images or three-dimensional models of objects, and the plurality of objects may comprise furniture, tables, chairs, lamps, rugs, sofas, artwork, mirrors, appliances, lights, chandeliers, or other furnishings. In further example embodiments, the plurality of objects may comprise various other types of products or items, including but not limited to apparel, books, electronics, luggage, jewelry, consumer goods, food, beverages, vehicles, equipment, or various other types of products or items. Further, the plurality of objects may also be defined with various aspects or attributes. For example, the aspects or attributes may include a type, category, size, shape, dimensions, mass, weight, volume, color, texture, pattern, material, price, rating, availability, purchase options, other menu options, or other attributes of an object. In addition, the aspects or attributes may include a bounding box or volume that substantially surrounds an outer periphery of an object. The bounding box or volume may include a rectangular prism, a cylindrical prism, a sphere, other polygonal volume, or other irregularly shaped volume.

Using the systems and methods described herein, users may be able to generate and modify rooms or spaces in extended reality environments, e.g., to match their own rooms or spaces and/or to create desired rooms or spaces. In addition, using the systems and methods described herein, users may be able to filter, search, browse, view, select, place, move, remove, modify, save, evaluate, compare, purchase, or otherwise manipulate various products or objects based on selected dimensional filter data that is presented within extended reality environments in a simple, intuitive, and immersive manner.

As one skilled in the art will appreciate in light of this disclosure, certain embodiments may be capable of achieving certain advantages, including some or all of the following: improving and simplifying virtual reality experiences by intuitively and efficiently facilitating generation and modification of rooms or spaces within virtual reality environments, intuitively, efficiently, and dynamically presenting information associated with generated or modified rooms to facilitate user interactions, intuitively and efficiently facilitating modification of various aspects of rooms or spaces within virtual reality environments, improving and simplifying virtual reality experiences by intuitively and efficiently facilitating placement, movement, and resizing of fixtures within rooms or spaces within virtual reality environments, intuitively, efficiently, and dynamically presenting information associated with modified or resized fixtures to facilitate user interactions, improving and simplifying virtual reality experiences by intuitively and efficiently presenting and determining dimensional filters via which to present a relevant plurality of objects for placement within virtual reality environments, intuitively and efficiently filtering, suggesting, or recommending a plurality of products to users based on various additional data associated with virtual reality objects and/or environments, improving and simplifying virtual reality experiences by enabling simple and intuitive filtering, searching, browsing, viewing, selection, placement, movement, removal, modification, saving, evaluation, comparison, sharing, purchasing, and other manipulations associated with objects based on dimensional filters that are presented within virtual reality environments, etc.

The task of navigating a large electronic catalog of objects or items (e.g., a catalog with millions or billions of items) to locate objects or items of interest can be burdensome and time consuming for users, especially if the users do not know the names or generic descriptors of the desired items. Typically, the user can locate items by navigating a text-based, browse structure, commonly called a "browse tree," in which the items are arranged by category and subcategory. Typically, however, the browse tree includes several levels of categories, requiring the user to navigate through several levels of browse nodes or category pages to arrive at the subcategory of interest. Further, in many cases, the objects or items of interest are not accurately or intuitively categorized, requiring the user to perform additional navigation or keyword searching. Thus, the user frequently has to perform numerous navigational steps to arrive at the catalog page or "item detail page" of interest. When the user arrives at the catalog page or "item detail page" of interest, the user may then need to perform additional navigational steps or perform additional searches to identify whether the desired item includes the desired features. For example, the user may need to click on and navigate to various product images to see what the product looks like from various angles. By way of another example, the user may need to scroll through numerous community provided content to see if the item is appropriate for a given environment (e.g., scrolling through hundreds of images from other users to see how the item looks in their environment—such as how a chair looks in combination with other furniture and carpets). By way of still another example, the user may need to sift through hundreds or thousands of customer reviews and questions/answers to determine if the item includes desired features and compatibility characteristics.

Another technological advance of the present disclosure is that the generation and modification of rooms or spaces in combination with selected dimensional filters presented and determined within such rooms or spaces allows users to identify objects or items of interest with fewer clicks, scrolls, and/or page navigations than would otherwise be required to identify, view, and evaluate items. For example, in the embodiments described herein, based on rooms and selected dimensional filters generated by a user, a plurality of objects having dimensional data that matches the selected dimensional filters may be presented via visual and intuitive user interfaces, such that the user can easily browse the plurality of objects, evaluate or compare the plurality of objects, view additional details of various objects, and/or select, place, modify, and/or remove objects within selected dimensional filters of the virtual reality environments.

Furthermore, with respect to individual presented items, a reference or link may be included or embedded that allows the user to navigate directly to sources of additional information about the item or another item (e.g., other items that include different color, size, or other options for a presented item, other items that are similar, related, popular, or recommended with respect to a presented item). Each reference or link thus serves as a programmatically selected navigational shortcut to an item detail page or description or to other item detail pages and associated details, allowing the user to bypass the navigational structure of the browse tree. Beneficially, programmatically identifying items of interest and presenting the user with navigational shortcuts to these items can improve the speed of the user's navigation through the electronic catalog, rather than requiring the user to page through multiple other pages to locate the recommended items via the browse tree or via searching. This can be particularly true for computing devices with small screens, where fewer items can be displayed to the user at a time and thus navigation of larger volumes of items is more difficult, as well as for virtual reality computing devices with potentially limited textual input methods, where the input of names, categories, keywords, or other search terms may be more difficult and thus identification of items of interest from larger volumes of items is more difficult using conventional, text-based methods.

FIG. 1 is a schematic diagram 100 of an example virtual reality environment, in accordance with implementations of the present disclosure.

As shown in FIG. 1, an example virtual reality environment 102 may be presented as including a plurality of environment surfaces, such as one or more floor or lower surfaces, one or more wall or dividing surfaces, one or more ceiling or upper surfaces, and/or one or more other environment surfaces that may define boundaries of a three-dimensional room or space. Further, the various environment surfaces may be presented as including one or more fixtures, such as doors, windows, baseboards, fireplaces, cased openings, or other fixtures.

In example embodiments, virtual reality environments including various aspects, objects, and/or items may be viewed or experienced by one or more users. For example, a user may view or experience a virtual reality environment using a headset, goggles, or other wearable computing device that visually presents the virtual reality environment via one or more display devices or presentation devices. In addition, a user may receive audio sounds, alerts, notifications, and/or feedback via one or more speakers or audio output devices related to portions of the experience within the virtual reality environment. Further, a user may provide speech, audio input, and/or feedback via one or more microphones or audio input devices related to portions of the experience within the virtual reality environment. The audio input may include audio or voice commands, instructions, or directions to control portions of the experience, and/or the audio input may include speech or conversations between multiple users of the virtual reality environment. Moreover, a user may interact with or manipulate one or more selectable objects or other aspects of the virtual reality environment using one or more controllers, joysticks, or other input/output devices related to portions of the experience within the virtual reality environment. The inputs may include commands, instructions, or directions related to searching, browsing, viewing, selecting, placing, moving, removing, modifying, saving, evaluating, comparing, purchasing, and/or other interactions or inputs related to one or more selectable objects or other aspects of the virtual reality environment. Furthermore, one or more input/output devices, including a headset, goggles, other wearable computing device, controllers, joysticks, or other input/output devices, may provide haptic or tactile outputs and/or feedback related to portions of the experience within the virtual reality environment. The outputs may include alerts, notifications, and/or feedback related to confirmation or completion of one or more actions, errors or alerts related to one or more actions, manipulation or modification of one or more selectable objects, movement or actions of one or more users, or various other feedback related to interactions within the virtual reality environment.

An example virtual reality environment may include a plurality of environment surfaces. For example, the environment surfaces may include one or more floor or lower surfaces, one or more wall or dividing surfaces, one or more ceiling or upper surfaces, and/or other environment surfaces that may define boundaries of a three-dimensional room or space. The wall or dividing surfaces may extend between one or more floor or lower surfaces and one or more ceiling or upper surfaces. In addition, the floor or lower surfaces may extend substantially horizontally within the environment, the ceiling or upper surfaces may extend substantially horizontally within the environment, the wall or dividing surfaces may extend substantially vertically within the environment between the lower and upper surfaces or at other angles relative to the lower and upper surfaces, and the wall or dividing surfaces may be angled relative to each other. Each environment surface may have various associated aspects or attributes, such as size, shape, position, orientation, dimensions, color, texture, pattern, material, or other attributes. In addition, one or more of the aspects or attributes of an environment surface may be selected, modified, or otherwise manipulated. For example, color, texture, or pattern of an environment surface, such as paint color, wallpaper texture, or other pattern on a wall surface, may be modified. Further, color, texture, pattern, or material of an environment surface, such as vinyl, hardwood, or carpet on a floor surface, may be modified.

In example embodiments, a virtual reality environment, such as an outdoor space, deck, porch, patio, or other partially unbounded space, may include one or more environment surfaces that represent boundaries of the space that are not necessarily wall or ceiling surfaces. Such boundaries may be substantially transparent or translucent, and/or may be visible or highlighted upon user interaction or proximity to the boundaries. In addition, the boundaries may also include various associated aspects or attributes, such as size, shape, position, orientation, dimensions, color, texture, pattern, material, or other attributes. In some example embodiments, the color, texture, or pattern of a boundary may include an image or rendering of surroundings, such as an outdoor space, backyard, neighborhood, street, or other images.

In addition, a virtual reality environment may also include one or more three-dimensional objects or models, which may also be described simply as objects in the discussion herein. For example, the three-dimensional objects may include any of various types of selectable object or items, including furniture, furnishings, fixtures, apparel, books, electronics, luggage, jewelry, consumer goods, food, beverages, vehicles, equipment, or various other types of products or items. Although particular types, numbers, and arrangements of objects are illustrated herein, a virtual reality environment may include any other types, numbers, and arrangements of objects.

Each three-dimensional object or model may have various associated aspects or attributes, such as a type, category, size, shape, dimensions, mass, weight, volume, color, texture, pattern, material, price, rating, availability, purchase options, other menu options, or other attributes of an object. In addition, one or more of the attributes of an object may be selected, modified, or otherwise manipulated. For example, a particular object within a type or category may be selected or modified, such as between different designs or models of chairs, tables, rugs, pictures, clocks, mirrors, etc. In addition, color, texture, pattern, size, or material of an object may be changed or modified, such as between different colors of furniture, different materials of sofas or chairs, different patterns of rugs, different finishes of tables or chairs, different sizes of coffee tables or pictures, etc. Further, a type or category of an object may define the object as a table, chair, end table, coffee table, rug, sofa, lamp, picture, vase, or various other types or categories of objects. Moreover, size, shape, dimensions, mass, weight, or volume of an object may be received from a manufacturer, supplier, distributor, or other provider of the object, or may be determined using one or more machine learning, computer vision, and/or geometrical detection algorithms or approaches. Furthermore, price, rating, availability, purchase options, or other menu options may also be received from a manufacturer, supplier, distributor, or other provider of the object and/or updated over time, and may be viewed or selected by a user.

In addition, the various aspects or attributes of a three-dimensional object or model may include a bounding box or volume that substantially surrounds an outer periphery of an object. The bounding box or volume may include a rectangular prism, a cylindrical prism, a sphere, other polygonal volume, or other irregularly shaped volume. In some example embodiments, a bounding box or volume may be received from a manufacturer, supplier, distributor, or other provider of the object. In other example embodiments, a bounding box or volume may be determined using one or more machine learning, computer vision, and/or geometrical detection algorithms or approaches. For example, the algorithms may comprise various surface, edge, line, or other feature detection algorithms, and/or mesh decimation algorithms, potentially in combination with various computer vision and machine learning algorithms, that may process and analyze one or more images or videos comprising an object in order to detect various surfaces, edges, lines, or other features of an object and determine a bounding box or volume associated with the object.

Various aspects or attributes of environment surfaces and/or three-dimensional objects or models may be modified, manipulated, and/or interacted with by one or more users of virtual reality environments using the user interfaces described herein. As further described herein, a user may browse, view, select, place, move, remove, save, evaluate, compare, and/or modify one or more aspects of a virtual reality environment or one or more environment surfaces thereof, a user may browse, view, select, save, evaluate, compare, and/or modify one or more aspects of an object within a virtual reality environment, and/or a user may browse, view, select, place, move, remove, save, evaluate, compare, purchase, and/or modify one or more objects within the virtual reality environment.

As shown in FIG. 1, one or more controllers, joysticks, or other input/output devices 105 may be at least partially presented within a field of view of a user within a virtual reality environment. For example, a user may utilize only one controller 105, e.g., using a dominant hand, or a user may utilize two controllers 105, e.g., one controller associated with each hand. Each of the controllers 105 may include a laser pointer or other pointing device that extends from the controller 105 in a substantially straight line that may be aligned with and used to point to, hover over, select, or otherwise manipulate or interact with one or more objects within a virtual reality environment. In addition, one or both controllers 105 may also include a menu 110 that may be attached or associated with the controller 105, and the menu 110 may include various selectable options, such as a home button 111, a help button 112, a camera or screenshot button 113, a shopping cart or list button 114, and a user account settings button 115. Various other selectable options may also be included in the menu 110, as further described herein.

For example, the home button 111 may return a user to an initial, default, or home screen associated with a virtual reality experience or environment, such as the view presented in FIG. 1, the help button 112 may present various help topics, frequently asked questions, or other information to assist users within a virtual reality environment, the camera button 113 may enable a user to capture one or more images of a virtual reality experience or environment, e.g., for later viewing or to share with other users, the shopping cart button 114 may present a list or view of objects placed within a shopping cart for potential purchase, and the user account settings button 115 may present various information associated with the user or user account, such as profile information, order information, shipping information, payment information, saved lists or groups of objects, user preferences, search histories, recommendations, or other information.

In the example shown in FIG. 1, a user may use a right hand controller substantially as a pointing device, e.g., using a dominant right hand, and a menu 110 may be attached or associated with a left hand controller. Then, using the right hand controller, the user may manipulate or interact with objects within the virtual reality environment using the pointing device, and may also interact with selectable options in the menu 110 using the pointing device. In other examples utilizing only a single controller, the user may use a single controller substantially as a pointing device, e.g., using a dominant hand. Then, using the single controller, the user may manipulate or interact with objects within the virtual reality environment using the pointing device, and may also interact with selectable options in the associated menu 110 using various buttons, trigger buttons, joysticks, or other input elements associated with the single controller.

In example embodiments, the one or more controllers, joysticks, or other input/output devices may include one or more buttons, trigger buttons, joysticks, directional pads, track pads, touch sensitive surfaces, or other input elements. Various individual input elements or combinations of input elements may be actuated or selected to provide corresponding commands, instructions, or directions related to portions of the experience within the virtual reality environment. For example, one or more buttons, trigger buttons, and/or joysticks may allow selection, placement, movement, resizing, or other modification or interaction with environment surfaces, fixtures, and/or various aspects thereof presented within virtual reality environments. In addition, one or more buttons, trigger buttons, and/or joysticks may allow selection, placement, movement, resizing, or other modification or interaction with dimensional filters that may be used to identify and present a plurality of objects having dimensional data that matches the data associated with the dimensional filters. Further, one or more buttons, trigger buttons, and/or joysticks may allow selection, placement, movement, or other modification or interaction with portions of user interfaces, selectable objects, and/or associated aspects or attributes within virtual reality environments. One or more joysticks, directional pads, track pads, or touch sensitive surfaces may allow movement or other manipulation of a user position within the environment, e.g., teleporting to various positions within the environment. Various other input elements, or combinations thereof, may allow and/or enable any of the various manipulations or interactions within virtual reality environments further described herein.

As further shown in FIG. 1, an example virtual reality environment may include a plurality of selectable options related to generating, modifying, viewing, browsing, searching, selecting, and/or evaluating one or more environment surfaces of rooms or spaces, one or more fixtures associated with rooms or spaces, and/or one or more objects within such rooms or spaces within the virtual reality environment. For example, the selectable options may include options such as view styled rooms 120, build your room 122, and search products 124. Various other selectable options may also be included in the virtual reality environment, as further described herein.

For example, the view styled rooms 120 option may present various designed or curated rooms or spaces and associated objects for viewing by a user within the virtual reality environment, and various aspects of the styled rooms or spaces may be viewed, selected, modified, saved, evaluated, or interacted with by the user. The build your room 122 option may present various templates from which a user may generate or create a desired room or space, including a floor, walls, ceiling, dimensions, paint, colors, materials, textures, flooring, and various fixtures, as well as design or decorate the room or space as desired with various furniture, furnishings, or other objects. Further, the search products 124 option may present various two-dimensional user interfaces and/or three-dimensional side-by-side view user interfaces via which a user may search, browse, view, select, place, move, remove, save, evaluate, compare, purchase, and/or modify one or more objects within the virtual reality environment, e.g., as further described in U.S. patent application Ser. No. 16/711,190, filed Dec. 11, 2019, and entitled "User Interfaces for Browsing Objects in Virtual Reality Environments," and U.S. patent application Ser. No. 16/711,221, filed Dec. 11, 2019, and entitled "User Interfaces for Object Exploration in Virtual Reality Environments," the contents of each of which are herein incorporated by reference in their entirety.

Although the example embodiments are described herein generally in the context of selection of the build your room 122 option in order to generate or modify a room or space and/or select an object to place within the room or space using dimensional filters within the virtual reality environment, in other example embodiments, the functions or operations described herein generally related to generating or modifying rooms or spaces and/or selecting objects for placement within rooms or spaces using dimensional filters may be utilized via either of the view styled rooms 120 option or the search products 124 option, e.g., by selecting an option to edit or modify a room or space, and/or by selecting a dimensional filter option to view or select a plurality of objects for placement with a room or space.

Figure 2:
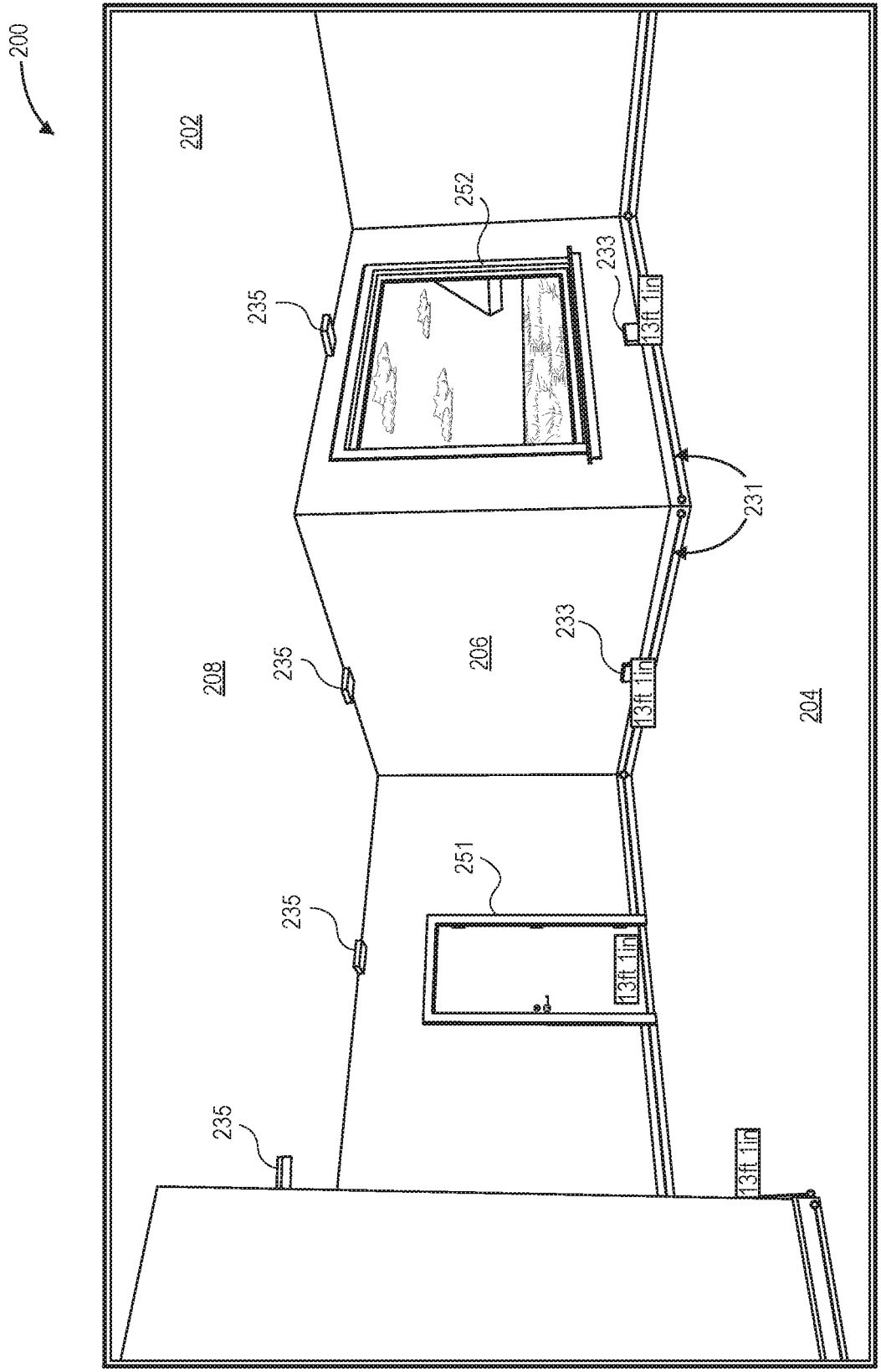
FIG. 2 is a schematic diagram of an example modifiable room within a virtual reality environment, in accordance with implementations of the present disclosure.

FIG. 2 is a schematic diagram 200 of an example modifiable room within a virtual reality environment, in accordance with implementations of the present disclosure.

As shown in FIG. 2, an example virtual reality environment 202 may be presented as including a plurality of environment surfaces, such as one or more floor surfaces 204, one or more wall surfaces 206, one or more ceiling surfaces 208, and/or one or more other environment surfaces. Further, the various environment surfaces may be presented as including one or more fixtures, such as doors 251, windows 252, baseboards, fireplaces, cased openings, or other fixtures.

For example, the example virtual reality environment 202 may include a floor surface 204 that is presented as substantially flat, planar, and horizontal within the virtual reality environment, a plurality of wall surfaces 206 that are presented as substantially flat, planar, and vertical within the virtual reality environment, and a ceiling surface 208 that is presented as substantially flat, planar, and horizontal within the virtual reality environment and separated by a height from the floor surface 204. Using an example coordinate system having an x-axis that extends horizontally toward and away from a user position, a y-axis that extends horizontally left and right across a field of view associated with the user position, and a z-axis that extends vertically up and down across a field of view associated with the user position, the floor surface 204 and the ceiling surface 208 may extend substantially parallel with an x-y plane, and each of the plurality of wall surfaces 206 may extend substantially orthogonally to the x-y plane and parallel to the z-axis. Further, the floor surface 204 may contact each of the plurality of wall surfaces 206 at points, lines, or edges that define respective interfaces between the floor surface 204 and each of the plurality of wall surfaces 206. Likewise, the ceiling surface 208 may contact each of the plurality of wall surfaces 206 at points, lines, or edges that define respective interfaces between the ceiling surface 208 and each of the plurality of wall surfaces 206.

In addition, a particular size, shape, extent, or structure of a room or space may be generated using one or more templates. For example, the templates may relate to particular rooms as a whole, e.g., a square room, a rectangular room, an L-shaped room, a room with sunken floors, a room with vaulted ceilings, or other room templates. In other example embodiments, the templates may relate to one or more environment surfaces, e.g., a sunken floor surface, a multi-level floor surface, a vaulted ceiling, an angled ceiling, two or more wall surfaces orthogonal to each other, two or more wall surfaces that are angled to each other, slanted or curved walls, or other environment surface templates.

Further, various environment surfaces, such as one or more floor surfaces 204, one or more wall surfaces 206, one or more ceiling surfaces 208, and/or one or more other environment surfaces may be added, removed, split, divided, combined, or merged during presentation within the example virtual reality environment 202. For example, responsive to various inputs such as selectable menu options, user interface elements, or one or more buttons associated with a controller, one or more floor surfaces may be added, removed, divided, or merged, e.g., to modify portions of a floor, different types of floors, sunken or raised floors, or other variations, one or more wall surfaces may be added, removed, divided, or merged, e.g., to alter a size, extent, or structure of the room, and/or one or more ceiling surfaces may be added, removed, divided, or merged, e.g., to modify portions of a ceiling, different types of ceilings, vaulted or angled ceilings, or other variations. In further example embodiments, various edges, corners, vertices, grab points, or other points associated with environment surfaces may be added, removed, split, divided, combined, or merged during presentation within the example virtual reality environment 202.

During presentation of the various environment surfaces of the room or space, various dimensions 231 associated with portions of the floor surface 204, wall surfaces 206, and/or ceiling surface 208 may be presented. For example, as shown in FIG. 2, widths of respective wall surfaces 206, which may correspond to various lengths or widths of portions of the floor surface 204 and/or the ceiling surface 208, may be presented to a user within the virtual reality environment. Additional dimensions may also be presented to a user, such as lengths or widths of portions of the floor surface 204, widths or heights of wall surfaces 206, and/or lengths, widths, or heights of portions of the ceiling surface 208. Although the dimensions 231 are shown as presented along respective bases of the wall surfaces 206, and near interfaces between the floor surface 204 and respective wall surfaces 206, in other example embodiments, the dimensions 231 may be presented at other positions or orientations relative to the various environment surfaces.

In some example embodiments, substantially all or a defined subset of dimensions may be continuously presented to a user within the virtual reality environment. In other example embodiments, various dimensions may or may not be presented responsive to various user inputs, interactions, or selections within the virtual reality environment. For example, responsive to receiving a hover indication with respect to a portion of an environment surface, e.g., based on directing or aiming a pointing device associated with the controller 105 onto a portion of an environment surface, and/or responsive to receiving a selection input with respect to a portion of an environment surface, e.g., based on directing or aiming a pointing device and pressing a button or other input element associated with the controller 105 while pointing to a portion of an environment surface, one or more dimensions associated with the portion of the environment surface may be presented to a user within the virtual reality environment, whereas other dimensions associated with other environment surfaces may not be presented or may be removed from presentation to the user.

Further, as shown in FIG. 2, at respective interfaces between the floor surface 204 and respective wall surfaces 206, one or more grab points 233 may be presented in association with the floor surface 204 and/or respective wall surfaces 206. Likewise, at respective interfaces between the ceiling surface 208 and respective wall surfaces 206, one or more grab points 235 may be presented in association with the ceiling surface 208 and/or respective wall surfaces 206. For example, the grab points 233, 235 may comprise various two-dimensional or three-dimensional shapes, such as circles, semi-circles, ovals, triangles, rectangles, or other two-dimensional shapes, and/or cylinders, semi-cylinders, triangular prisms, rectangular prisms, or other three-dimensional shapes. The grab points 233, 235 may be substantially centered at respective interfaces with respective wall surfaces 206, and grab points 233 may be positioned substantially aligned or flush with respective wall surfaces 206 to indicate movement of the wall surfaces 206, whereas grab points 235 may be positioned substantially aligned or flush with the ceiling surface 208 to indicate movement of the ceiling surface 208. In other embodiments, grab points may be positioned at other locations with respect to various environment surfaces, e.g., at corners of environment surfaces, at other positions along interfaces other than centers of respective wall surfaces, and/or at other positions associated with an environment surface, such as substantially centered within a wall surface or substantially centered within a portion of a ceiling surface. In some example embodiments, grab points associated with corners of environment surfaces may alter or modify one or more surfaces that meet at a corner independently or simultaneously, e.g., by moving surfaces along directions substantially perpendicular to planes associated with the surfaces, by moving edges of surfaces associated with the grab points at the corners while maintaining positions of one or more other edges of the surfaces, by allowing substantially freeform movement of the corners of the surfaces, by other movements of portions of environment surfaces responsive to movement of one or more corners, or by combinations thereof.

In example embodiments, a grab point associated with a particular environment surface may include associated rules or logic associated with movement or modification of the particular environment surface and/or adjacent surfaces. In some examples, grab points may have an associated type or category, e.g., a wall grab point, a floor grab point, a ceiling grab point, a corner grab point, etc. For example, a grab point associated with a particular wall surface may include associated rules or logic to enable movement or modification of the particular wall surface in a particular direction or manner, e.g., substantially perpendicular to a plane associated with the particular wall surface, as well as movement or modification of one or more adjacent surfaces. Similarly, a grab point associated with a particular floor surface may include associated rules or logic to enable movement or modification of the particular floor surface in a particular direction or manner, e.g., substantially perpendicular to a plane associated with the particular floor surface, as well as movement or modification of one or more adjacent surfaces. Likewise, a grab point associated with a particular ceiling surface may include associated rules or logic to enable movement or modification of the particular ceiling surface in a particular direction or manner, e.g., substantially perpendicular to a plane associated with the particular ceiling surface, as well as movement or modification of one or more adjacent surfaces. Moreover, grab points associated with other portions of environment surfaces, e.g., corners, edges, or other portions, may also include associated rules or logic to enable movement or modification of the particular portions of the environment surface in particular directions or manners associated with the particular portions of the environment surface, as well as movement or modification of one or more adjacent surfaces. Furthermore, the rules or logic associated with grab points may be customized, selected, or otherwise modified by users within the environment.

In some example embodiments, substantially all or a defined subset of grab points may be continuously presented to a user within the virtual reality environment. In other example embodiments, various grab points may or may not be presented responsive to various user inputs, interactions, or selections within the virtual reality environment. For example, responsive to receiving a hover indication with respect to a portion of an environment surface, e.g., based on directing or aiming a pointing device associated with the controller 105 onto a portion of an environment surface, and/or responsive to receiving a selection input with respect to a portion of an environment surface, e.g., based on directing or aiming a pointing device and pressing a button or other input element associated with the controller 105 while pointing to a portion of an environment surface, one or more grab points associated with the portion of the environment surface may be presented to a user within the virtual reality environment, whereas other grab points associated with other environment surfaces may not be presented or may be removed from presentation to the user.

In this manner, various dimensions, grab points, or other data associated with environment surfaces may be dynamically presented to a user, e.g., based on various user inputs, interactions, or selections, in order to present substantially only such dimensions, grab points, or other data that may be relevant to current functions, operations, or interactions by a user within the virtual reality environment.

Figure 3:
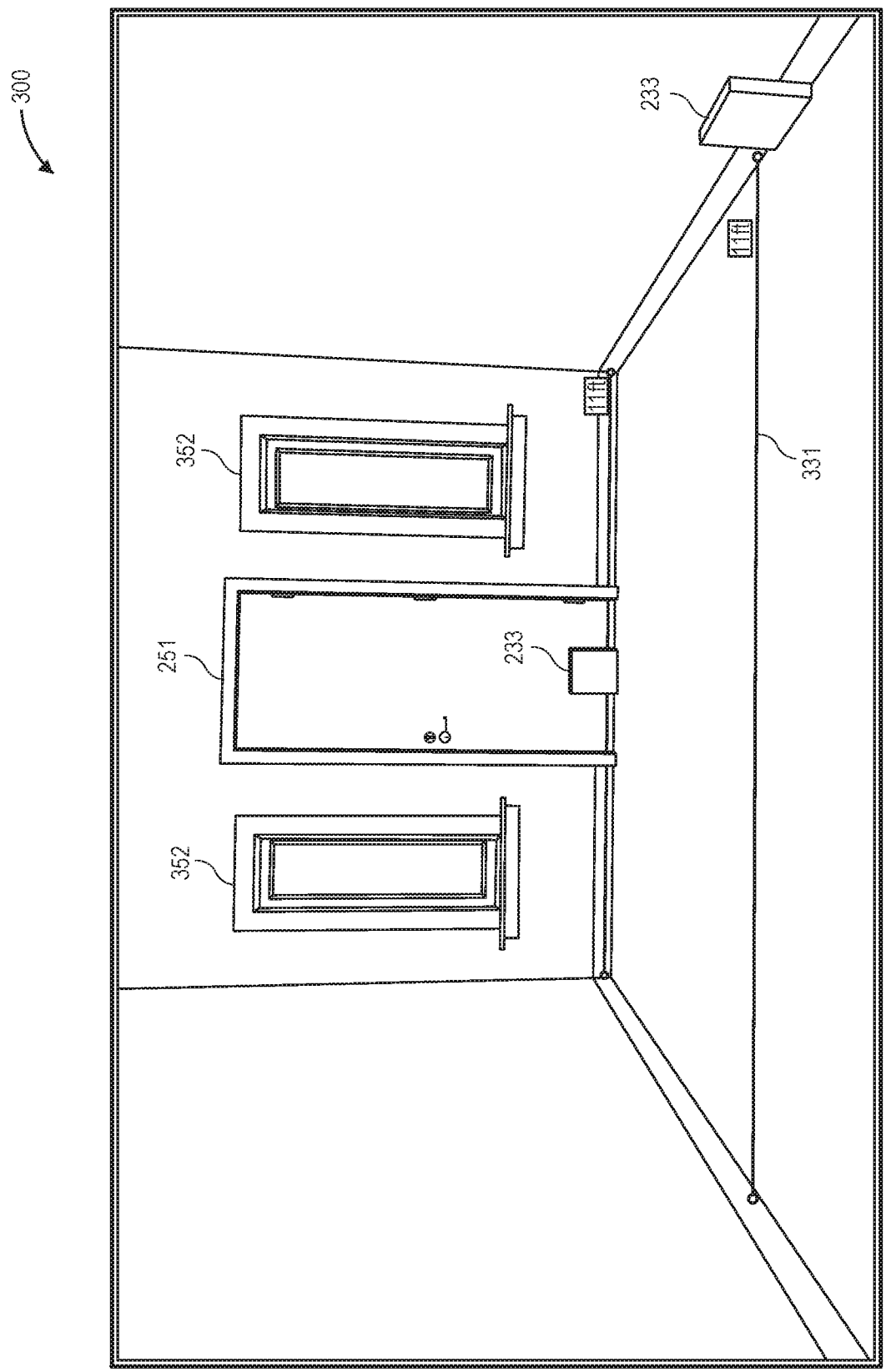
FIG. 3 is a schematic diagram of a portion of an example modifiable room within a virtual reality environment, in accordance with implementations of the present disclosure.

FIG. 3 is a schematic diagram 300 of a portion of an example modifiable room within a virtual reality environment, in accordance with implementations of the present disclosure.

As shown in FIG. 3, an example virtual reality environment may be presented as including a plurality of environment surfaces, such as one or more floor surfaces, one or more wall surfaces, one or more ceiling surfaces, and/or one or more other environment surfaces. In addition, one or more grab points 233 may be associated with interfaces between respective wall surfaces and the floor surface. Further, the various environment surfaces may be presented as including one or more fixtures, such as doors 251, windows 352, baseboards, fireplaces, cased openings, or other fixtures.

Responsive to receiving a hover indication with respect to a portion of an environment surface, e.g., based on directing or aiming a pointing device associated with the controller 105 onto a grab point 233 associated with a wall surface on a right side of FIG. 3, a dimension 331 associated with the wall surface may be presented, e.g., a dimension 331 between the wall surface and an opposing wall surface within the virtual reality environment. In addition, other dimensions associated with the wall surface or other environment surfaces may not be presented or may be removed from presentation to the user.

In addition, responsive to receiving a selection input with respect to a portion of an environment surface, e.g., based on directing or aiming a pointing device and pressing a button or other input element associated with the controller 105 while pointing to a grab point 233 associated with a wall surface on a right side of FIG. 3, a dimension 331 associated with the wall surface may be presented, e.g., a dimension 331 between the wall surface and an opposing wall surface within the virtual reality environment. In addition, other dimensions associated with the wall surface or other environment surfaces may not be presented or may be removed from presentation to the user.

Furthermore, responsive to the selection input, the wall surface associated with the selected grab point 233 may be moved relative to the room or space within the virtual reality environment, e.g., substantially toward or away from the opposing wall surface, and/or in a direction substantially perpendicular to a plane associated with the wall surface. Responsive to movement of the wall surface associated with the selected grab point 233, the dimension 331 that is presented in association with the selected wall surface may be modified substantially in real-time to present updated information, e.g., to present a modified dimension between the selected and moved wall surface and the opposing wall surface within the virtual reality environment.

Moreover, responsive to movement of a wall surface, one or more fixtures associated with adjacent wall surfaces may or may not also move in corresponding manner. In some example embodiments, a fixture associated with an adjacent wall surface, e.g., a door or window, may have a fixed or absolute position along the adjacent wall surface within the room or space, such that moving a wall surface may not modify or move the fixture that is associated with the adjacent wall surface. In other example embodiments, a fixture associated with an adjacent wall surface, e.g., a door or window, may have a relative position along the adjacent wall surface within the room or space, such that moving a wall surface may modify or move the fixture that is associated with the adjacent wall surface. For example, a fixture may be positioned or anchored relative to a center point of the adjacent wall surface, such that stretching or increasing a length of the adjacent wall surface may proportionally increase a distance between the position of the fixture and the center point of the adjacent wall surface, and shrinking or decreasing a length of the adjacent wall surface may proportionally decrease a distance between the position of the fixture and the center point of the adjacent wall surface. In other examples, a fixture may be positioned or anchored relative to a different point of the adjacent wall surface, e.g., an edge or other position along the adjacent wall surface, such that modifying a length of the adjacent wall surface may proportionally modify a distance between the position of the fixture and the anchor point of the adjacent wall surface. In still other examples, a fixture may be positioned or anchored relative to a different fixture associated with the adjacent wall surface, e.g., a door or cased opening associated with the adjacent wall surface, such that modifying a length of the adjacent wall surface may proportionally modify a distance between the position of the fixture and the position of the different anchor fixture associated with the adjacent wall surface.

In this manner, various dimensions, grab points, or other data associated with environment surfaces may be dynamically presented to a user, e.g., based on various user inputs, interactions, or selections, in order to present substantially only such dimensions, grab points, or other data that may be relevant to current functions, operations, or interactions by a user within the virtual reality environment.

Figure 4:
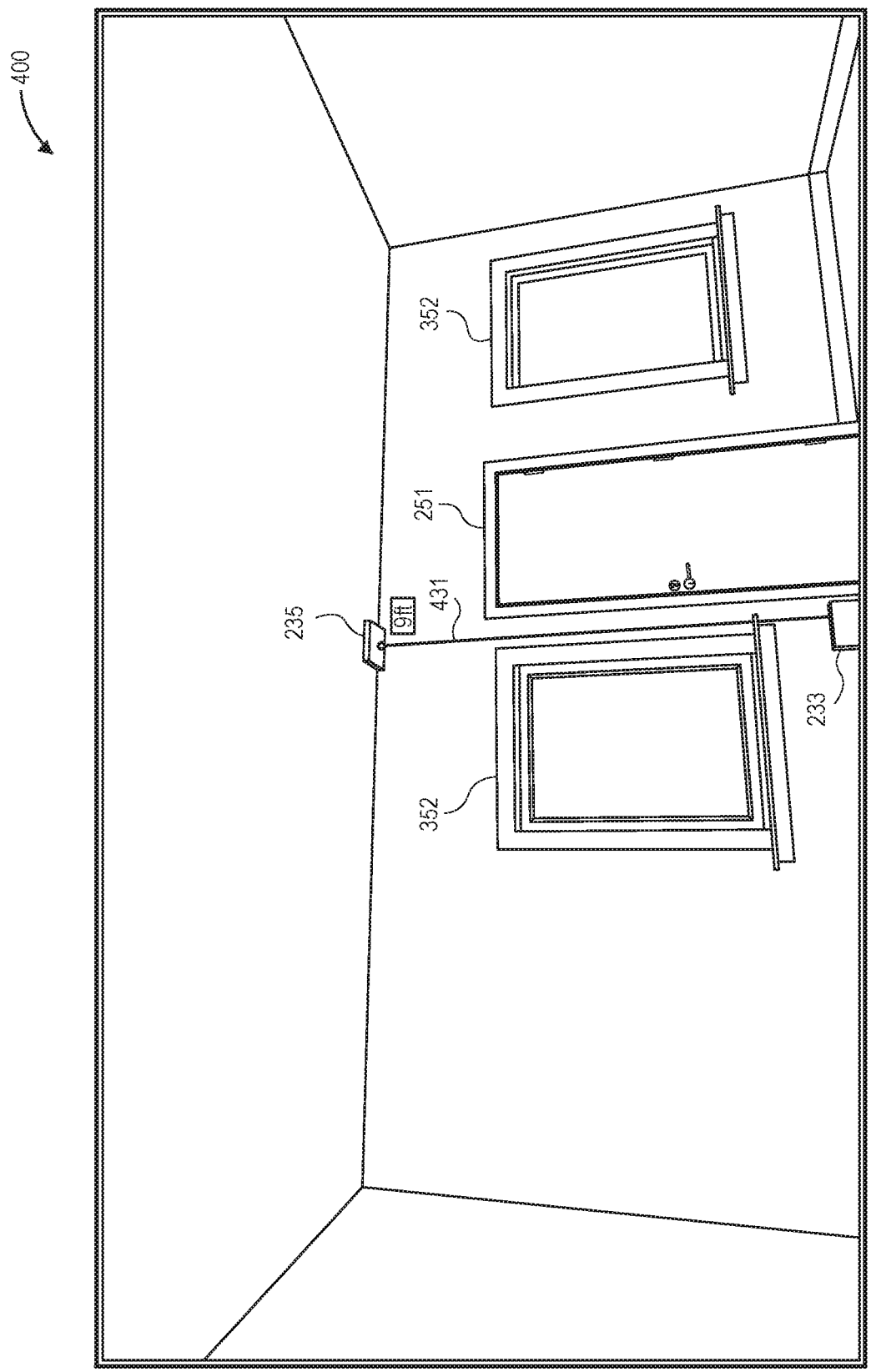
FIG. 4 is a schematic diagram of another portion of an example modifiable room within a virtual reality environment, in accordance with implementations of the present disclosure.

FIG. 4 is a schematic diagram 400 of another portion of an example modifiable room within a virtual reality environment, in accordance with implementations of the present disclosure.

As shown in FIG. 4, an example virtual reality environment may be presented as including a plurality of environment surfaces, such as one or more floor surfaces, one or more wall surfaces, one or more ceiling surfaces, and/or one or more other environment surfaces. In addition, one or more grab points 233, 235 may be associated with interfaces between respective wall surfaces and the floor surface, or between respective wall surfaces and the ceiling surface. Further, the various environment surfaces may be presented as including one or more fixtures, such as doors 251, windows 352, baseboards, fireplaces, cased openings, or other fixtures.

Responsive to receiving a hover indication with respect to a portion of an environment surface, e.g., based on directing or aiming a pointing device associated with the controller 105 onto a grab point 235 associated with a ceiling surface in FIG. 4, a dimension 431 associated with the ceiling surface may be presented, e.g., a dimension 431 between the ceiling surface and the floor surface within the virtual reality environment. In addition, other dimensions associated with the ceiling surface or other environment surfaces may not be presented or may be removed from presentation to the user.

In addition, responsive to receiving a selection input with respect to a portion of an environment surface, e.g., based on directing or aiming a pointing device and pressing a button or other input element associated with the controller 105 while pointing to a grab point 235 associated with a ceiling surface in FIG. 4, a dimension 431 associated with the ceiling surface may be presented, e.g., a dimension 431 between the ceiling surface and the floor surface within the virtual reality environment. In addition, other dimensions associated with the ceiling surface or other environment surfaces may not be presented or may be removed from presentation to the user.

Furthermore, responsive to the selection input, the ceiling surface associated with the selected grab point 235 may be moved relative to the room or space within the virtual reality environment, e.g., substantially toward or away from the floor surface, and/or in a direction substantially perpendicular to a plane associated with the ceiling surface. Responsive to movement of the ceiling surface associated with the selected grab point 235, the dimension 431 that is presented in association with the selected ceiling surface may be modified substantially in real-time to present updated information, e.g., to present a modified dimension between the selected and moved ceiling surface and the floor surface within the virtual reality environment.

Moreover, responsive to movement of a ceiling surface, one or more fixtures associated with one or more adjacent wall surfaces may or may not also move in corresponding manner. In some example embodiments, a fixture associated with an adjacent wall surface, e.g., a window, may have a fixed or absolute position along the adjacent wall surface within the room or space, such that moving a ceiling surface may not modify or move the fixture that is associated with the adjacent wall surface. In other example embodiments, a fixture associated with an adjacent wall surface, e.g., a window, may have a relative position along the adjacent wall surface within the room or space, such that moving a ceiling surface may modify or move the fixture that is associated with the adjacent wall surface. For example, a fixture may be positioned or anchored relative to a center point of the adjacent wall surface, such that stretching or increasing a height of the adjacent wall surface may proportionally increase a distance between the position of the fixture and the center point of the adjacent wall surface, and shrinking or decreasing a height of the adjacent wall surface may proportionally decrease a distance between the position of the fixture and the center point of the adjacent wall surface. In other examples, a fixture may be positioned or anchored relative to a different point of the adjacent wall surface, e.g., an edge or other position along the adjacent wall surface, such that modifying a height of the adjacent wall surface may proportionally modify a distance between the position of the fixture and the anchor point of the adjacent wall surface. In still other examples, a fixture may be positioned or anchored relative to a different fixture associated with the adjacent wall surface, e.g., a door or cased opening associated with the adjacent wall surface, such that modifying a height of the adjacent wall surface may proportionally modify a distance between the position of the fixture and the position of the different anchor fixture associated with the adjacent wall surface.

In this manner, various dimensions, grab points, or other data associated with environment surfaces may be dynamically presented to a user, e.g., based on various user inputs, interactions, or selections, in order to present substantially only such dimensions, grab points, or other data that may be relevant to current functions, operations, or interactions by a user within the virtual reality environment.

Figure 5:
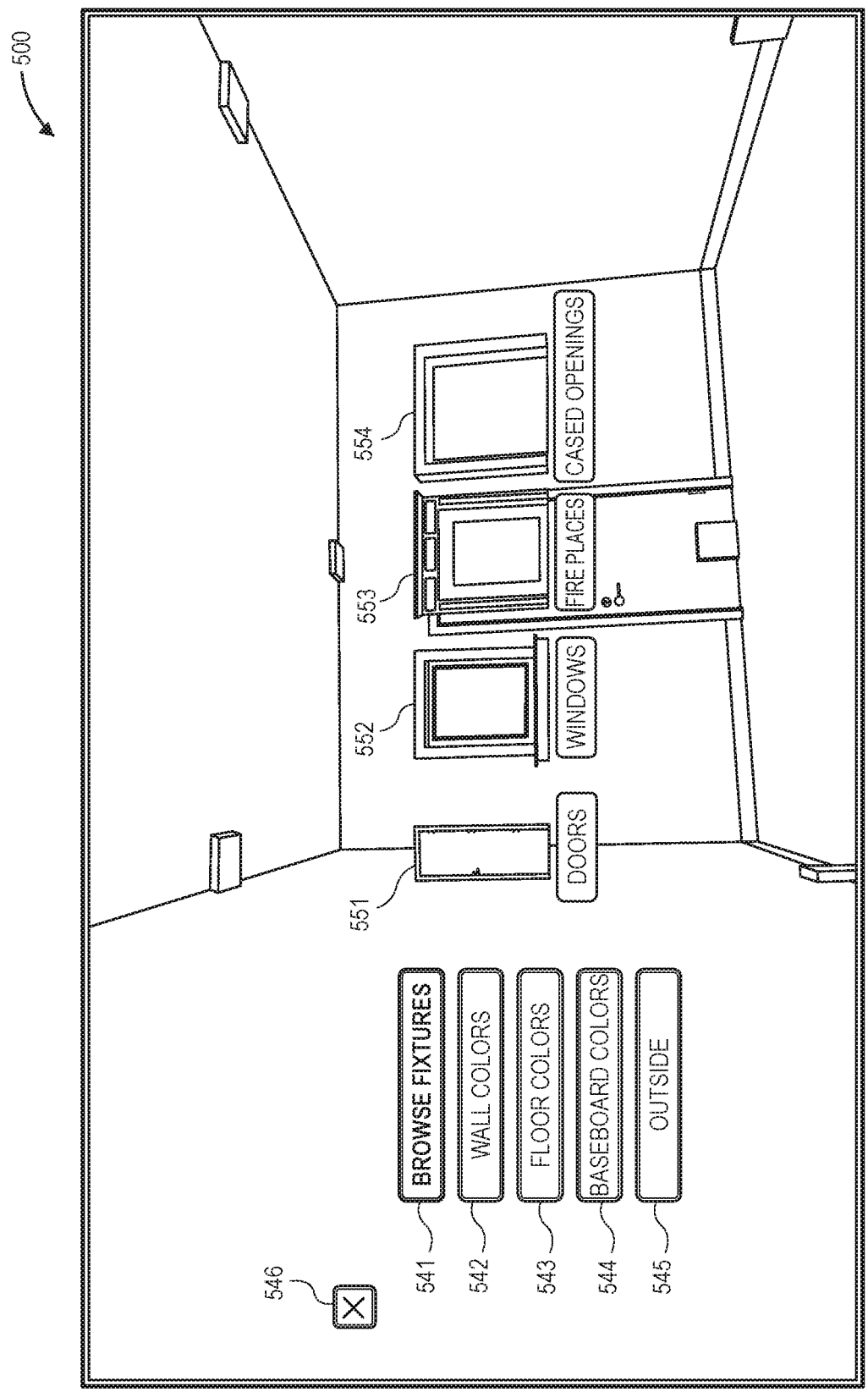
FIG. 5 is a schematic diagram of an example user interface to browse and select fixtures within a virtual reality environment, in accordance with implementations of the present disclosure.

FIG. 5 is a schematic diagram 500 of an example user interface to browse and select fixtures within a virtual reality environment, in accordance with implementations of the present disclosure.

As shown in FIG. 5, the example user interface may include a plurality of selectable options in a left hand column or panel, and a category or catalog browse interface for various fixtures or other objects presented as a two-dimensional grid view user interface in a middle column or panel. The plurality of selectable options may include a browse fixtures 541 button, a wall colors 542 button, a floor colors 543 button, a baseboard colors 544 button, an outside environment 545 button, and a close 546 button. Various other selectable options may also be included in the example user interface, as further described herein.

For example, the browse fixtures 541 button may present various category or catalog browse or search interfaces for various fixtures or other objects that may be placed in association with one or more environment surfaces within the virtual reality environment. In addition, the wall colors 542 button may present various paints, colors, materials, or textures that may be applied to wall surfaces within the virtual reality environment, as described at least with respect to FIG. 8. The floor colors 543 button may present various materials, surfaces, finishes, or textures that may be applied to floor surfaces within the virtual reality environment, as described at least with respect to FIG. 9. The baseboard colors 544 button may present various paints, colors, materials, or textures that may be applied to baseboard surfaces within the virtual reality environment, as described at least with respect to FIG. 10. Further, the outside environment 545 button may present various outdoor environments or scenes that may be applied to environments outside the room or space within the virtual reality environment, as described at least with respect to FIG. 11. In addition, the close 546 button may cause the example user interface to be closed and no longer presented to a user within the virtual reality environment.

Furthermore, as shown in FIG. 5, the category or catalog browse interface for various fixtures or other objects may include various types or categories of fixtures, including doors 551, windows 552, fireplaces 553, or cased openings 554. Other types or categories of fixtures may also include baseboards, stairs, columns, islands, countertops, shelves, built-in storage, ceiling rafters, vaulted ceilings, crown moldings, electrical outlets, switches, appliances, lighting, vents, radiators, or other fixtures associated with the virtual reality environment. Each of the plurality of categories or subcategories of various fixtures or other objects may be presented as a two-dimensional image or a three-dimensional model that is associated with each of the categories or subcategories of fixtures or objects. Further, each of the categories or subcategories of fixtures or objects that are presented may also include one or more details or information that are presented in association with the categories or subcategories of fixtures or objects, such as type, category, name, user ratings, number of positive or negative user reviews or ratings, shipping or delivery options, seller, brand, or manufacturer information, or various other details or information associated with the categories or subcategories of fixtures or objects.

In some example embodiments, to improve user experience, the example user interface may initially be presented with two-dimensional images that may be processed and presented relatively quickly, and upon processing or loading associated three-dimensional models, the three-dimensional models may replace the two-dimensional images within the user interface to provide a more immersive, three-dimensional experience within the virtual reality environment. In other example embodiments, a user may set or select a preference or default setting for either two-dimensional images or three-dimensional models to be presented via the user interface.

In example embodiments, the plurality of categories or subcategories of fixtures or objects presented via the user interface may be presented in a same relative scale, such that doors, windows, cased openings, or other categories or subcategories of fixtures or objects that are presented together via the user interface may be viewed, evaluated, or compared in a same relative scale. In other example embodiments, the plurality of categories or subcategories of fixtures or objects presented via the user interface may be presented in different relative scales, such that categories or subcategories of fixtures or objects of different sizes that are presented together via the user interface may be viewable and recognizable in their different relative scales.

Figure 6:
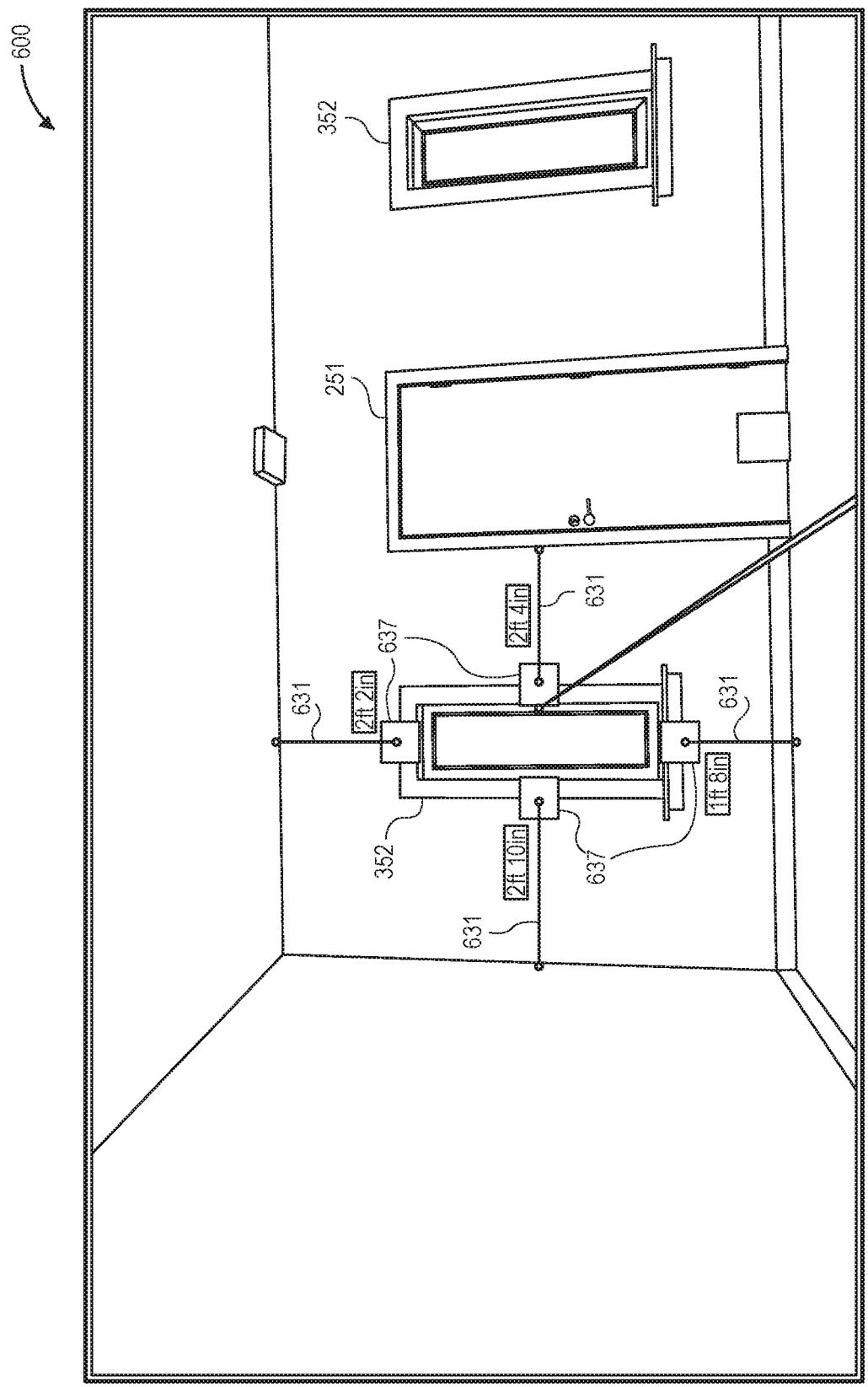
FIG. 6 is a schematic diagram of an example modifiable fixture within a virtual reality environment, in accordance with implementations of the present disclosure.

FIG. 6 is a schematic diagram 600 of an example modifiable fixture within a virtual reality environment, in accordance with implementations of the present disclosure.

As shown in FIG. 6, an example virtual reality environment may be presented as including a plurality of environment surfaces, such as one or more floor surfaces, one or more wall surfaces, one or more ceiling surfaces, and/or one or more other environment surfaces. Further, the various environment surfaces may be presented as including one or more fixtures, such as doors 251, windows 352, baseboards, fireplaces, cased openings, or other fixtures.

Responsive to selection of a fixture for placement in association with an environment surface, e.g., selection of a window 352 for placement on a wall surface within the virtual reality environment, a three-dimensional model of the fixture may be presented for placement on the environment surface, e.g., substantially aligned with a plane associated with the wall surface. In addition, various dimensions associated with the fixture may be presented, such as distances between the window 352 and portions of the floor surface, one or more wall surfaces, the ceiling surface, and/or other fixtures within the virtual reality environment. For example, the various dimensions 631 may include a distance between a bottom of the window 352 and a floor surface, e.g., 1 ft-8 in, a distance between a right side of the window 352 and an adjacent fixture, e.g., door 251 at a distance of 2 ft-4 in, a distance between a top of the window 352 and a ceiling surface, e.g., 2 ft-2 in, and a distance between a left side of the window 352 and an adjacent wall surface, e.g., 2 ft-10 in. During placement of the window 352 on the wall surface as shown in FIG. 6, the various dimensions 631 may be presented in order to facilitate user interaction, movement, and placement on the wall surface relative to adjacent surfaces and/or fixtures.

In addition, one or more fixtures may be constrained or defined in association with one or more surfaces, e.g., a door or cased opening may be placed or anchored on a wall surface with a bottom surface thereof contacting a floor surface, a window may be placed or anchored to a wall surface, lighting fixtures may be placed or anchored to a ceiling surface, or other similar logic, rules, constraints, or definitions of fixtures in association with various surfaces. In example embodiments, a fixture may include associated rules or logic associated with placement and movement of the fixture. In some examples, grab points may have an associated type or category, e.g., a door grab point, a window grab point, a door or window width grab point, a door or window height grab point, a fireplace grab point, a fireplace mantle grab point, etc. For example, a fixture such as a door, fireplace, cased opening, or stairs may include associated rules or logic with respect to a bottom surface of such fixtures maintaining contact with a floor surface. In addition, a fixture such as a door, window, baseboards, or built-in storage may include associated rules or logic with respect to placement and movement on wall surfaces, but not on floor or ceiling surfaces. Similarly, a fixture such as a column or island may include associated rules or logic with respect to placement and movement on floor surfaces, but not on wall or ceiling surfaces. Likewise, a fixture such as ceiling rafters, crown moldings, lighting, or chandeliers may include associated rules or logic with respect to placement and movement on ceiling surfaces, but not on floor or wall surfaces. Furthermore, the rules or logic associated with placement and movement of fixtures may be customized, selected, or otherwise modified by users within the environment.

Further, as shown in FIG. 6, along respective portions of the fixture, e.g., along respective sides of the window 352, one or more grab points 637 may be presented in association with the portions of the fixture. For example, the grab points 637 may comprise various two-dimensional or three-dimensional shapes, such as circles, semi-circles, ovals, triangles, rectangles, or other two-dimensional shapes, and/or cylinders, semi-cylinders, triangular prisms, rectangular prisms, or other three-dimensional shapes. The grab points 637 may be substantially centered along respective portions of the fixture, and grab points 637 may be positioned substantially aligned and flush with respective portions of the fixture. In other embodiments, grab points may be positioned at other locations with respect to various portions of the fixture, e.g., at corners of portions of the fixture, and/or at other positions along portions of the fixture other than centers of respective portions.

In example embodiments, a grab point associated with a portion of a fixture may include associated rules or logic associated with movement or modification of the portion of the fixture. In some examples, grab points may have an associated type or category, e.g., a door grab point, a window grab point, a door or window width grab point, a door or window height grab point, a fireplace grab point, a fireplace mantle grab point, a column or island depth grab point, etc. For example, a grab point associated with a portion of a fixture may include associated rules or logic to enable movement or modification of the portion of the fixture in a particular direction or manner, e.g., in a particular direction relative to one or more different portions of the fixture and/or relative to one or more environment surfaces. Moreover, grab points associated with other portions of fixtures, e.g., corners, edges, or other portions, may also include associated rules or logic to enable movement or modification of the particular portions of the fixtures in particular directions or manners relative to one or more different portions of the fixtures and/or relative to one or more environment surfaces. Furthermore, the rules or logic associated with grab points may be customized, selected, or otherwise modified by users within the environment.

In some example embodiments, substantially all or a defined subset of grab points may be continuously presented to a user within the virtual reality environment. In other example embodiments, various grab points may or may not be presented responsive to various user inputs, interactions, or selections within the virtual reality environment. For example, responsive to receiving a hover indication with respect to a portion of a fixture, e.g., based on directing or aiming a pointing device associated with the controller 105 onto a portion of the window 352, and/or responsive to receiving a selection input with respect to a portion of a fixture, e.g., based on directing or aiming a pointing device and pressing a button or other input element associated with the controller 105 while pointing to a portion of the window 352, one or more grab points 637 associated with the portion of the fixture may be presented to a user within the virtual reality environment, whereas other grab points associated with other portions of the fixture, other fixtures, or other environment surfaces may not be presented or may be removed from presentation to the user.

Following placement of a fixture, responsive to receiving a hover indication with respect to a portion of the fixture, e.g., based on directing or aiming a pointing device associated with the controller 105 onto a portion of the window 352, various dimensions and/or grab points associated with the fixture may be presented, e.g., the various dimensions 631 including distances between the window 352 and portions of the floor surface, one or more wall surfaces, the ceiling surface, and/or other fixtures within the virtual reality environment and/or various grab points 637. In addition, other dimensions and/or grab points associated with the window 352, other fixtures, or other environment surfaces may not be presented or may be removed from presentation to the user.

In addition, responsive to receiving a selection input with respect to a portion of the fixture, e.g., based on directing or aiming a pointing device and pressing a button or other input element associated with the controller 105 while pointing to a portion of the window 352, various dimensions and/or grab points associated with the fixture may be presented, e.g., various dimensions 631 including distances between the window 352 and portions of the floor surface, one or more wall surfaces, the ceiling surface, and/or other fixtures within the virtual reality environment and/or various grab points 637. In addition, other dimensions and/or grab points associated with the window 352, other fixtures, or other environment surfaces may not be presented or may be removed from presentation to the user.

Furthermore, responsive to the selection input associated with a portion of the fixture, the fixture may be moved relative to the room or space within the virtual reality environment, e.g., substantially along a plane of the wall surface on which the window 352 was placed or along planes associated with other wall surfaces, and/or in a direction substantially parallel to a plane associated with the wall surface or other wall surfaces. Responsive to movement of the fixture, the various dimensions 631 that are presented in association with the selected fixture may be modified substantially in real-time to present updated information, e.g., to present modified dimensions including distances between the window 352 and portions of the floor surface, one or more wall surfaces, the ceiling surface, and/or other fixtures within the virtual reality environment.

In this manner, various dimensions, grab points, or other data associated with fixtures may be dynamically presented to a user, e.g., based on various user inputs, interactions, or selections, in order to present substantially only such dimensions, grab points, or other data that may be relevant to current functions, operations, or interactions by a user within the virtual reality environment.

Figure 7:
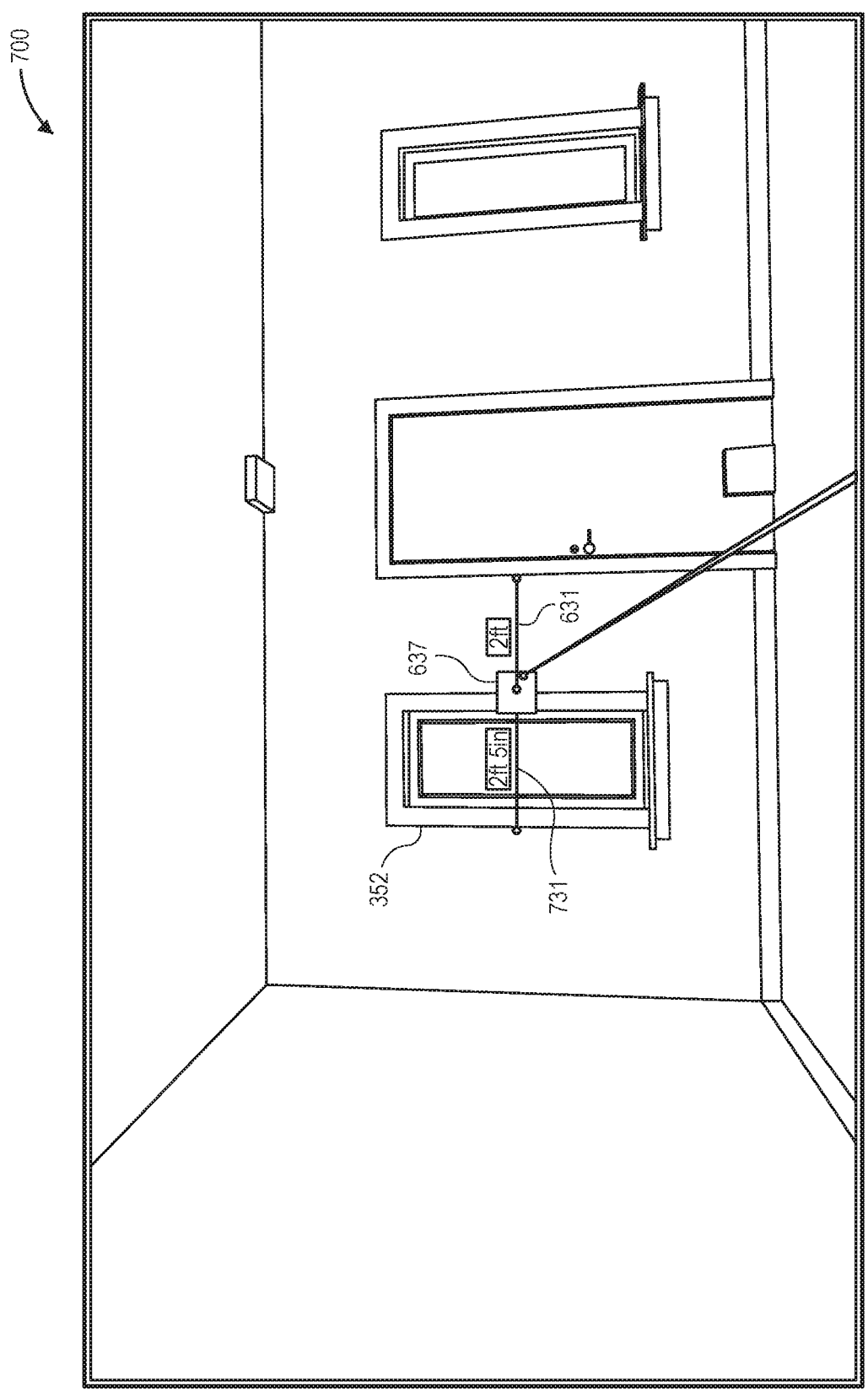
FIG. 7 is another schematic diagram of an example modifiable fixture within a virtual reality environment, in accordance with implementations of the present disclosure.

FIG. 7 is another schematic diagram 700 of an example modifiable fixture within a virtual reality environment, in accordance with implementations of the present disclosure.

As shown in FIG. 7, an example virtual reality environment may be presented as including a plurality of environment surfaces, such as one or more floor surfaces, one or more wall surfaces, one or more ceiling surfaces, and/or one or more other environment surfaces. Further, the various environment surfaces may be presented as including one or more fixtures, such as doors 251, windows 352, baseboards, fireplaces, cased openings, or other fixtures.

Responsive to receiving a hover indication with respect to a portion of a fixture, e.g., based on directing or aiming a pointing device associated with the controller 105 onto a grab point 637 associated with a portion of a window 352, one or more dimensions 631, 731 associated with the portion of the fixture may be presented, e.g., a dimension 631 between the right side of the window 352 and an adjacent surface or fixture within the virtual reality environment, such as a door 251 to the right side of the window 352, as well as a dimension 731 of the fixture associated with the grab point 637 that extends to an opposing portion of the fixture, such as a width of the window 352. In addition, other dimensions associated with the fixture, other fixtures, or other environment surfaces may not be presented or may be removed from presentation to the user.

In addition, responsive to receiving a selection input with respect to a portion of a fixture, e.g., based on directing or aiming a pointing device and pressing a button or other input element associated with the controller 105 while pointing to a grab point 637 associated with a portion of a window 352, one or more dimensions 631, 731 associated with the portion of the fixture may be presented, e.g., a dimension 631 between the right side of the window 352 and an adjacent surface or fixture within the virtual reality environment, such as a door 251 to the right side of the window 352, as well as a dimension 731 of the fixture associated with the grab point 637 that extends to an opposing portion of the fixture, such as a width of the window 352. In addition, other dimensions associated with the fixture, other fixtures, or other environment surfaces may not be presented or may be removed from presentation to the user.

Furthermore, responsive to the selection input, the portion of the fixture associated with the selected grab point 637 may be moved relative to other portions of the fixture within the virtual reality environment, e.g., in a direction substantially parallel to a plane associated with the wall surface, as well as substantially toward or away from an opposing portion of the fixture, and/or in a direction substantially perpendicular to a side, edge, line, or surface associated with the portion of the fixture. Responsive to movement of the portion of the fixture associated with the selected grab point 637, the dimensions 631, 731 that are presented in association with the selected portion of the fixture may be modified substantially in real-time to present updated information, e.g., to present a modified dimension 631 between the right side of the window 352 and an adjacent surface or fixture within the virtual reality environment, such as a door 251 to the right side of the window 352, as well as a modified dimension 731 of the fixture associated with the grab point 637 that extends to an opposing portion of the fixture, such as a width of the window 352.

In other example embodiments, various different portions of fixtures other than a width and/or height of a fixture may also be modifiable using one or more additional grab points, e.g., depth of a door opening, depth of a window opening, depth of a window sill, thickness of a column, depth of a fireplace mantle or built-in storage, depth or height of individual stairs of a staircase, and/or widths, heights, depths, lengths, angles, or various other dimensions associated with various fixtures or portions thereof. Further, one or more dimensions of a portion of a fixture may be modified proportionally with one or more other dimensions of the portion of the fixture, e.g., a radius of an upper semicircular, rounded portion of a window and an overall width of the window may be proportionally modified.

In example embodiments, a grab point associated with a portion of a fixture may include associated rules or logic associated with movement or modification of the portion of the fixture. In some examples, grab points may have an associated type or category, e.g., a door grab point, a window grab point, a door or window width grab point, a door or window height grab point, a fireplace grab point, a fireplace mantle grab point, a column or island depth grab point, etc. For example, a grab point associated with a portion of a fixture may include associated rules or logic to enable movement or modification of the portion of the fixture in a particular direction or manner, e.g., in a particular direction relative to one or more different portions of the fixture and/or relative to one or more environment surfaces. Moreover, grab points associated with other portions of fixtures, e.g., corners, edges, or other portions, may also include associated rules or logic to enable movement or modification of the particular portions of the fixtures in particular directions or manners relative to one or more different portions of the fixtures and/or relative to one or more environment surfaces. Furthermore, the rules or logic associated with grab points may be customized, selected, or otherwise modified by users within the environment.

In this manner, various dimensions, grab points, or other data associated with fixtures may be dynamically presented to a user, e.g., based on various user inputs, interactions, or selections, in order to present substantially only such dimensions, grab points, or other data that may be relevant to current functions, operations, or interactions by a user within the virtual reality environment.

Figure 8:
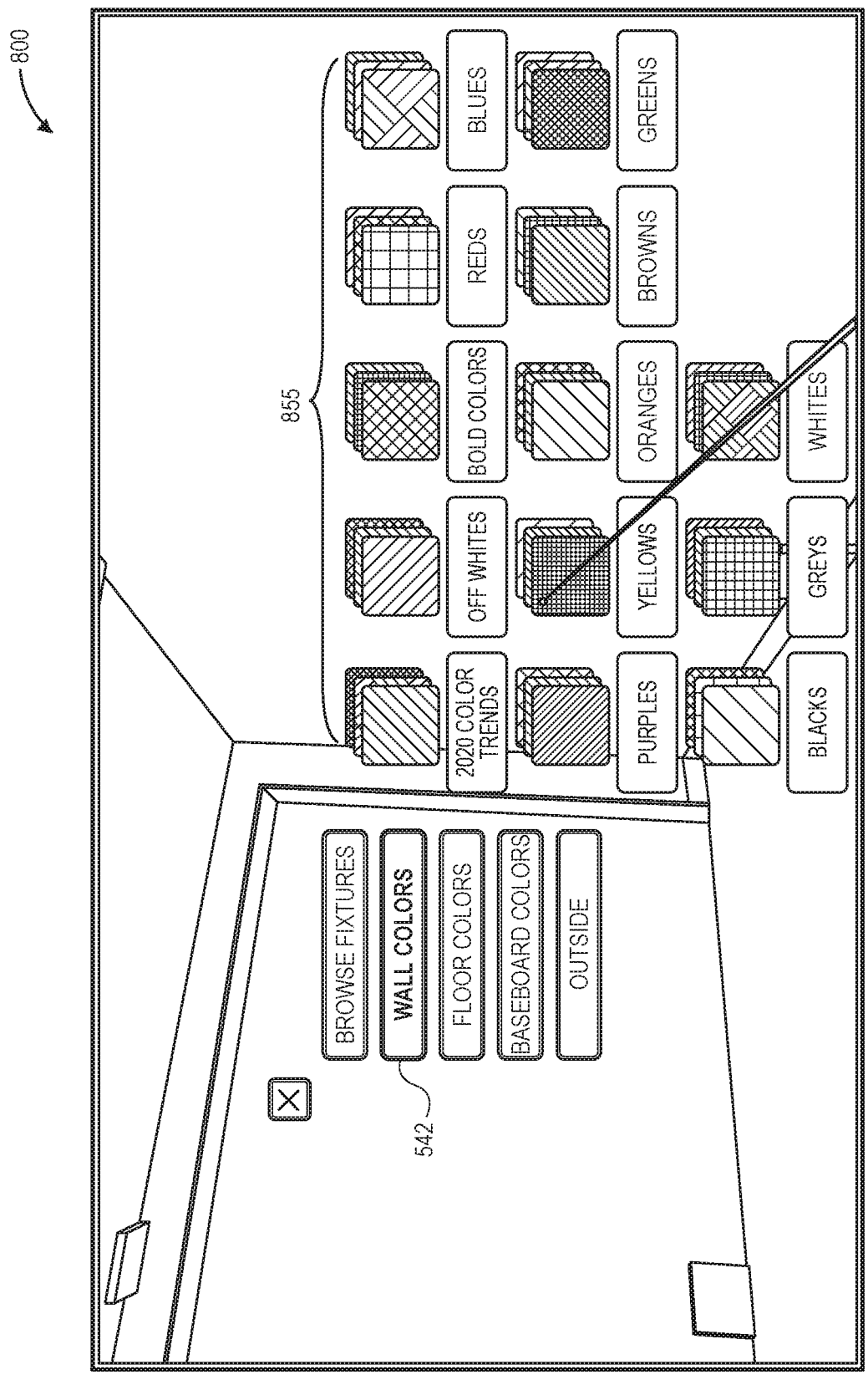
FIG. 8 is a schematic diagram of an example user interface to browse and select wall colors within a virtual reality environment, in accordance with implementations of the present disclosure.

FIG. 8 is a schematic diagram 800 of an example user interface to browse and select wall colors within a virtual reality environment, in accordance with implementations of the present disclosure.

As shown in FIG. 8, the example user interface may include a plurality of selectable options in a left hand column or panel, and a browse interface 855 for various wall colors presented as a two-dimensional grid view user interface in a middle column or panel. The plurality of selectable options may include a browse fixtures button, a wall colors 542 button, a floor colors button, a baseboard colors button, an outside environment button, and a close button, as described at least with respect to FIG. 5. Various other selectable options may also be included in the example user interface, as further described herein.

Responsive to selection of the wall colors 542 button, various paints, colors, materials, or textures that may be applied to wall surfaces within the virtual reality environment may be presented within the browse interface 855 for selection by a user. Each of the plurality of paints, colors, materials, or textures that may be applied to wall surfaces may be presented as a two-dimensional image or a three-dimensional model. Further, each of the plurality of paints, colors, materials, or textures that are presented may also include one or more details or information that are presented in association with the paints, colors, materials, or textures, such as type, category, name, user ratings, number of positive or negative user reviews or ratings, shipping or delivery options, seller, brand, or manufacturer information, or various other details or information associated with the paints, colors, materials, or textures.

In some example embodiments, to improve user experience, the example user interface may initially be presented with two-dimensional images that may be processed and presented relatively quickly, and upon processing or loading associated three-dimensional models, the three-dimensional models may replace the two-dimensional images within the user interface to provide a more immersive, three-dimensional experience within the virtual reality environment. In other example embodiments, a user may set or select a preference or default setting for either two-dimensional images or three-dimensional models to be presented via the user interface.

Figure 9:
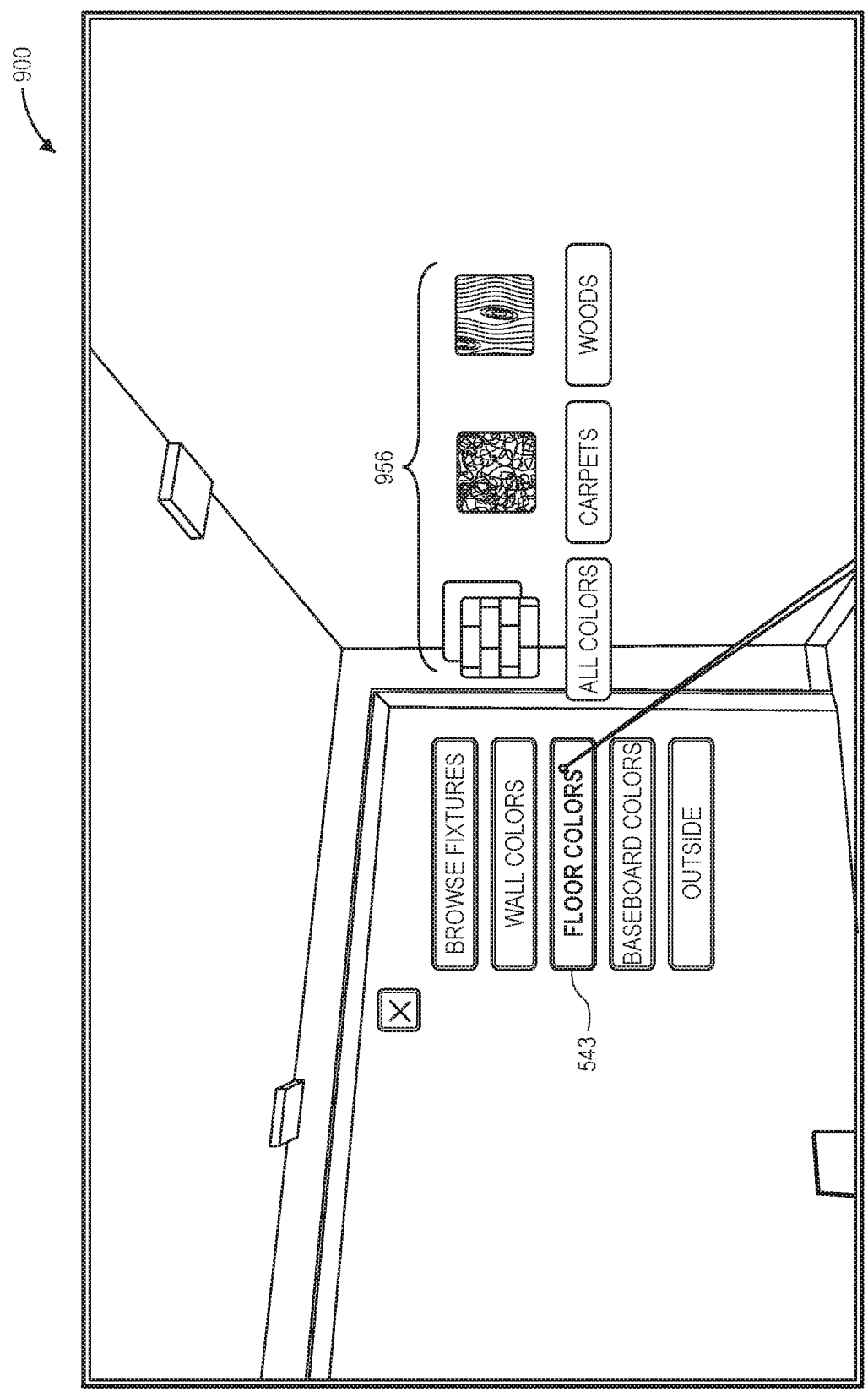
FIG. 9 is a schematic diagram of an example user interface to browse and select floor colors within a virtual reality environment, in accordance with implementations of the present disclosure.

FIG. 9 is a schematic diagram 900 of an example user interface to browse and select floor colors within a virtual reality environment, in accordance with implementations of the present disclosure.

As shown in FIG. 9, the example user interface may include a plurality of selectable options in a left hand column or panel, and a browse interface 956 for various floor colors presented as a two-dimensional grid view user interface in a middle column or panel. The plurality of selectable options may include a browse fixtures button, a wall colors button, a floor colors 543 button, a baseboard colors button, an outside environment button, and a close button, as described at least with respect to FIG. 5. Various other selectable options may also be included in the example user interface, as further described herein.

Responsive to selection of the floor colors 543 button, various materials, surfaces, finishes, or textures that may be applied to floor surfaces within the virtual reality environment may be presented within the browse interface 956 for selection by a user. Each of the plurality of materials, surfaces, finishes, or textures that may be applied to floor surfaces may be presented as a two-dimensional image or a three-dimensional model. Further, each of the plurality of materials, surfaces, finishes, or textures that are presented may also include one or more details or information that are presented in association with the materials, surfaces, finishes, or textures, such as type, category, name, user ratings, number of positive or negative user reviews or ratings, shipping or delivery options, seller, brand, or manufacturer information, or various other details or information associated with the materials, surfaces, finishes, or textures.

In some example embodiments, to improve user experience, the example user interface may initially be presented with two-dimensional images that may be processed and presented relatively quickly, and upon processing or loading associated three-dimensional models, the three-dimensional models may replace the two-dimensional images within the user interface to provide a more immersive, three-dimensional experience within the virtual reality environment. In other example embodiments, a user may set or select a preference or default setting for either two-dimensional images or three-dimensional models to be presented via the user interface.

Figure 10:
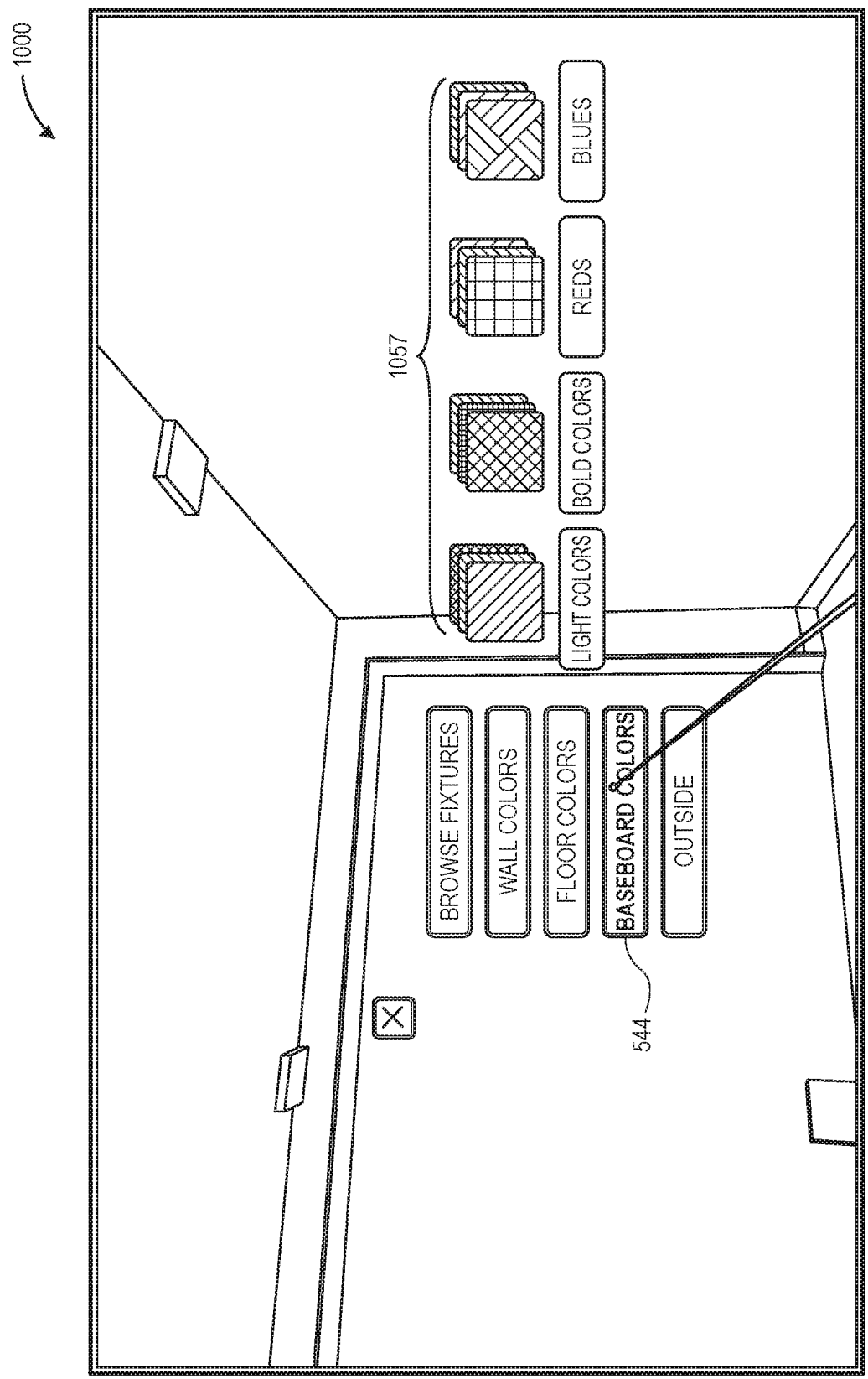
FIG. 10 is a schematic diagram of an example user interface to browse and select baseboard colors within a virtual reality environment, in accordance with implementations of the present disclosure.

FIG. 10 is a schematic diagram 1000 of an example user interface to browse and select baseboard colors within a virtual reality environment, in accordance with implementations of the present disclosure.

As shown in FIG. 10, the example user interface may include a plurality of selectable options in a left hand column or panel, and a browse interface 1057 for various baseboard colors presented as a two-dimensional grid view user interface in a middle column or panel. The plurality of selectable options may include a browse fixtures button, a wall colors button, a floor colors button, a baseboard colors 544 button, an outside environment button, and a close button, as described at least with respect to FIG. 5. Various other selectable options may also be included in the example user interface, as further described herein.

Responsive to selection of the baseboard colors 544 button, various paints, colors, materials, or textures that may be applied to baseboard surfaces within the virtual reality environment may be presented within the browse interface 1057 for selection by a user. Each of the plurality of paints, colors, materials, or textures that may be applied to baseboard surfaces may be presented as a two-dimensional image or a three-dimensional model. Further, each of the plurality of paints, colors, materials, or textures that are presented may also include one or more details or information that are presented in association with the paints, colors, materials, or textures, such as type, category, name, user ratings, number of positive or negative user reviews or ratings, shipping or delivery options, seller, brand, or manufacturer information, or various other details or information associated with the paints, colors, materials, or textures.

In some example embodiments, to improve user experience, the example user interface may initially be presented with two-dimensional images that may be processed and presented relatively quickly, and upon processing or loading associated three-dimensional models, the three-dimensional models may replace the two-dimensional images within the user interface to provide a more immersive, three-dimensional experience within the virtual reality environment. In other example embodiments, a user may set or select a preference or default setting for either two-dimensional images or three-dimensional models to be presented via the user interface.

Figure 11:
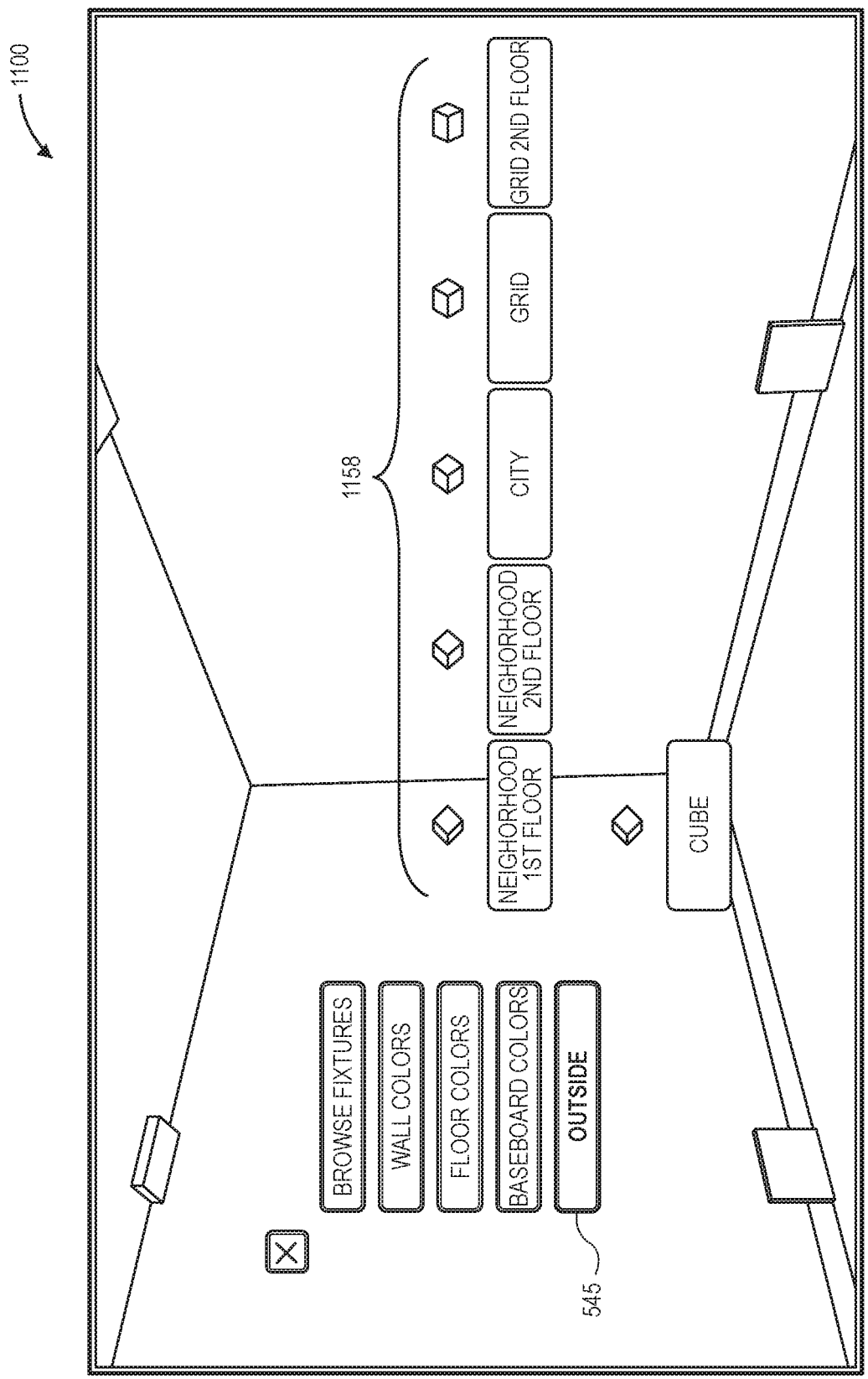
FIG. 11 is a schematic diagram of an example user interface to browse and select outside environments within a virtual reality environment, in accordance with implementations of the present disclosure.

FIG. 11 is a schematic diagram 1100 of an example user interface to browse and select outside environments within a virtual reality environment, in accordance with implementations of the present disclosure.

As shown in FIG. 11, the example user interface may include a plurality of selectable options in a left hand column or panel, and a browse interface 1158 for various outside environments presented as a two-dimensional grid view user interface in a middle column or panel. The plurality of selectable options may include a browse fixtures button, a wall colors button, a floor colors button, a baseboard colors button, an outside environment 545 button, and a close button, as described at least with respect to FIG. 5. Various other selectable options may also be included in the example user interface, as further described herein.

Responsive to selection of the outside environment 545 button, various outdoor environments or scenes that may be applied to environments outside the room or space within the virtual reality environment may be presented within the browse interface 1158 for selection by a user. Each of the plurality of outdoor environments or scenes that may be applied to environments outside the room or space may be presented as a two-dimensional image or a three-dimensional model. Further, each of the plurality of outdoor environments or scenes that are presented may also include one or more details or information that are presented in association with the outdoor environments or scenes, such as type, category, name, user ratings, number of positive or negative user reviews or ratings, or various other details or information associated with the outdoor environments or scenes.

In example embodiments, the outdoor environments or scenes may include a neighborhood $1^{st}$ floor selectable option that may present a suburban outdoor environment from a general elevation of a first or ground floor, a neighborhood $2^{nd}$ floor selectable option that may present a suburban outdoor environment from a general elevation of a second or raised floor, a city $1^{st}$ floor selectable option that may present an urban outdoor environment from a general elevation of a first or ground floor, a city $2^{nd}$ floor selectable option that may present an urban outdoor environment from a general elevation of a second or raised floor, a grid $1^{st}$ floor selectable option that may present a substantially endless or infinite, horizontal grid or ground surface extending away from the room or space from a general elevation of a first or ground floor, a grid $2^{nd}$ floor selectable option that may present a substantially endless or infinite, horizontal grid or ground surface extending away from the room or space from a general elevation of a second or raised floor, or a cube selectable option that may present a substantially closed cube having faces adjacent to and extending around the surfaces of the room or space.

Further, an outdoor environment or scene may be automatically selected and presented within a virtual reality environment, e.g., based on information associated with a user and/or information associated with a virtual reality device. For example, responsive to a user opting in and providing information related to a home, office, or other location associated with the user, an outdoor environment that is similar or related to an actual outdoor environment at a location associated with a home, office, or other location associated with the user may be automatically selected and presented within the virtual reality environment. Further, responsive to a user opting in and providing current location information, e.g., via a location sensor or location data associated the virtual reality device, an outdoor environment that is similar or related to an actual outdoor environment at a current location associated with the user or the virtual reality device may be automatically selected and presented within the virtual reality environment.

In some example embodiments, to improve user experience, the example user interface may initially be presented with two-dimensional images that may be processed and presented relatively quickly, and upon processing or loading associated three-dimensional models, the three-dimensional models may replace the two-dimensional images within the user interface to provide a more immersive, three-dimensional experience within the virtual reality environment. In other example embodiments, a user may set or select a preference or default setting for either two-dimensional images or three-dimensional models to be presented via the user interface.

Although FIGS. 2-11 describe modifications to various aspects associated with floor surfaces, wall surfaces, ceiling surfaces, baseboard surfaces, windows, or outside environments, in additional example embodiments, various aspects associated with other fixtures or portions of the rooms or spaces within virtual reality environments may also be modified, such as doors, fireplaces, cased openings, stairs, columns, islands, countertops, shelves, built-in storage, ceiling rafters, vaulted ceilings, crown moldings, electrical outlets, switches, appliances, lighting, vents, radiators, or other fixtures or portions of the rooms or spaces, including aspects such as paint, color, material, texture, surface, finish, dimensions, positions, orientations, or other aspects.

In further example embodiments, the various fixtures described herein may comprise objects that may be designed, manufactured, built, purchased, and/or shipped to one or more users using one or more design, manufacturing, assembly, commerce, and/or delivery entities having associated capabilities. Likewise, the various modifiable aspects, e.g., paint, wallpaper, flooring, baseboards, or other aspects, associated with environment surfaces and/or portions of fixtures may also comprise objects that may be designed, manufactured, built, purchased, and/or shipped to one or more users using one or more design, manufacturing, assembly, commerce, and/or delivery entities having associated capabilities. Further, an appropriate amount of modifiable aspects of objects, such as paint, wallpaper, or flooring, may be recommended, suggested, and/or provided to users based on determined dimensions associated with rooms or spaces that have been generated and modified by users. Moreover, one or more services associated with modifiable aspects of objects, such as painting services or flooring services, may be recommended or suggested together with purchase and/or delivery of such aspects.

In further example embodiments, the lighting associated with a room or space within a virtual reality environment may include simulated lighting that is substantially uniform throughout the generated and/or modified room or space. In other example embodiments, in order to increase or improve the realism of a generated and modified room or space within a virtual reality environment, a lighting simulation, e.g., using various associated techniques or algorithms, may be performed based on various modifications to aspects of the room or space, including changes to various environment surfaces, placement, movement, and resizing of various fixtures, and/or placement and movement of lighting fixtures or light sources within the room or space as well as in the outside environment. In this manner, the immersive effect of the generated and modified room or space within the virtual reality environment may be enhanced.

Figure 12A:
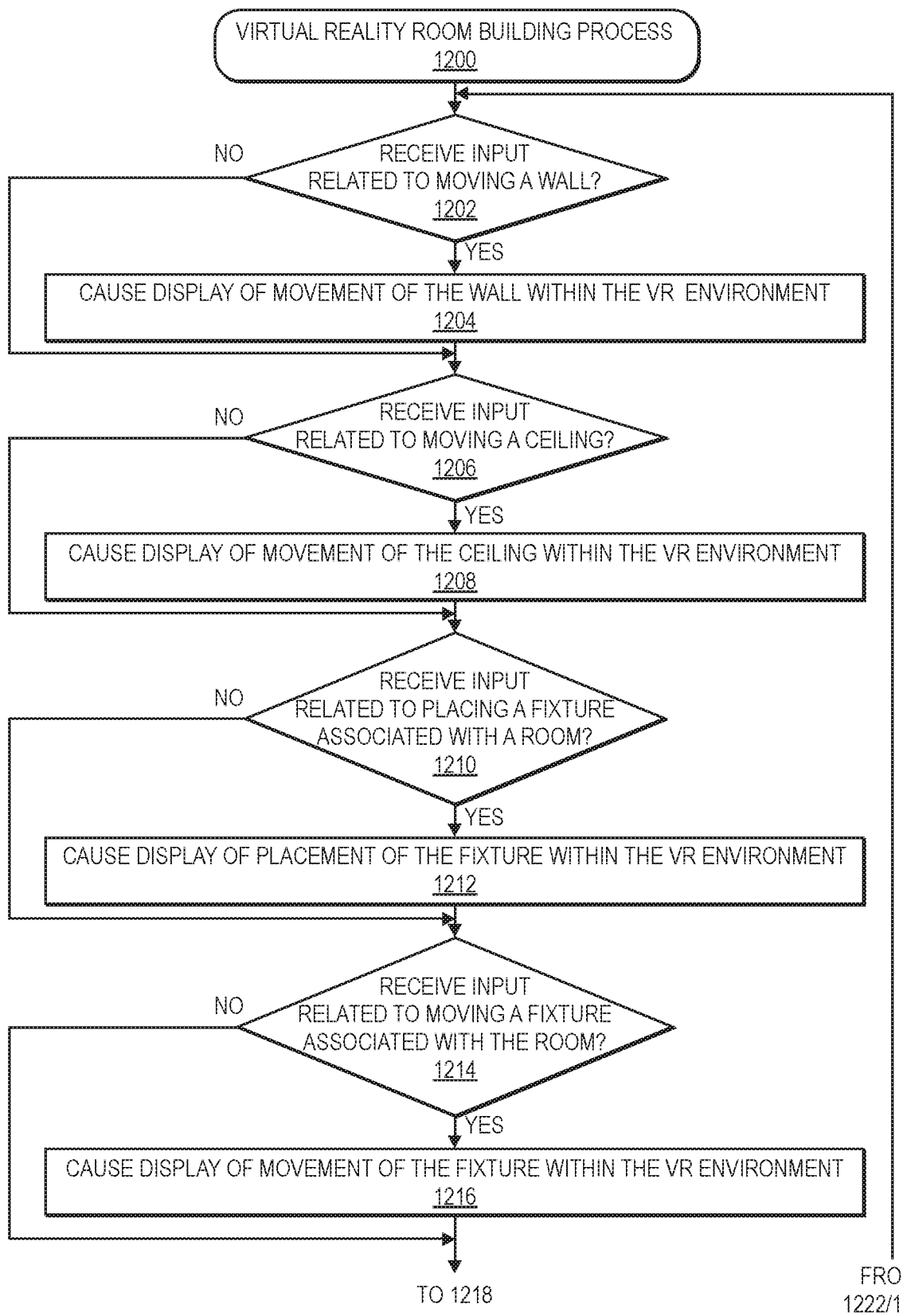
FIGS. 12A and 12B are a flow diagram illustrating an example virtual reality room building process, in accordance with implementations of the present disclosure.
Figure 12B:
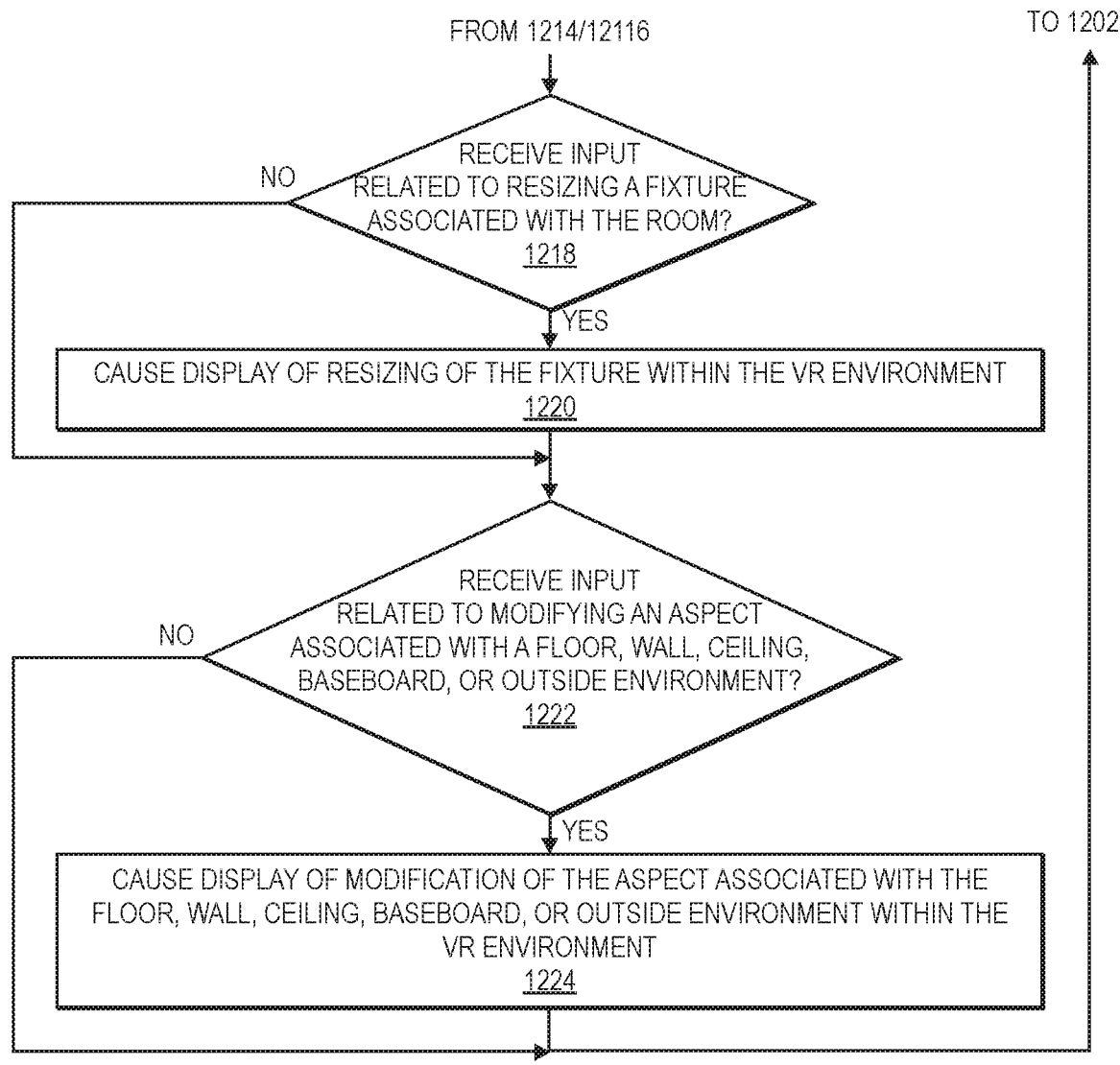

FIGS. 12A and 12B are a flow diagram illustrating an example virtual reality room building process 1200, in accordance with implementations of the present disclosure.

The process 1200 may begin by determining whether input related to moving a wall is received, as at 1202. For example, the input may comprise a selection input received via a controller, an eye gaze detection over a threshold amount of time received via a virtual reality device, a gesture detected via a virtual reality device, and/or a voice input received via an audio input device, in which the input is associated with a portion of a wall surface and/or a grab point along the wall surface. Responsive to the selection input, one or more dimensions associated with the selected wall surface may be presented, such as a distance to an opposing wall surface, and one or more other dimensions associated with other environment surfaces or various fixtures may no longer be presented, such as dimensions associated with a floor surface, a ceiling surface, or various fixtures.

If an input related to moving a wall is received, then the process 1200 may continue by causing display of movement of the wall within the virtual reality environment, as at 1204. For example, the input may further comprise a movement input received via the controller, an eye gaze movement received via the virtual reality device, a gesture detected via a virtual reality device, and/or a voice input received via the audio input device following the selection input. Responsive to the movement input, one or more dimensions associated with the selected wall surface may be updated and presented substantially in real-time, such as a current distance to an opposing wall surface.

The process 1200 may proceed by determining whether input related to moving a ceiling is received, as at 1206. For example, the input may comprise a selection input received via a controller, an eye gaze detection over a threshold amount of time received via a virtual reality device, a gesture detected via a virtual reality device, and/or a voice input received via an audio input device, in which the input is associated with a portion of a ceiling surface and/or a grab point along the ceiling surface. Responsive to the selection input, one or more dimensions associated with the selected ceiling surface may be presented, such as a distance to a floor surface, and one or more other dimensions associated with other environment surfaces or various fixtures may no longer be presented, such as dimensions associated with a floor, wall surfaces, or various fixtures.

If an input related to moving a ceiling is received, then the process 1200 may continue to cause display of movement of the ceiling within the virtual reality environment, as at 1208. For example, the input may further comprise a movement input received via the controller, an eye gaze movement received via the virtual reality device, a gesture detected via a virtual reality device, and/or a voice input received via the audio input device following the selection input. Responsive to the movement input, one or more dimensions associated with the selected ceiling surface may be updated and presented substantially in real-time, such as a current distance to a floor surface.

The process 1200 may proceed to determine whether input related to placing a fixture associated with a room is received, as at 1210. For example, the input may comprise a selection input received via a controller, an eye gaze detection over a threshold amount of time received via a virtual reality device, a gesture detected via a virtual reality device, and/or a voice input received via an audio input device, in which the input is associated with a fixture, such as a door, window, cased opening, or others. Responsive to the selection input, one or more dimensions associated with the fixture may be presented along a surface on which the fixture is to be placed, such as distances to adjacent surfaces and/or fixtures, and one or more other dimensions associated with other fixtures or various environment surfaces may no longer be presented, such as dimensions associated with a floor, wall surfaces, a ceiling, or other fixtures.

If an input related to placing a fixture is received, then the process 1200 may continue with causing display of placement of the fixture within the virtual reality environment, as at 1212. For example, the input may further comprise a placement input received via the controller, an eye gaze placement over a threshold amount of time received via the virtual reality device, a gesture detected via a virtual reality device, and/or a voice input received via the audio input device following the selection input. Responsive to the placement input, one or more dimensions associated with the selected fixture may be updated and presented substantially in real-time, such as current distances to adjacent surfaces and/or fixtures.

The process 1200 may proceed with determining whether input related to moving a fixture associated with the room is received, as at 1214. For example, the input may comprise a selection input received via a controller, an eye gaze detection over a threshold amount of time received via a virtual reality device, a gesture detected via a virtual reality device, and/or a voice input received via an audio input device, in which the input is associated with a fixture, such as a door, window, cased opening, or others. Responsive to the selection input, one or more dimensions associated with the fixture may be presented along a surface on which the fixture is to be moved, such as distances to adjacent surfaces and/or fixtures, and one or more other dimensions associated with other fixtures or various environment surfaces may no longer be presented, such as dimensions associated with a floor, wall surfaces, a ceiling, or other fixtures.

If an input related to moving a fixture is received, then the process 1200 may continue by causing display of movement of the fixture within the virtual reality environment, as at 1216. For example, the input may further comprise a movement input received via the controller, an eye gaze movement received via the virtual reality device, a gesture detected via a virtual reality device, and/or a voice input received via the audio input device following the selection input. Responsive to the movement input, one or more dimensions associated with the selected fixture may be updated and presented substantially in real-time, such as current distances to adjacent surfaces and/or fixtures.

The process 1200 may proceed by determining whether input related to resizing a fixture associated with the room is received, as at 1218. For example, the input may comprise a selection input received via a controller, an eye gaze detection over a threshold amount of time received via a virtual reality device, a gesture detected via a virtual reality device, and/or a voice input received via an audio input device, in which the input is associated with a portion of a fixture, such as a door, window, cased opening, or others. Responsive to the selection input, one or more dimensions associated with the portion of the fixture may be presented along a surface on which the fixture is to be resized, such as a distance between the portion of the fixture and an adjacent surface and/or fixture, as well as a dimension associated with resizing of the portion of the fixture, and one or more other dimensions associated with other portions of the fixture, other fixtures, or various environment surfaces may no longer be presented, such as dimensions associated with a floor, wall surfaces, a ceiling, or other fixtures.

If an input related to resizing a fixture is received, then the process 1200 may continue to cause display of resizing of the fixture within the virtual reality environment, as at 1220. For example, the input may further comprise a resizing input received via the controller, an eye gaze movement received via the virtual reality device, a gesture detected via a virtual reality device, and/or a voice input received via the audio input device following the selection input. Responsive to the resizing input, one or more dimensions associated with the selected fixture may be updated and presented substantially in real-time, such as a current distance between the portion of the fixture and an adjacent surface and/or fixture, as well as a current dimension associated with the resized portion of the fixture.

The process 1200 may proceed to determine whether input related to modifying an aspect associated with a floor, wall, ceiling, baseboard, or outside environment is received, as at 1222. For example, the input may comprise a selection input received via a controller, an eye gaze detection over a threshold amount of time received via a virtual reality device, a gesture detected via a virtual reality device, and/or a voice input received via an audio input device, in which the input is associated with an aspect associated with a floor, wall, ceiling, baseboard, outside environment, other environment surfaces, or other fixtures. Responsive to the selection input, various selectable options for the aspect associated with the selected environment surface or fixture may be presented for selection by a user.

If an input related to modifying an aspect associated with a floor, wall, ceiling, baseboard, or outside environment is received, then the process 1200 may continue with causing display of modification of the aspect associated with a floor, wall, ceiling, baseboard, or outside environment within the virtual reality environment, as at 1224. For example, the input may further comprise a modification input received via the controller, an eye gaze detection over a threshold amount of time received via the virtual reality device, a gesture detected via a virtual reality device, and/or a voice input received via the audio input device following the selection input. Responsive to the modification input, the aspect associated with the selected environment surface or fixture may be modified and presented based on an option associated with the aspect and selected by a user.

The process 1200 may be repeated in various manners or sequences to cause placement, movement, resizing, modification, or other interactions with various aspects of environment surfaces and/or fixtures that may be presented within a virtual reality environment. Further, various portions or subsets of dimensions, grab points, and/or other data associated with environment surfaces and/or fixtures may be dynamically presented responsive to various user inputs, interactions, and/or selections, in order to present substantially only such dimensions, grab points, or other data that may be relevant to current functions, operations, or interactions by a user within the virtual reality environment. Further, various other functions, actions, or operations may be performed responsive to various other types of inputs or interactions described herein in the context of generation and modification of rooms or spaces within virtual reality environments.

Figure 13:
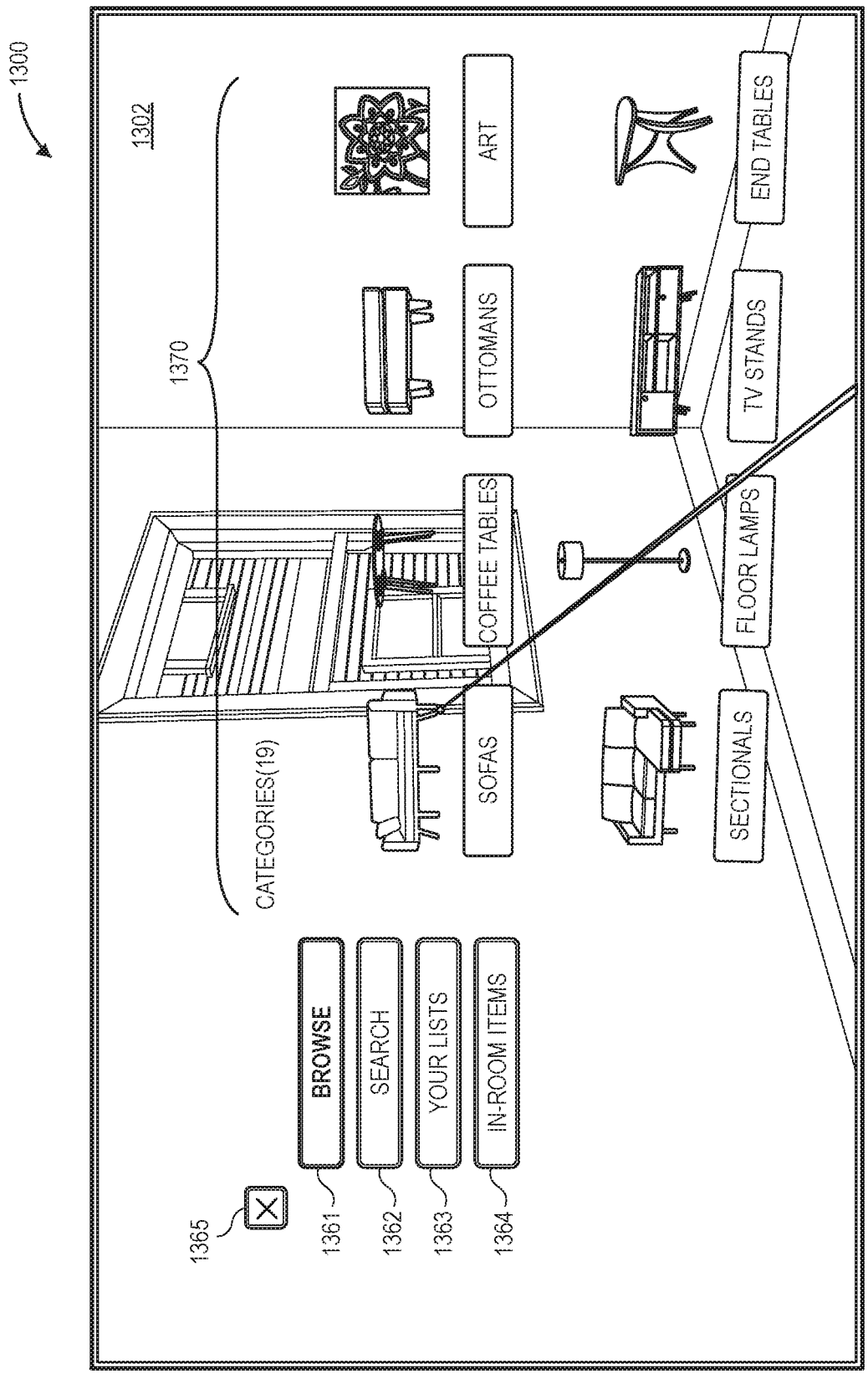
FIG. 13 is a schematic diagram of a portion of an example user interface to browse and select objects within a virtual reality environment, in accordance with implementations of the present disclosure.

FIG. 13 is a schematic diagram 1300 of a portion of an example user interface to browse and select objects within a virtual reality environment, in accordance with implementations of the present disclosure.

As shown in FIG. 13, upon selection of the search products 124 option as shown in FIG. 1, or upon initiation of a browse function via other inputs or selections within the virtual reality environment 1302, such as a browse button or find products button presented via other user interfaces, an example user interface including a plurality of types, categories, or subcategories of objects may be presented to a user within the virtual reality environment. Although not illustrated in FIG. 13, upon initiation of a browse function within the virtual reality environment, one or more selectable options associated with the menu 110 that may be attached or associated with the controller 105 may change. For example, additional selectable options may include a find products button and an edit room button. Various other selectable options may also be included in the menu 110, as further described herein.

For example, the find products button may present the example user interface, such as the view shown in FIG. 13. In addition, the edit room button may enable a user to modify aspects of a room or space within the virtual reality environment, such as environment surfaces, fixtures, and/or other aspects of a room or space, as further described herein at least with respect to FIGS. 2-12B. Moreover, the edit room button may also present various browse or search interfaces related to fixtures or various aspects of a room or space, as further described herein.

As shown in FIG. 13, the example user interface may include a plurality of selectable options in a left hand column or panel, and a category or catalog browse interface 1370 for furniture, furnishings, or other objects presented as a two-dimensional grid view user interface in a middle column or panel. The plurality of selectable options may include a browse 1361 button, a search 1362 button, a view lists 1363 button, an in-room items 1364 button, and a close 1365 button. Various other selectable options may also be included in the example user interface, as further described herein.

For example, the browse 1361 button may present various category or catalog browse or search interfaces for furniture, furnishings, fixtures, or other objects, such as the view shown in FIG. 13. In addition, the search 1362 button may present an example search interface to receive text or voice input related to searchable keywords or strings. Further, the view lists 1363 button may present various lists or groups of furniture, furnishings, or other objects, whether designed or curated by others or generated by a user. Moreover, the in-room items 1364 button may present one or more lists or groups of furniture, furnishings, or other objects that are currently presented within the room or space of the virtual reality environment. In addition, the close 1365 button may cause the example user interface to be closed and no longer presented to a user within the virtual reality environment.

Furthermore, as shown in FIG. 13, the category or catalog browse interface 1370 for furniture, furnishings, or other objects may include various types, categories, or subcategories of objects, including sofas, coffee tables, ottomans, art, sectionals, floor lamps, TV stands, end tables, etc. Each of the plurality of types, categories, or subcategories of objects may be presented as a two-dimensional image or a three-dimensional model that is associated with each of the types, categories, or subcategories of objects. Further, each of the types, categories, or subcategories of objects that are presented may also include one or more details or information that are presented in association with the types, categories, or subcategories of objects, such as type, category, name, user ratings, number of positive or negative user reviews or ratings, shipping or delivery options, seller, brand, or manufacturer information, or various other details or information associated with the types, categories, or subcategories of objects.

In some example embodiments, to improve user experience, the example user interface may initially be presented with two-dimensional images that may be processed and presented relatively quickly, and upon processing or loading associated three-dimensional models, the three-dimensional models may replace the two-dimensional images within the user interface to provide a more immersive, three-dimensional experience within the virtual reality environment. In other example embodiments, a user may set or select a preference or default setting for either two-dimensional images or three-dimensional models to be presented via the user interface.

In example embodiments, the plurality of types, categories, or subcategories of objects presented via the user interface may be presented in a same relative scale, such that sofas, chairs, tables, or other types, categories, or subcategories of objects that are presented together via the user interface may be viewed, evaluated, or compared in a same relative scale. In other example embodiments, the plurality of types, categories, or subcategories of objects presented via the user interface may be presented in different relative scales, such that types, categories, or subcategories of objects of different sizes that are presented together via the user interface may be viewable and recognizable in their different relative scales.

Figure 14:
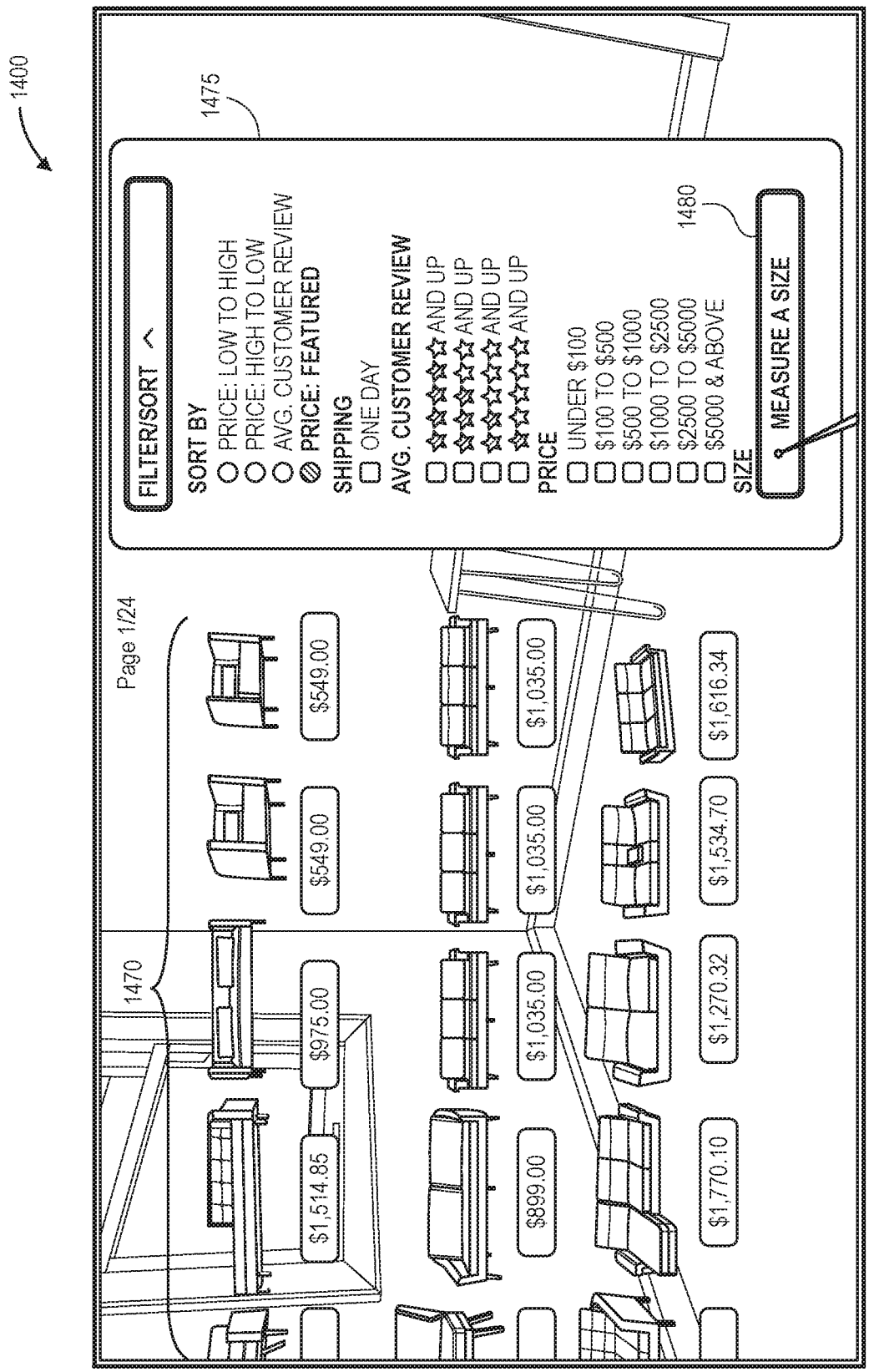
FIG. 14 is a schematic diagram of another portion of an example user interface to browse and select objects within a virtual reality environment, in accordance with implementations of the present disclosure.

FIG. 14 is a schematic diagram of another portion 1400 of an example user interface to browse and select objects within a virtual reality environment, in accordance with implementations of the present disclosure.

As shown in FIG. 14, upon selection of the search products 124 option as shown in FIG. 1, upon initiation of a browse function via other inputs or selections within the virtual reality environment, such as a browse button or find products button presented via other user interfaces, and/or upon selection of a type, category, and/or subcategory of objects presented via a two-dimensional grid view user interface, such as the view shown in FIG. 13, an example user interface including a plurality of objects, e.g., a plurality of sofas, may be presented to a user within the virtual reality environment. Upon initiation of a browse function within the virtual reality environment, one or more selectable options associated with the menu 110 that may be attached or associated with the controller 105 may change. For example, as described herein, additional selectable options may include a find products button and an edit room button. Various other selectable options may also be included in the menu 110, as further described herein.

With respect to FIG. 14, the example user interface may include a plurality of selectable options (not shown) in a left hand column or panel, an object browse interface 1470 for furniture, furnishings, or other objects presented as a two-dimensional grid view user interface in a middle column or panel, and a plurality of filter options 1475 in a right hand column or panel. As described herein at least with respect to FIG. 13, the plurality of selectable options may include a browse button, a search button, a lists button, an items in this room button, and a close button. Various other selectable options may also be included in the example user interface, as further described herein.

The object browse 1470 interface for furniture, furnishings, or other objects may include a plurality of objects, including furniture, furnishings, or other objects associated with a selection of a type, category, and/or subcategory of objects, e.g., various different types of sofas and couches. Each of the plurality of objects may be presented as a two-dimensional image or a three-dimensional model that is associated with each of the objects. Further, each of the objects that are presented may also include one or more details or information that are presented in association with the objects, such as type, category, name, price, user rating, number of positive or negative user reviews or ratings, shipping or delivery options, seller, brand, or manufacturer information, material, color, dimensions, or any other aspect or characteristic of the object.

In some example embodiments, to improve user experience, the example user interface may initially be presented with two-dimensional images that may be processed and presented relatively quickly, and upon processing or loading associated three-dimensional models, the three-dimensional models may replace the two-dimensional images within the user interface to provide a more immersive, three-dimensional experience within the virtual reality environment. In other example embodiments, a user may set or select a preference or default setting for either two-dimensional images or three-dimensional models to be presented via the user interface.

In example embodiments, the plurality of objects presented and arranged via the user interface may be presented in a same relative scale, such that the various objects that are presented together via the user interface may be viewed, evaluated, or compared in a same relative scale. In other example embodiments, the plurality of objects presented and arranged via the user interface may be presented in different relative scales, such that the various objects of different sizes that are presented together via the user interface may be viewable and recognizable in their different relative scales.

The plurality of filter options 1475 in the right hand column or panel may include various filters and a measure a size button 1480. The various filters may include aspects or characteristics associated with one or more objects presented via the user interface, such as sort by, price, user rating, brand, type, category, style, size, shape, dimensions, mass, weight, volume, color, texture, pattern, material, availability, purchase options, shipping options, or other aspects or characteristics of objects. For example, responsive to selection of one or more filters, the plurality of objects presented via the user interface may be modified based on the selected filters.

Further, the measure a size button 1480 may cause presentation, selection, and determination of a dimensional filter based at least in part on one or more dimensional filter cues presented within the virtual reality environment. For example, responsive to selection of the measure a size button 1480, the presentation of the user interface including a plurality of objects, as shown in FIG. 14, may fade or no longer be presented, and one or more dimensional filter cues associated with a dimensional filter for objects may be presented for manipulation, interaction, and/or selection by a user within the virtual reality environment, as described further herein with respect to FIGS. 15-17.

In some example embodiments, the dimensional filter for objects may be selected and determined without regard to any prior selections of a type, category, or subcategory of objects by a user, such that the dimensional filter may be applied to any type, category, or subcategory of objects that may be filtered and presented to a user for browsing, selection, and/or placement within a virtual reality environment. In other example embodiments, the dimensional filter for objects may be selected and determined based at least in part on one or more selections of a type, category, or subcategory of objects by a user, e.g., various different types of sofas and couches, as described herein with respect to FIGS. 13-14, such that the dimensional filter may be applied only to the selected type, category, or subcategory of objects, e.g., various different types of sofas and couches, that may be filtered and presented to a user for browsing, selection, and/or placement within a virtual reality environment.

Figure 15:
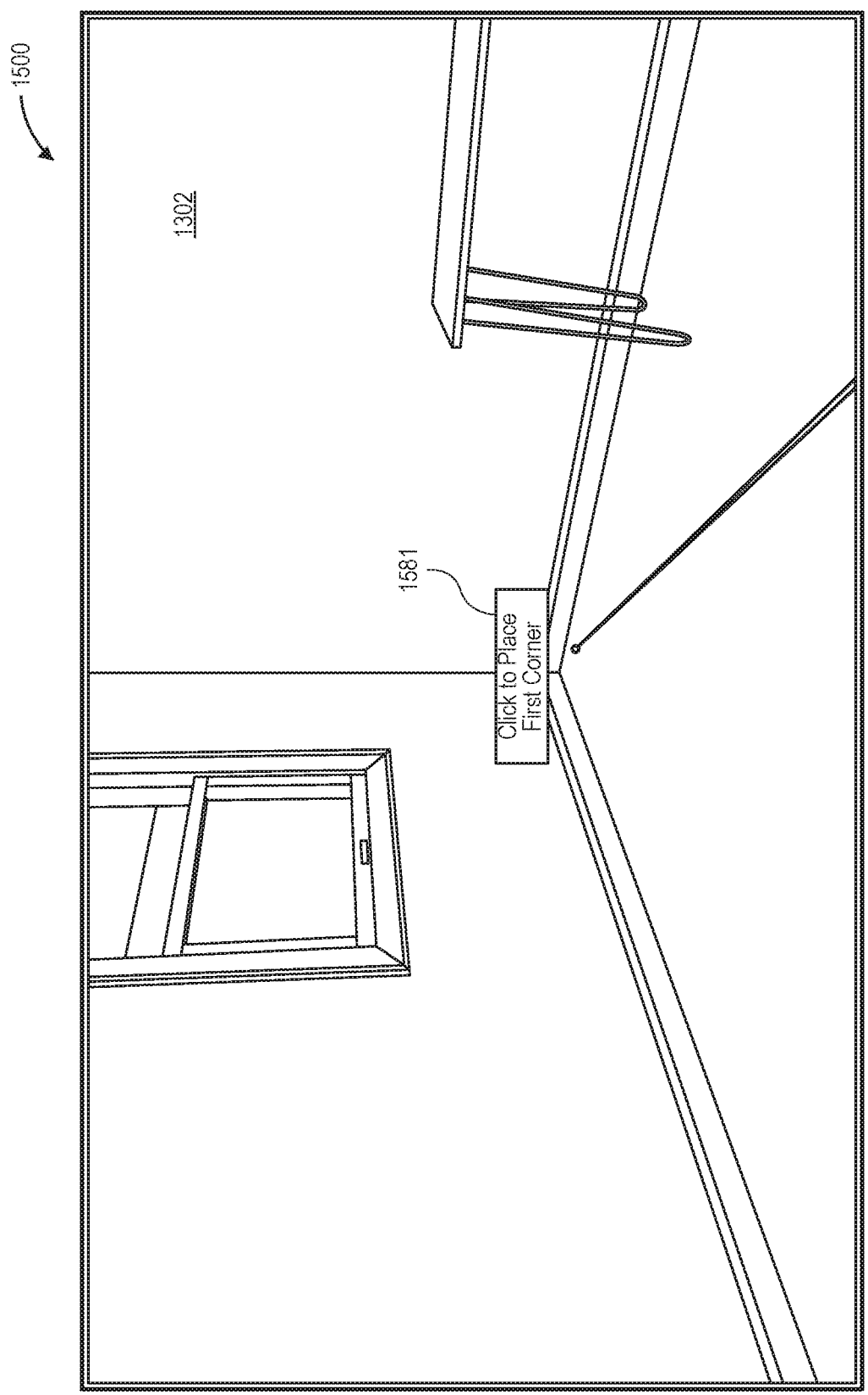
FIG. 15 is a schematic diagram of a portion of an example dimensional object filter within a virtual reality environment, in accordance with implementations of the present disclosure.

FIG. 15 is a schematic diagram 1500 of a portion of an example dimensional object filter within a virtual reality environment, in accordance with implementations of the present disclosure.

As shown in FIG. 15, responsive to selection of the measure a size button 1480, as shown in FIG. 14, the presentation of the user interface including a plurality of objects may fade or no longer be presented, and one or more dimensional filter cues associated with a dimensional filter for objects may be presented for manipulation, interaction, and/or selection by a user within the virtual reality environment 1302.

For example, a first dimensional filter cue 1581 may be presented in association with a laser pointer or pointing device of a controller 105, and the first dimensional filter cue 1581 may be presented at an intersection between the pointing device of the controller 105 and an environment surface, e.g., a floor surface, presented within the virtual reality environment 1302. In some example embodiments, the first dimensional filter cue 1581 may include text or instructions, such as "Click to Place First Corner." In this manner, a user may be instructed to begin selection of at least one dimension associated with the dimensional filter for objects.

Responsive to receiving a selection input associated with the first dimensional filter cue 1581, e.g., based on directing or aiming a pointing device and pressing a button or other input element associated with the controller 105 while pointing to an environment surface presented within the virtual reality environment, a first dimensional point may be selected or determined at a location of the intersection between the pointing device of the controller 105 and the environment surface, e.g., a first point along the floor surface, at which the selection input was received. The selected first dimensional point may then be used to determine at least one dimension associated with the dimensional filter for objects.

Figure 16:
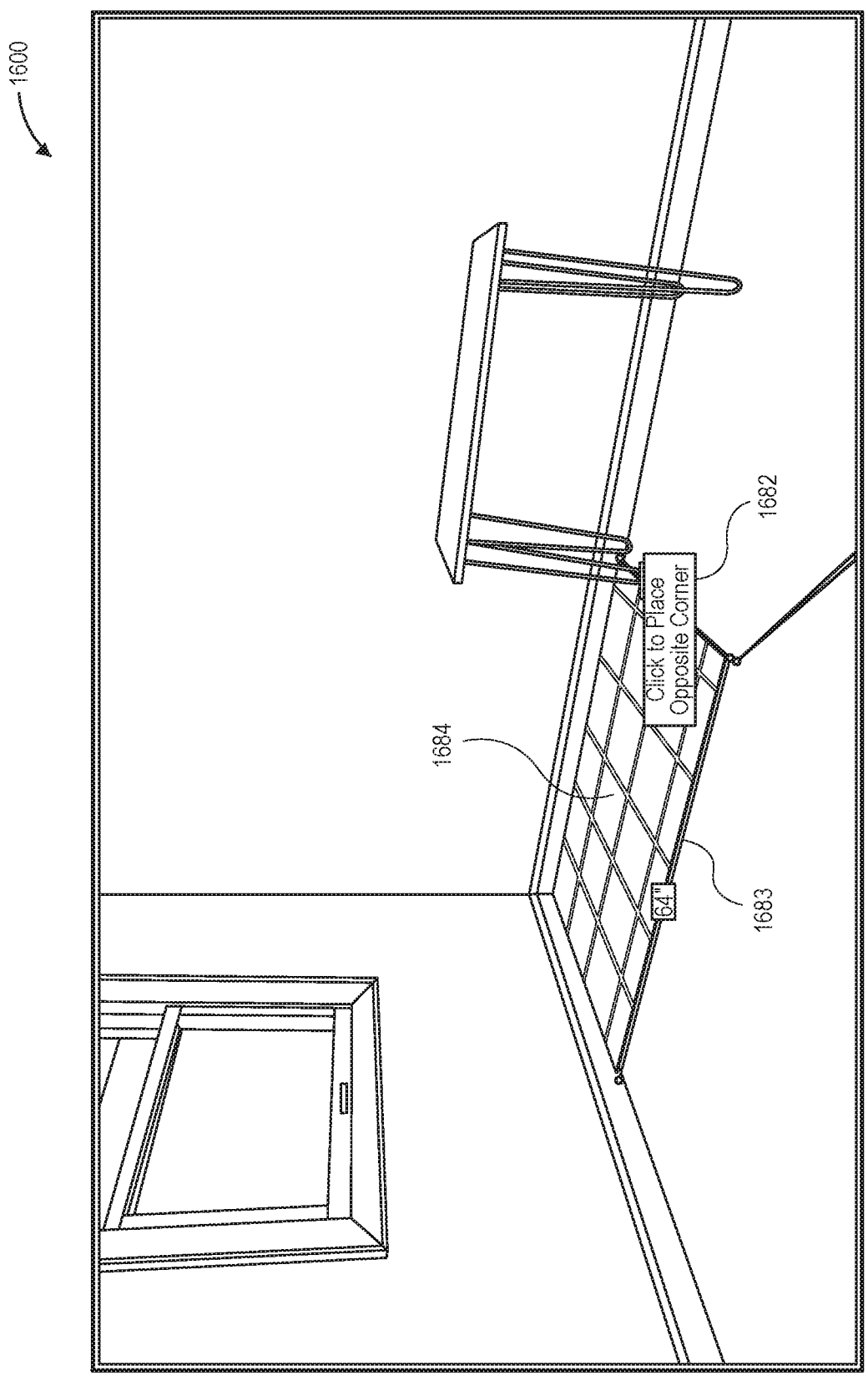
FIG. 16 is a schematic diagram of another portion of an example dimensional object filter within a virtual reality environment, in accordance with implementations of the present disclosure.

FIG. 16 is a schematic diagram 1600 of another portion of an example dimensional object filter within a virtual reality environment, in accordance with implementations of the present disclosure.

As shown in FIG. 16, responsive to selection of a first dimensional point associated with the first dimensional cue 1581, as shown in FIG. 15, one or more additional dimensional filter cues associated with the dimensional filter for objects may be presented for manipulation, interaction, and/or selection by a user within the virtual reality environment 1302.

For example, a second dimensional filter cue 1682 may be presented in association with a laser pointer or pointing device of a controller 105, and the second dimensional filter cue 1682 may also be presented at an intersection between the pointing device of the controller 105 and an environment surface, e.g., a floor surface, presented within the virtual reality environment 1302. In some example embodiments, the second dimensional filter cue 1682 may include text or instructions, such as "Click to Place Opposite Corner." In this manner, a user may be instructed to continue selection of at least one dimension associated with the dimensional filter for objects.

Responsive to receiving a selection input associated with the second dimensional filter cue 1682, e.g., based on directing or aiming a pointing device and pressing a button or other input element associated with the controller 105 while pointing to an environment surface presented within the virtual reality environment, a second dimensional point may be selected or determined at a location of the intersection between the pointing device of the controller 105 and the environment surface, e.g., a second point along the floor surface, at which the selection input was received. The selected first and second dimensional points may then be used to determine at least one dimension associated with the dimensional filter for objects.

As shown in FIG. 16, in some example embodiments, the selected dimensional filter 1684 may comprise a square or rectangular two-dimensional shape, and one or more dimensions 1683 of the selected dimensional filter 1684 may be presented to a user. The square or rectangular two-dimensional shape may be automatically positioned or oriented such that sides of the rectangular two-dimensional shape are substantially parallel to edges, lines, surfaces, or planes associated with environment surfaces, e.g., the floor surface, one or more wall surfaces, and/or the ceiling surface, within the virtual reality environment.

In other example embodiments, the selected dimensional filter 1684 may comprise shapes other than a square or rectangular two-dimensional shape, such as a one-dimensional line or length, a circle, oval, triangle, or other two-dimensional shape or area, and/or a three-dimensional cylinder, triangular prism, cube, rectangular prism, or other three-dimensional shape or volume. For example, based on the first and second dimensional points selected responsive to the first and second dimensional filter cues, a one-dimensional line may be determined having a defined length, and a plurality of objects may be filtered for presentation to a user based at least in part on the defined length. In another example, based on the first and second dimensional points selected responsive to the first and second dimensional filter cues, a two-dimensional circle may be determined having a defined radius or diameter, and a plurality of objects may be filtered for presentation to a user based at least in part on the defined radius or diameter. In yet another example, based on the first, second, and one or more additional dimensional points selected responsive to the first, second, and one or more additional dimensional filter cues, a two-dimensional oval or ellipse may be determined having a defined major axis and minor axis, a two-dimensional triangle may be determined having defined vertices, sides, and/or angles, and/or various other two-dimensional shapes may be determined having defined corners, sides, and/or angles, and a plurality of objects may be filtered for presentation to a user based at least in part on the defined aspects of the various two-dimensional shapes or areas.

In further example embodiments, based on the first, second, and one or more additional dimensional points selected responsive to the first, second, and one or more additional dimensional filter cues, a three-dimensional cube or rectangular prism may be determined having a defined length, width, and height, and a plurality of objects may be filtered for presentation to a user based at least in part on the defined length, width, and height of the three-dimensional cube or rectangular prism. In another example, based on the first, second, and one or more additional dimensional points selected responsive to the first, second, and one or more additional dimensional filter cues, a three-dimensional cylinder may be determined having a defined radius or diameter and a defined height, and a plurality of objects may be filtered for presentation to a user based at least in part on the defined radius or diameter and defined height of the three-dimensional cylinder. In yet another example, based on the first, second, and one or more additional dimensional points selected responsive to the first, second, and one or more additional dimensional filter cues, various other three-dimensional prisms, shapes, or volumes may be determined having defined corners, edges, sides, surfaces, and/or angles, and a plurality of objects may be filtered for presentation to a user based at least in part on the defined aspects of the various three-dimensional shapes or volumes.

In additional example embodiments, a selected dimensional filter may be manipulatable within the virtual reality environment. For example, similar to the functions and operations related to selection, placement, movement, and resizing of fixtures within virtual reality environments described herein at least with respect to FIGS. 6 and 7, a selected dimensional filter may also be selected, moved, rotated, resized, and/or placed at a different location, position, or orientation within the virtual reality environment, e.g., using one or more grab points associated with the selected dimensional filter, or responsive to selection of one or more portions of the selected dimensional filter.

Figure 17:
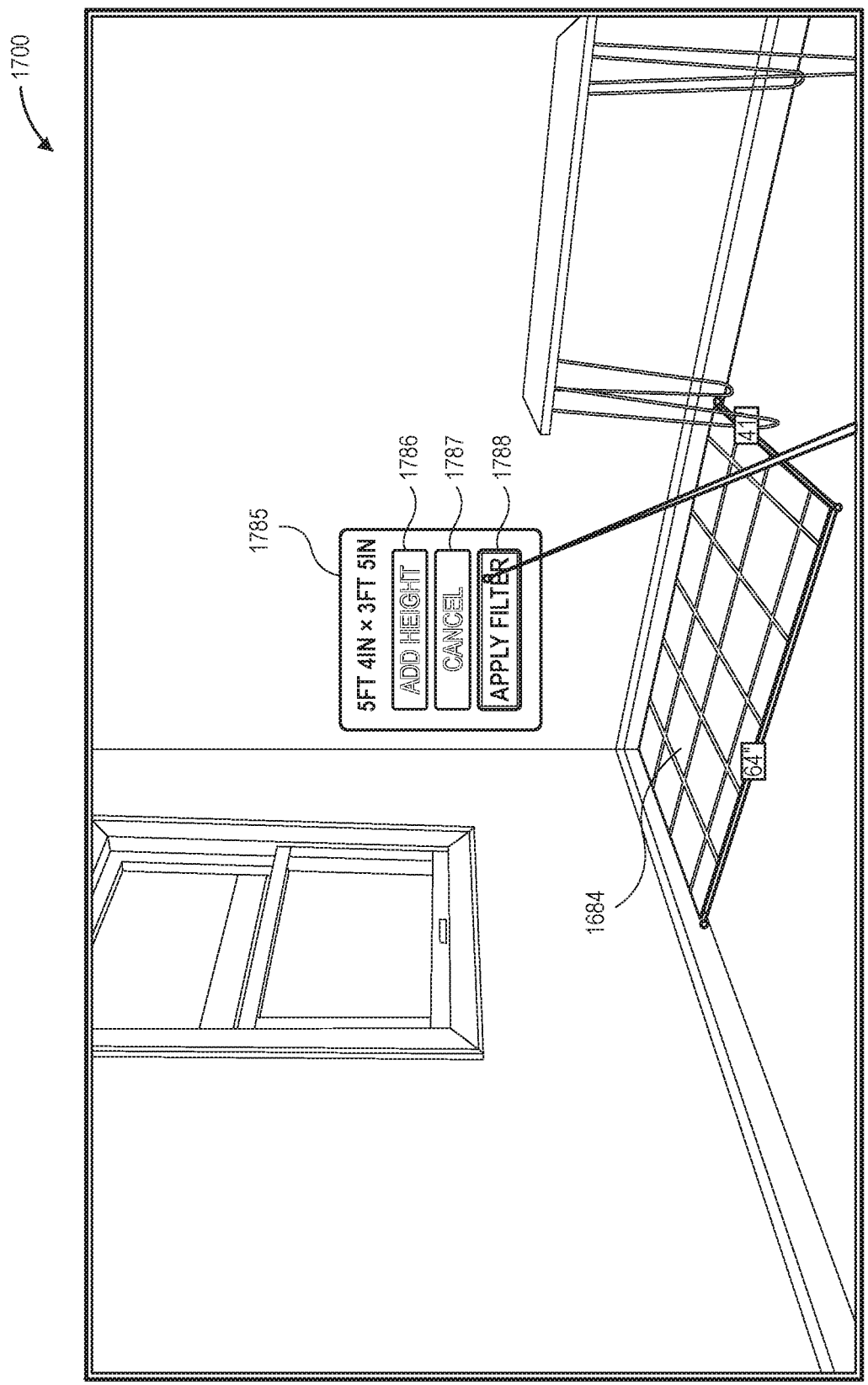
FIG. 17 is a schematic diagram of a further portion of an example dimensional object filter within a virtual reality environment, in accordance with implementations of the present disclosure.

FIG. 17 is a schematic diagram 1700 of a further portion of an example dimensional object filter within a virtual reality environment, in accordance with implementations of the present disclosure.

As shown in FIG. 17, responsive to selection of first, second, and/or one or more additional dimensional points associated with the first, second, and/or one or more additional dimensional filter cues, as shown in FIGS. 15 and 16, the selected dimensional filter 1684 may be presented for manipulation, interaction, and/or selection by a user within the virtual reality environment 1302, and a menu 1785 having one or more selectable options may also be presented for interaction by a user. For example, the menu 1785 may include an add height 1786 button, a cancel 1787 button, and an apply filter 1788 option. Various other selectable options may be included in the menu 1785, as further described herein.

Responsive to receiving a selection input associated with the add height 1786 button, e.g., based on directing or aiming a pointing device and pressing a button or other input element associated with the controller 105 while pointing to the add height 1786 button presented within the menu 1785 of the virtual reality environment, an additional dimensional filter cue may be presented in association with a laser pointer or pointing device of a controller 105, and the additional dimensional filter cue may be associated with a point, line, edge, surface, or plane that extends in an direction substantially perpendicular from a plane associated with the two-dimensional, selected dimensional filter 1684, as shown in FIG. 17, within the virtual reality environment 1302. In some example embodiments, the additional dimensional filter cue may also include text or instructions, such as "Click to Add Height." In this manner, a user may be instructed to continue selection of additional dimensions associated with the dimensional filter for objects.

Responsive to receiving a selection input associated with the additional dimensional filter cue, e.g., based on directing or aiming a pointing device and pressing a button or other input element associated with the controller 105 while pointing to a point, line, edge, surface, or plane that extends a selected height from a plane associated with the two-dimensional, selected dimensional filter 1684, as shown in FIG. 17, an additional dimensional point may be selected or determined at a location associated with the selected height between the pointing device of the controller 105 and the two-dimensional, selected dimensional filter 1684 at which the selection input was received. The selected first, second, and one or more additional dimensional points may then be used to determine additional dimensions associated with the dimensional filter for objects.

Responsive to receiving a selection input associated with the cancel 1787 button, e.g., based on directing or aiming a pointing device and pressing a button or other input element associated with the controller 105 while pointing to the cancel 1787 button presented within the menu 1785 of the virtual reality environment, the selected dimensional filter 1684 may be canceled or no longer presented, and the presentation of the virtual reality environment may return to the view shown in FIG. 13 to receive a selection of a type, category, or subcategory of objects, to the view shown in FIG. 14 to receive a selection of a particular object or another selection of the measure a size 1480 button, to the view shown in FIG. 15 to restart the selection and determi-nation of a dimensional filter for objects, and/or to a view of the room or space within the virtual reality environment.

Responsive to receiving a selection input associated with the apply filter 1788 button, e.g., based on directing or aiming a pointing device and pressing a button or other input element associated with the controller 105 while pointing to the apply filter 1788 button presented within the menu 1785 of the virtual reality environment, the selected dimensional filter 1684 may be selected or determined to filter a plurality of objects for presentation to a user of the virtual reality environment.

In example embodiments, responsive to selection of the apply filter 1788 button, a virtual reality device, or client device, may send or transfer data associated with the selected dimensional filter 1684 to a remote processor, or server computer. The data associated with the selected dimensional filter 1684 may include one or more dimensions, such as length, width, height, radius, diameter, points, lines, edges, angles, surfaces, areas, volumes, or other dimensional data. Based on the data associated with the selected dimensional filter 1684, the server computer may process the data, e.g., using point, line, edge, shape, area, volume, geometry, and/or other dimensional data matching algorithms or techniques, to identify a plurality of objects having associated dimensional data that matches the data associated with the selected dimensional filter 1684.

Various different thresholds or metrics may be used to determine whether dimensional data associated with an object matches data associated with a selected dimensional filter. In some embodiments, the data associated with the selected dimensional filter may comprise maximum dimensions, such that an object may match the selected dimensional filter if the dimensional data associated with the object is less than the maximum dimensions of the selected dimensional filter. In other embodiments, the data associated with the selected dimensional filter may comprise minimum dimensions, such that an object may match the selected dimensional filter if the dimensional data associated with the object is greater than the minimum dimensions of the selected dimensional filter. In further embodiments, the data associated with the selected dimensional filter may comprise approximate or desired dimensions having an associated tolerance or threshold, such that an object may match the selected dimensional filter if the dimensional data associated with the object is equal to the approximate or desired dimensions of the selected dimensional filter within the associated tolerance or threshold. The associated tolerance or threshold may comprise a percentage, e.g., within 1%, within 2%, within 5%, or other percentage of the approximate or desired dimensions, or the associated tolerance or threshold may comprise a value or amount, e.g., within 5 mm, within 5 cm, within 1 inch, within 6 inches, or within some other value or amount relative to the approximate or desired dimensions. Further, the associated tolerance or threshold may vary or depend upon a type, category, subcategory, size, shape, and/or dimensions of particular objects, such as sofas, tables, lamps, picture frames, or other types of objects. In further example embodiments, a determination of whether data associated with a selected dimensional filter comprises maximum dimensions, minimum dimensions, or approximate dimensions having associated tolerances may be selectable by a user within the virtual reality environment. Moreover, the determination of whether data associated with a selected dimensional filter comprises maximum dimensions, minimum dimensions, or approximate dimensions having associated tolerances may be automatically determined based on available space around the selected dimensional filter within the virtual reality environment, e.g., available space or gaps relative to adjacent environment surfaces or fixtures.

Responsive to identifying a plurality of objects having associated dimensional data that matches the data associated with the selected dimensional filter 1684, data associated with the plurality of objects may be sent or transferred to the virtual reality device for presentation to a user within the virtual reality environment.

Figure 18:
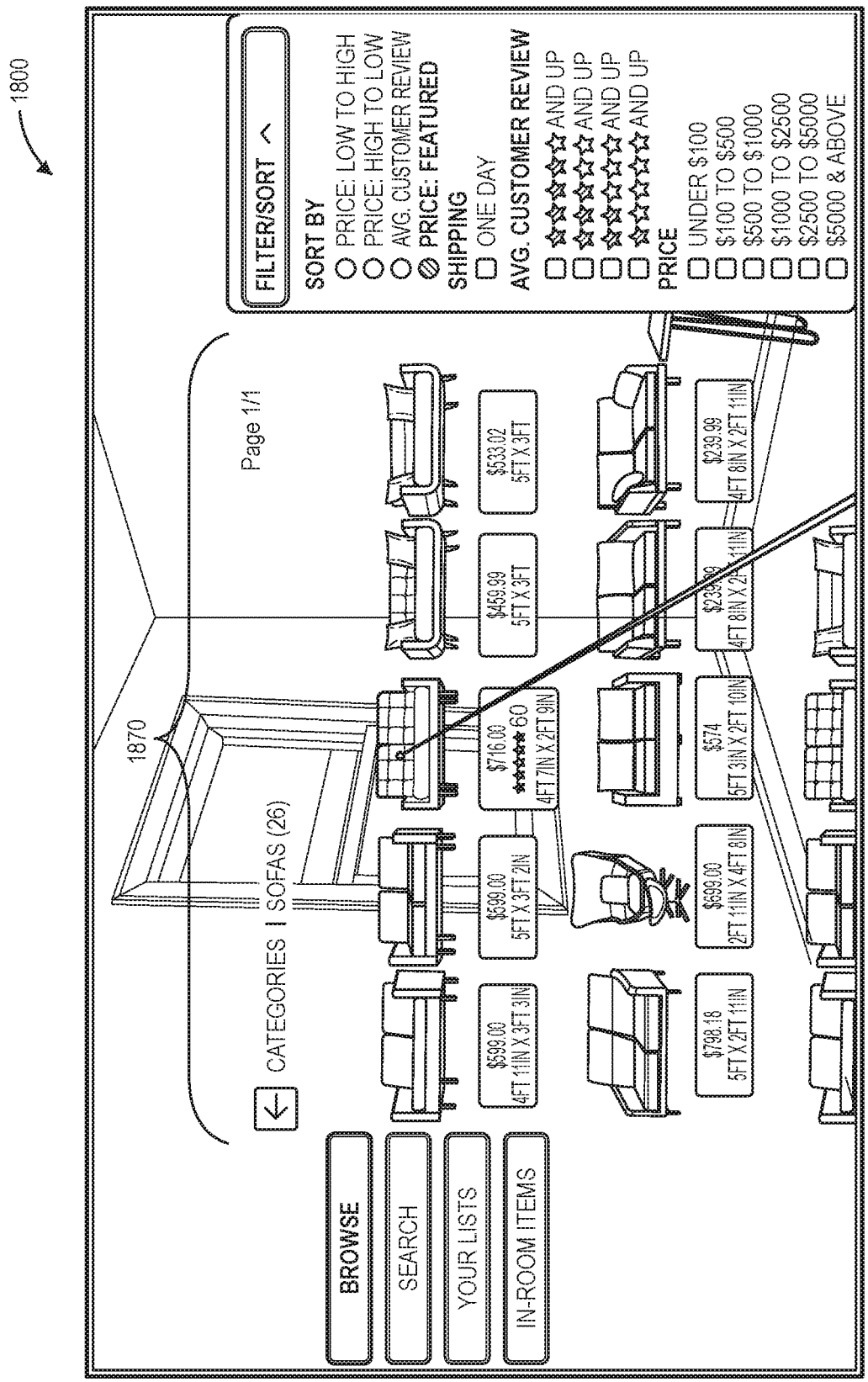
FIG. 18 is a schematic diagram of a portion of an example user interface to browse and select objects based on a dimensional object filter within a virtual reality environment, in accordance with implementations of the present disclosure.

FIG. 18 is a schematic diagram 1800 of a portion of an example user interface to browse and select objects based on a dimensional object filter within a virtual reality environment, in accordance with implementations of the present disclosure.

As shown in FIG. 18, responsive to a server computer receiving data associated with the selected dimensional filter, processing the data associated with the selected dimensional filter to identify a plurality of objects having dimensional data that matches the data associated with the selected dimensional filter, and transferring data associated with the plurality of objects that match the selected dimensional filter to the virtual reality device, the data associated with the plurality of objects may be presented by the virtual reality device to a user within the virtual reality environment.

As shown in FIG. 18, an example user interface including a plurality of objects that match the selected dimensional filter, e.g., a plurality of sofas, may be presented to a user within the virtual reality environment. The example user interface may include a plurality of selectable options in a left hand column or panel as described herein, an object browse interface 1870 including the plurality of objects that match the selected dimensional filter presented as a two-dimensional grid view user interface in a middle column or panel, and a plurality of filter options in a right hand column or panel as described herein.

The object browse 1870 interface may include a plurality of objects that match the selected dimensional filter, e.g., a plurality of sofas. Each of the plurality of objects may be presented as a two-dimensional image or a three-dimensional model that is associated with each of the objects. Further, each of the objects that are presented may also include one or more details or information that are presented in association with the objects, such as type, category, name, price, user rating, number of positive or negative user reviews or ratings, shipping or delivery options, seller, brand, or manufacturer information, material, color, dimensions, or any other aspect or characteristic of the object.

In some example embodiments, to improve user experience, the example user interface may initially be presented with two-dimensional images that may be processed and presented relatively quickly, and upon processing or loading associated three-dimensional models, the three-dimensional models may replace the two-dimensional images within the user interface to provide a more immersive, three-dimensional experience within the virtual reality environment. In other example embodiments, a user may set or select a preference or default setting for either two-dimensional images or three-dimensional models to be presented via the user interface.

In example embodiments, the plurality of objects presented and arranged via the user interface may be presented in a same relative scale, such that the various objects that are presented together via the user interface may be viewed, evaluated, or compared in a same relative scale. In other example embodiments, the plurality of objects presented and arranged via the user interface may be presented in different relative scales, such that the various objects of different sizes that are presented together via the user interface may be viewable and recognizable in their different relative scales.

Figure 19:
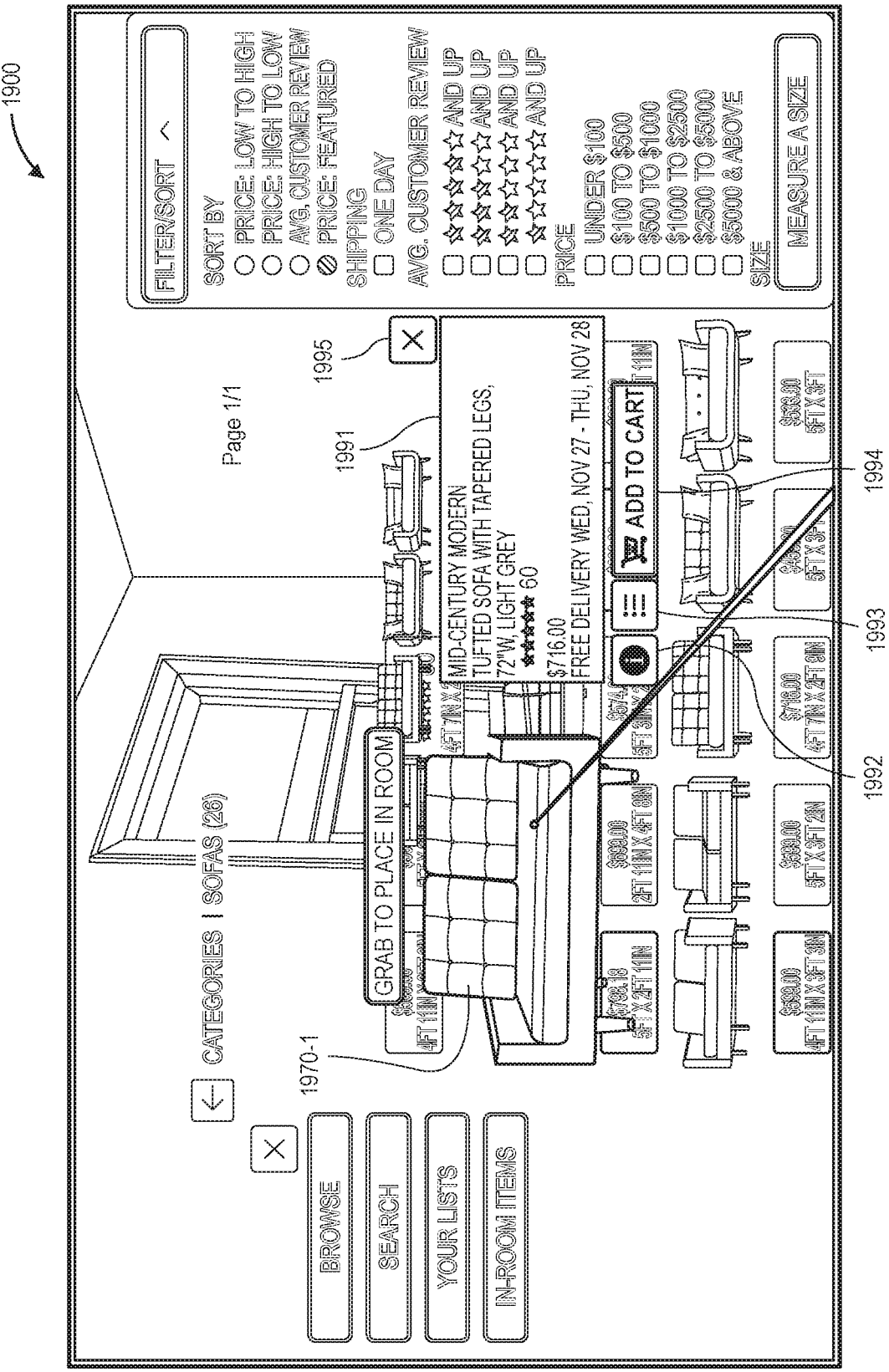
FIG. 19 is a schematic diagram of another portion of an example user interface to browse and select objects based on a dimensional object filter within a virtual reality environment, in accordance with implementations of the present disclosure.

FIG. 19 is a schematic diagram 1900 of another portion of an example user interface to browse and select objects based on a dimensional object filter within a virtual reality environment, in accordance with implementations of the present disclosure.

As shown in FIG. 19, responsive to receiving a selection input associated with an object, e.g., a particular sofa, from the plurality of presented objects that match the selected dimensional filter, as shown in FIG. 18, e.g., based on directing or aiming a pointing device and pressing a button or other input element associated with the controller 105 while pointing to the particular object presented within the user interface of the virtual reality environment, the selected object may be presented with one or more additional details for viewing, browsing, and selection by a user. Various additional details associated with the selected object may be presented, such as a name, price, user rating, brand, material, color, dimensions, shipping information, or any other aspect or characteristic of the selected object.

In the example shown in FIG. 19, upon receiving a selection input with respect to the object, e.g., a particular sofa, from the plurality of presented objects that match the selected dimensional filter, the additional details associated with the selected object may include a three-dimensional model 1970-1 of the selected object, a detail card 1991 associated with the selected object, a plurality of selectable options, such as a full details 1992 button, an add to list 1993 button, an add to shopping cart 1994 button, and a close 1995 button. In addition, the three-dimensional model 1970-1, the detail card 1991, and the selectable options may be presented as overlaying the user interface presenting the plurality of objects that match the selected dimensional filter, as well as overlaying the virtual reality environment, e.g., overlaying a room or space within the virtual reality environment. Further, the user interface and the room or space may be presented as darkened, dimmed, or grayed out in order to facilitate user focus and interaction with the additional details associated with the selected object.

The three-dimensional model 1970-1 may be presented as a static or moving, e.g., rotating, model of the selected object. In addition, the three-dimensional model may be manipulated or interacted with by a user, e.g., to rotate, zoom, pan, or otherwise modify a view of the three-dimensional model. Further, in some example embodiments, the three-dimensional model may include various animations, e.g., related to key or interesting features of the selected object. In some example embodiments, to improve user experience, the additional details may initially be presented with a two-dimensional image of the selected object that may be processed and presented relatively quickly, and upon processing or loading an associated three-dimensional model, the three-dimensional model may replace the two-dimensional image within the additional details to provide a more immersive, three-dimensional experience within the virtual reality environment. In other example embodiments, a user may set or select a preference or default setting for either two-dimensional images or three-dimensional models to be presented via the additional details.

The detail card 1991 may include additional details associated with the selected object, such as badges, e.g., "Best Seller," name, materials, style, price, user rating, availability information, shipping information, or other aspects or characteristics of the selected object. In addition, the full details 1992 button may present a product detail page associated with the selected object that may include images, videos, all additional details, product options, user reviews, brand or manufacturer information, similar, related, or recommended products, or other information and details. The add to list 1993 button may enable a user to add the selected object to one or more lists that may be provided to or generated by a user. The add to shopping cart 1994 button may enable a user to add the selected object to a shopping cart or list including objects for potential purchase. In addition, the close 1995 button may cause the additional details to be closed and no longer presented to a user within the virtual reality environment, such that the user interface from which the object was selected is again presented to the user within the virtual reality environment.

Additional details related to various user interfaces and interactions therewith as shown and described herein at least with respect to FIGS. 13, 14, 18, and 19 are further described in U.S. patent application Ser. No. 16/711,190, filed Dec. 11, 2019, and entitled "User Interfaces for Browsing Objects in Virtual Reality Environments," and U.S. patent application Ser. No. 16/711,221, filed Dec. 11, 2019, and entitled "User Interfaces for Object Exploration in Virtual Reality Environments," the contents of each of which are herein incorporated by reference in their entirety.

Figure 20:
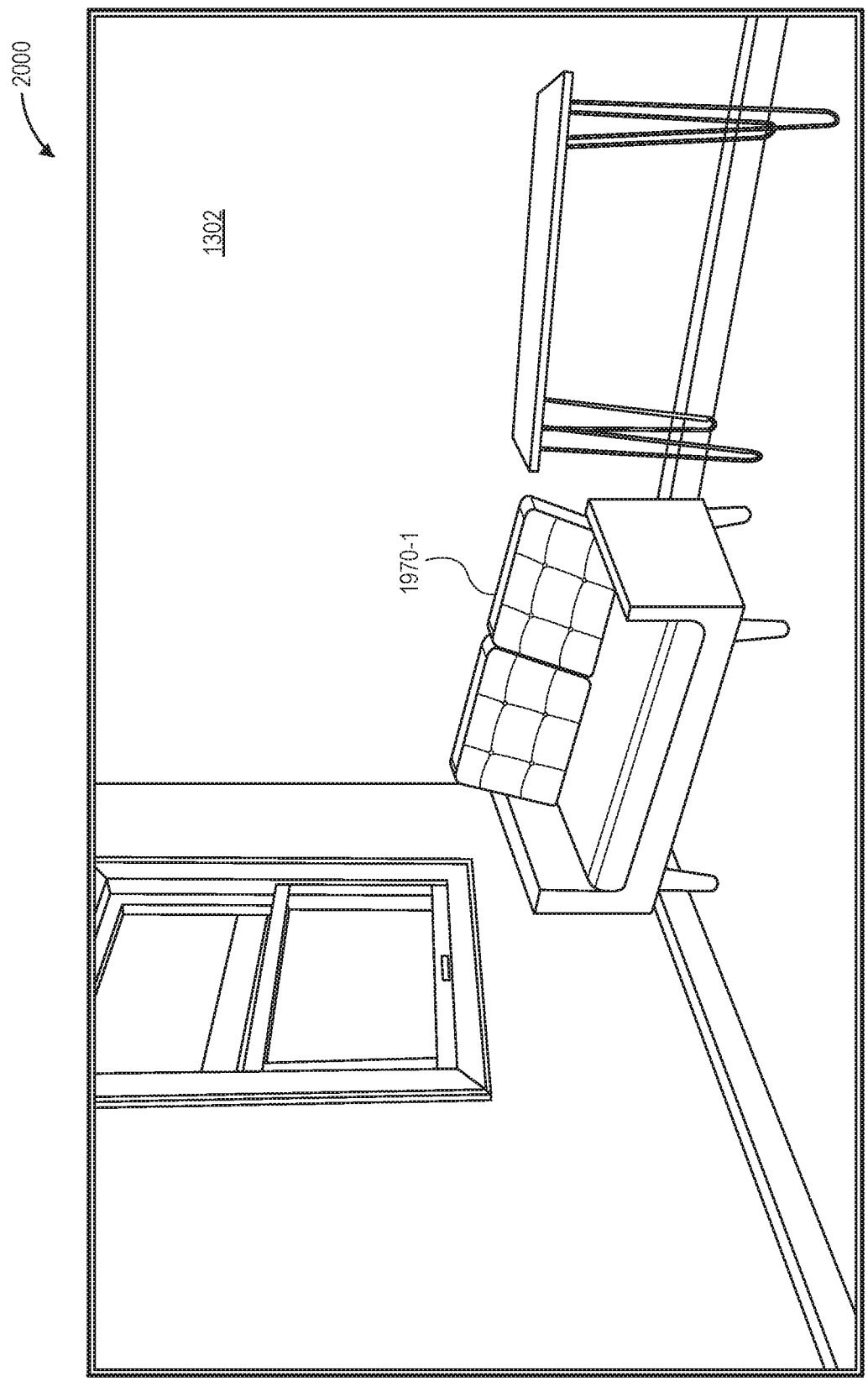
FIG. 20 is a schematic diagram of an example object selected and placed based on a dimensional object filter within a virtual reality environment, in accordance with implementations of the present disclosure.

FIG. 20 is a schematic diagram 2000 of an example object selected and placed based on a dimensional object filter within a virtual reality environment, in accordance with implementations of the present disclosure.

As shown in FIG. 20, responsive to receiving a selection input with respect to a particular object presented within the user interface of FIG. 18, and/or responsive to receiving a selection input with respect to a selected object presented with additional details of FIG. 19, e.g., based on directing or aiming a pointing device and pressing a button or other input element associated with the controller 105 while pointing to the particular or selected object, a three-dimensional model 1970-1 of the object may be placed within the virtual reality environment, e.g., within the room or space of the virtual reality environment. For example, responsive to receiving the selection input with respect to the selected object, the user interface presenting the plurality of objects that match the selected dimensional filter and/or additional details presented with respect to a selected object may fade or no longer be presented, and the three-dimensional model 1970-1 of the object may be placed within the selected dimensional filter of the room or space within the virtual reality environment.

Based on the position and orientation of the selected dimensional filter, the three-dimensional model of the object may be placed within the selected dimensions of the selected dimensional filter, e.g., positioned and oriented to fit within the selected dimensions of the selected dimensional filter. In addition, based on a user position within the environment, the three-dimensional model of the object may be automatically rotated to a particular position and orientation within the selected dimensional filter. For example, a selected object may be positioned and oriented such that the object, or a front surface of the object, substantially faces the user position. Further, based on one or more adjacent environment surfaces or fixtures, the three-dimensional model of the object may be automatically rotated to a particular position and orientation within the selected dimensional filter. For example, as shown in FIG. 20, based on one or more wall surfaces adjacent to the selected dimensional filter, and/or based on data associated with front, side, back, top, and/or bottom surfaces of the selected object, the three-dimensional model 1970-1 of the sofa may be positioned and oriented such that a back surface of the selected object is facing the wall surface, thereby minimizing or reducing additional movements, rotations, or modifications by a user to position or orient the selected object within the selected dimensional filter of the virtual reality environment.

In the example embodiments shown and described with respect to FIGS. 13-20, the dimensional filter is described as applied to a pre-selected type, category, or subcategory of objects, e.g., a category of sofas or couches. Thus, in addition to sending or transferring data associated with the selected dimensional filter to a server computer, additional data such as a pre-selected type, category, or subcategory of objects may also be sent or transferred to the server computer to process, identify, and return data associated with a plurality of objects that are also associated with the pre-selected type, category, or subcategory of objects, e.g., a category of sofas or couches. In other example embodiments, the dimensional filter may be sent or transferred to a server computer, without any additional data associated with a pre-selected type, category, or subcategory of objects, such that the dimensional filter may be applied to a plurality of types, categories, or subcategories of objects to identify and return data associated with a plurality of objects having dimensional data that matches the data associated with the selected dimensional filter.

In further example embodiments, various other additional data may also be selected or determined, and sent or transferred to a server computer to process, identify, and return data associated with a plurality of objects having dimensional data that matches the data associated with the selected dimensional filter, and that are also associated with the additional data. For example, the selected dimensional filter may comprise a plurality of selected dimensional filters, such as a selected maximum dimensional filter and a selected minimum dimensional filter, such that a plurality of objects having dimensional data that is smaller than the data associated with the selected maximum dimensional filter and having dimensional data that is larger than the data associated with the selected minimum dimensional filter may be identified and returned to the virtual reality device for presentation to a user. In addition to defining a range of sizes associated with a plurality of objects, determining both maximum and minimum dimensional filters may facilitate identification of modifiable, adjustable, extendible, or retractable objects that meet both the maximum and minimum dimensional filters, such as extendible dining tables, trundle beds, sofa beds, or other adjustable, expandable, or modifiable furniture, furnishings, or objects.

In other examples, the additional data may comprise data associated with a surface on which the selected dimensional filter was determined. Although the examples shown and described herein refer to dimensional filters placed on a floor surface, e.g., to identify objects such as sofas, tables, chairs, or others, in other example embodiments, the selected dimensional filter may be determined with respect to other surfaces, such as wall surfaces, ceiling surfaces, or surfaces associated with other objects. For example, data associated with a wall surface on which a selected dimensional filter is determined may be provided as additional data to a server computer to process, identify, and return a plurality of objects that may be placed on a wall surface, such as artwork, mirrors, picture frames, TVs, or others. In addition, data associated with a ceiling surface on which a selected dimensional filter is determined may be provided as additional data to a server computer to process, identify, and return a plurality of objects that may be placed on a ceiling surface, such as light fixtures, chandeliers, ceiling fans, or others. Further, data associated with a surface of another object on which a selected dimensional filter is determined, such as a tabletop, coffee table surface, desk surface, island, shelf, or other surface, may be provided as additional data to a server computer to process, identify, and return a plurality of objects that may be placed on another surface, such as desk lamps, bowls, picture frames, books, vases, various furnishings, or others.

In further examples, the additional data may comprise data associated with dimensions, sizes, positions, or orientations of environment surfaces and/or fixtures within a room or space in which the selected dimensional filter was determined. For example, overall room or space dimensions may be provided as additional data to a server computer to process, identify, and return a plurality of objects that may utilize an appropriate, recommended, or desired amount of space within the room or space without overwhelming the overall size of the room or space, which may comprise a percentage of the overall space or volume. Similarly, one or more floor dimensions may be provided as additional data to a server computer to process, identify, and return a plurality of objects that may utilize an appropriate, recommended, or desired amount of space on a floor surface within the room or space without overwhelming or crowding the floor surface within the room or space, which may comprise a percentage of the overall floor space or area. Likewise, one or more wall dimensions may be provided as additional data to a server computer to process, identify, and return a plurality of objects that may utilize an appropriate, recommended, or desired amount of space on or along a wall surface within the room or space without overwhelming or cluttering the wall surface within the room or space, which may comprise a percentage of the overall wall space or area.

In still further examples, the additional data may comprise data associated with a type, style, or theme associated with a room or space in which the selected dimensional filter was determined. For example, data associated with a type of room or space, such as bedroom, office, dining room, or others, may be provided as additional data to a server computer to process, identify, and return a plurality of objects that may be appropriate, recommended, or intended for the particular type of room or space. Similarly, data associated with a style of room or space, such as traditional, rustic, modern, contemporary, or others, may be provided as additional data to a server computer to process, identify, and return a plurality of objects that may be appropriate, recommended, or intended for the particular style of room or space. Likewise, data associated with a theme of room or space, such as colors, materials, textures, patterns, interests, hobbies, or others, may be provided as additional data to a server computer to process, identify, and return a plurality of objects that may be appropriate, recommended, or intended for the particular theme of the room or space. Further, data associated with other objects already presented within the room or space, including aspects associated with such objects, may be provided as additional data to a server computer to process, identify, and return a plurality of objects that may be appropriate, recommended, or complementary with the other objects that are already presented within the room or space.

In yet other examples, the additional data may comprise data associated with a user, such as standing height, seated height, seat depth, torso dimensions, leg dimensions, arm dimensions, or other characteristics, aspects, or measurements associated with a user, which may be received responsive to a user opting in to provide such additional data. For example, data associated with standing and seated heights, as well as comfortable seat depth, torso dimensions, leg dimensions, and/or arm dimensions, may be provided as additional data to a server computer to process, identify, and return a plurality of objects, e.g., desks and chairs, to furnish an office and provide ergonomic and comfortable furniture appropriate for the user. Similarly, data associated with comfortable seat depth, torso dimensions, and/or leg dimensions may be provided as additional data to a server computer to process, identify, and return a plurality of objects, e.g., sofas, dining table chairs, or others, to furnish a living room, den, or dining room and provide comfortable seating furniture appropriate for the user.

Various other types of additional data may also be provided to a server computer to process, identify, and return a plurality of objects having dimensional data that matches data associated with a selected dimensional filter, including but not limited to price, price thresholds, brands, colors, materials, user ratings, shipping options, delivery options, or any other types of data that may be used to filter the data associated with the plurality of objects that may be presented to a user within a virtual reality environment.

In additional example embodiments, the various dimensional filters described herein may also be generated, presented, modified, and used within augmented reality environments or other extended reality environments. For example, users may view augmented reality environments using various computing and/or display devices, such as mobile phones, tablets, laptop computers, or other computing devices, in which a camera or other image capture device captures imaging data of an actual environment, presents at least a portion of the actual environment via a display or presentation device, and presents or renders additional data or information via the display or presentation device to augment the presentation of the portion of the actual environment. When viewing such augmented reality environments, users may also generate, modify, and apply various dimensional filters as described herein, e.g., by drawing, touching, or outlining dimensional filters using a touchscreen, stylus, or other input device associated with a computing device, and based on the selected dimensional filters, users may search, filter, browse, and select various objects having dimensional data that match the selected dimensional filters for presentation within the augmented reality environments.

In further example embodiments, instead of a one-dimensional line or length, a two-dimensional shape or area, or a three-dimensional shape or volume, a selected dimensional filter may comprise a modifiable, three-dimensional model associated with a selected type, category, or subcategory of objects. For example, responsive to selection of a particular type, category, or subcategory of objects, e.g., sofas, a three-dimensional model of the selected type of object may be presented as a dimensional filter within the virtual reality environment. In addition, various dimensions or aspects of the three-dimensional model of a selected dimensional filter may be modifiable by a user. Continuing with the example of a three-dimensional model of a sofa, a length, width, or height of the sofa may be modified, a seating width or seating depth of the sofa may be modified, a seat back height of the sofa may be modified, an armrest width or armrest height of the sofa may be modified, and/or various other dimensions or aspects of the sofa may be modified. Then, the modified three-dimensional model of the sofa may be sent or transferred to a server computer as a selected dimensional filter to process, identify, and return a plurality of objects, e.g., one or more sofas, having dimensional data that matches the modified three-dimensional model of the sofa used as the selected dimensional filter. By using a three-dimensional model of a particular type, category, or subcategory of objects as a selected dimensional filter, the plurality of objects that may be identified and returned for presentation to a user may be further refined and narrowed according to a user's desires, such that a user may browse and find particular objects of interest in a much more intuitive and efficient manner over conventional text-based, category-based, menu-based, or textual-filter based systems.

Figure 21A:
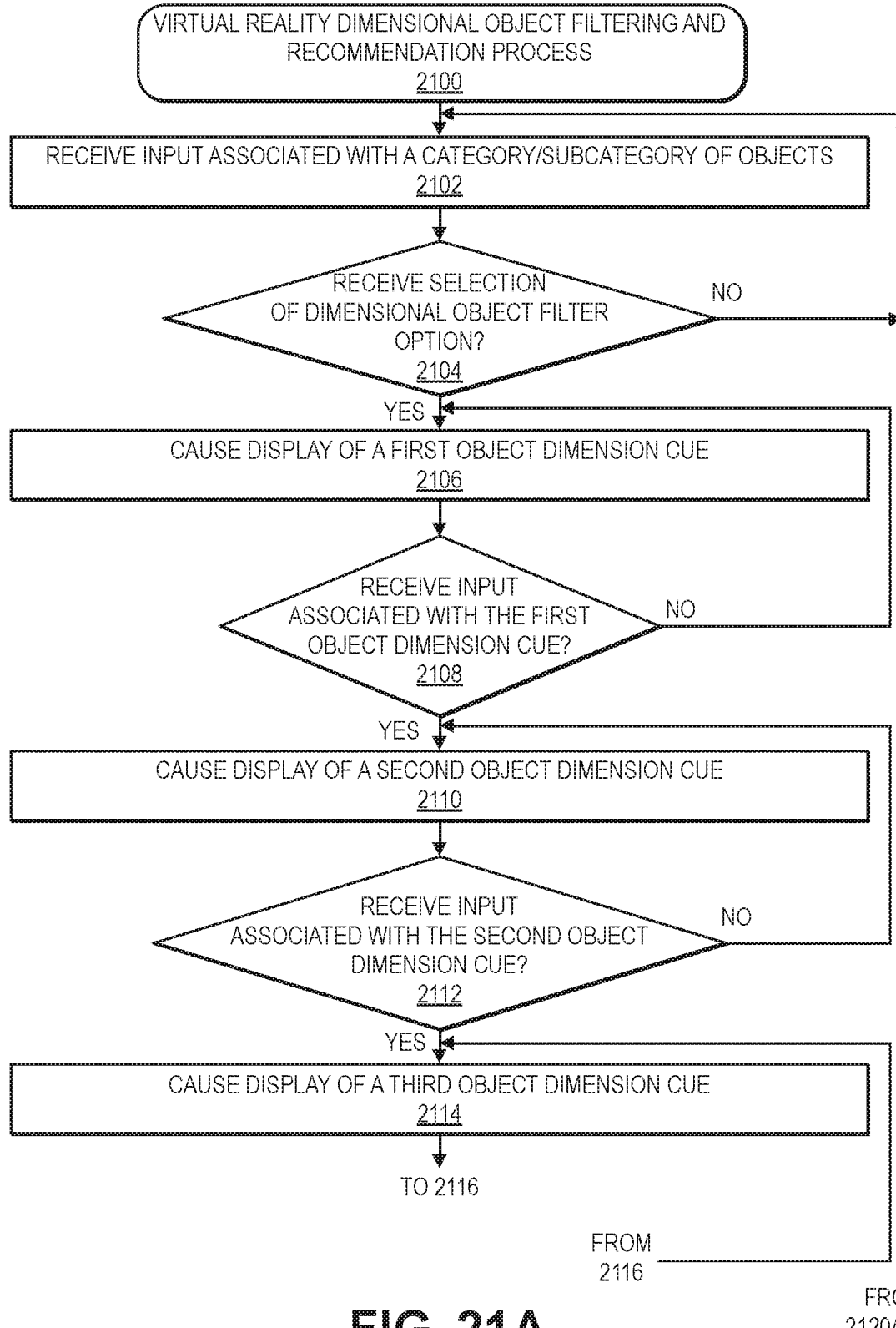
FIGS. 21A and 21B are a flow diagram illustrating an example virtual reality dimensional object filtering and recommendation process, in accordance with implementations of the present disclosure.
Figure 21B:
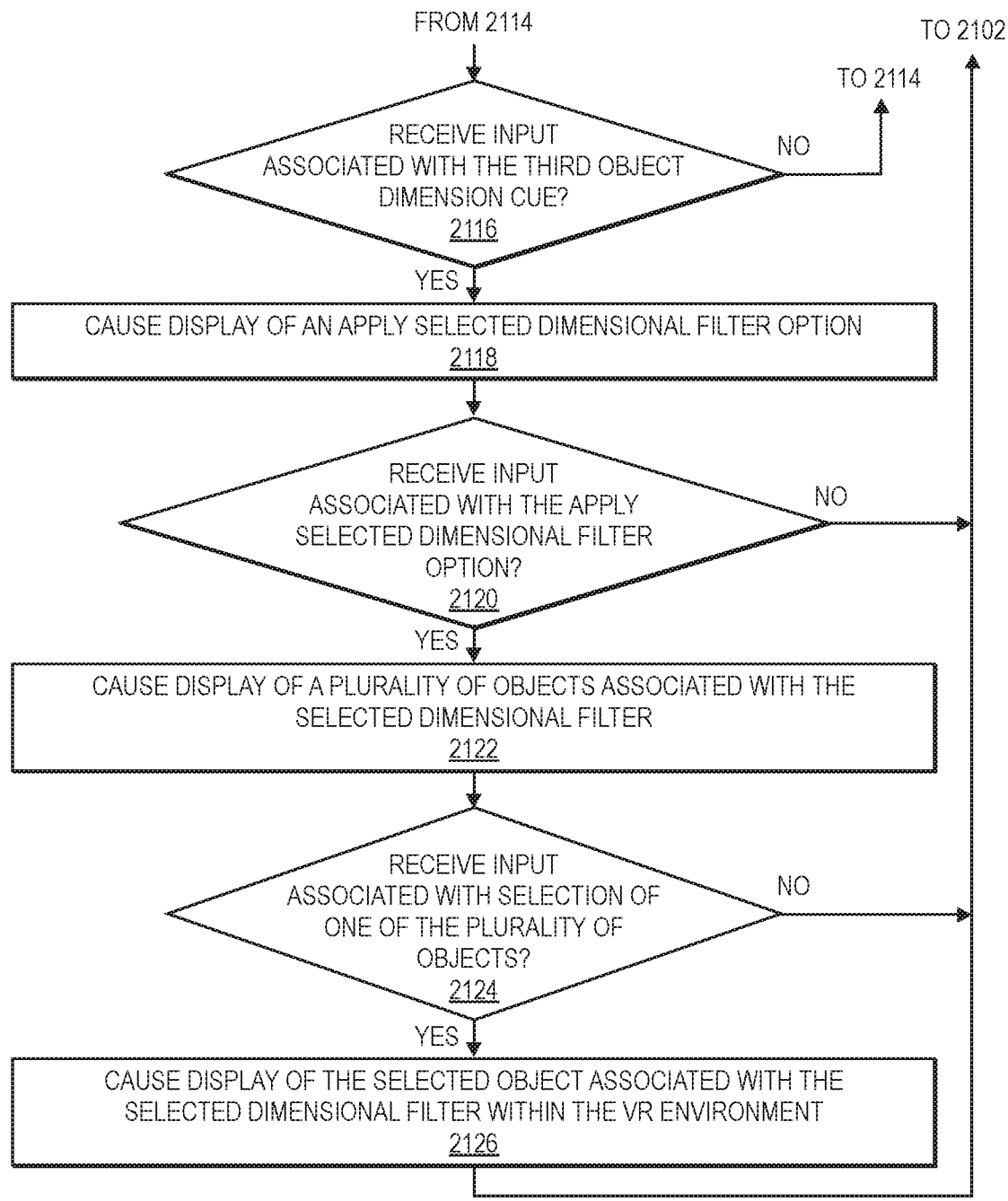

FIGS. 21A and 21B are a flow diagram 2100 illustrating an example virtual reality dimensional object filtering and recommendation process, in accordance with implementations of the present disclosure.

The process 2100 may begin by determining whether an input associated with a category or subcategory of objects is received, as at 2102. For example, via one or more browse or search user interfaces, a selection input associated with a type, category, or subcategory of objects may be received, such that a plurality of objects filtered for presentation to a user of a virtual reality environment may be associated with the selected type, category, or subcategory of objects. In other example embodiments, this step 2102 may be skipped or omitted, such that the dimensional object filtering and recommendation process may determine a plurality of objects without regard to any previously selected type, category, or subcategory of objects.

The process 2100 may continue by determining whether a selection of a dimensional object filter option is received, as at 2104. For example, a selection may comprise a selection input received via a controller, an eye gaze detection over a threshold amount of time received via a virtual reality device, a gesture detected via a virtual reality device, and/or a voice input received via an audio input device. The dimensional object filter option may comprise a selectable option or button presented via one or more user interfaces to initiate selection and determination of a dimensional object filter.

If a selection of a dimensional object filter option is received, the process 2100 may proceed by causing display of a first object dimension cue, as at 2106. For example, the first object dimension cue may be presented in association with a pointing device associated with a controller, and the first object dimension cue may be presented at an intersection between the pointing device and an environment surface or other surface, e.g., a floor surface, a wall surface, a ceiling surface, or a surface associated with an object or fixture. The first object dimension cue may also provide text or instructions to guide a user during selection and determination of a dimensional object filter.

The process 2100 may then continue to determine whether an input associated with the first object dimension cue is received, as at 2108. For example, the input may comprise a selection input received via a controller, an eye gaze detection over a threshold amount of time received via a virtual reality device, a gesture detected via a virtual reality device, and/or a voice input received via an audio input device. In addition, the input may comprise a selection of a location associated with an intersection between the pointing device of the controller and an environment surface or other surface, and the input may comprise a first dimensional point within the virtual reality environment.

Responsive to receiving an input associated with the first object dimension cue, the process 2100 may then proceed to cause display of a second object dimension cue, as at 2110. For example, the second object dimension cue may also be presented in association with a pointing device associated with a controller, and the second object dimension cue may also be presented at an intersection between the pointing device and an environment surface or other surface, e.g., a floor surface, a wall surface, a ceiling surface, or a surface associated with an object or fixture. The second object dimension cue may further provide text or instructions to guide a user during selection and determination of a dimensional object filter.

The process 2100 may continue with determining whether an input associated with the second object dimension cue is received, as at 2112. For example, the input may comprise a selection input received via a controller, an eye gaze detection over a threshold amount of time received via a virtual reality device, a gesture detected via a virtual reality device, and/or a voice input received via an audio input device. In addition, the input may comprise a selection of a location associated with an intersection between the pointing device of the controller and an environment surface or other surface, and the input may comprise a second dimensional point within the virtual reality environment.

Responsive to receiving an input associated with the second object dimension cue, the process 2100 may proceed with causing display of a third object dimension cue, as at 2114. For example, the third object dimension cue may also be presented in association with a pointing device associated with a controller, and the third object dimension cue may also be presented at an intersection between the pointing device and an environment surface or other surface, e.g., a floor surface, a wall surface, a ceiling surface, or a surface associated with an object or fixture. The third object dimension cue may further provide text or instructions to guide a user during selection and determination of a dimensional object filter.

The process 2100 may continue by determining whether an input associated with the third object dimension cue is received, as at 2116. For example, the input may comprise a selection input received via a controller, an eye gaze detection over a threshold amount of time received via a virtual reality device, a gesture detected via a virtual reality device, and/or a voice input received via an audio input device. In addition, the input may comprise a selection of a location associated with an intersection between the pointing device of the controller and an environment surface or other surface, and the input may comprise a third dimensional point within the virtual reality environment.

In some example embodiments, only two dimensional points may be received to determine a line, length, width, radius, diameter, other one-dimensional distance, circle, oval, square, rectangle, or other two-dimensional shape or area, and thereby determine a dimensional object filter associated with the two dimensional points. In other example embodiments, two or more dimensional points may be received to determine a circle, oval, triangle, square, rectangle, other two-dimensional shape or area, cylinder, triangular prism, rectangular prism, or other three-dimensional shape or volume, and thereby determine a dimensional object filter associated with the two or more dimensional points.

Responsive to receiving inputs associated with two or more dimensional points, the process 2100 may proceed by causing display of an apply selected dimensional filter option, as at 2118. For example, a menu may be presented including various options, such as selecting additional dimensional points to determine the dimensional object filter, canceling or restarting the determination of the dimensional object filter, or applying the selected dimensional object filter to identify a plurality of objects. Then, an input related to one of the various options may be received, which input may comprise a selection input received via a controller, an eye gaze detection over a threshold amount of time received via a virtual reality device, a gesture detected via a virtual reality device, and/or a voice input received via an audio input device.

Responsive to receiving a selection of the option to select additional dimensional points, the process 2100 may return to step 2114 to cause display of a third or additional object dimension cue. Responsive to receiving a selection of the option to cancel or restart the determination of the dimensional object filter, the process 2100 may return to any of steps 2102, 2104, or 2106 to cancel or restart the process.

Responsive to receiving a selection of the option to apply the selected dimensional filter, as at 2120, data associated with the selected dimensional filter may be sent or transferred from a virtual reality device (or client device) to a remote processor (or server computer). The server computer may process the data associated with the selected dimensional filter, and the server computer may compare or evaluate the data associated with the selected dimensional filter with data associated with a plurality of objects, e.g., dimensional data associated with a catalog of objects. Based on the comparison, the server computer may identify a plurality of objects having dimensional data that matches the data associated with the selected dimensional filter. Furthermore, the server computer may also receive additional data associated with the virtual reality environment, environment surfaces, fixtures, objects, and/or users of the virtual reality environment from the client device that may apply additional filters that affect or refine the identification of the plurality of objects that match the data associated with the selected dimensional filter. The server computer may then send or transfer to the client device the identified plurality of objects having dimensional data that matches the data associated with the selected dimensional filter, as well as any additional data or filters provided by the client device.

Responsive to receiving the plurality of objects from the server computer, the process 2100 may then continue to cause display of a plurality of objects associated with the selected dimensional filter, as at 2122. For example, the virtual reality device may cause presentation of the plurality of objects via one or more user interfaces to a user within the virtual reality environment.

The process 2100 may then proceed to determine whether an input associated with selection of one of the plurality of objects is received, as at 2124. For example, the input may comprise a selection input received via a controller, an eye gaze detection over a threshold amount of time received via a virtual reality device, a gesture detected via a virtual reality device, and/or a voice input received via an audio input device. In addition, the input may comprise a selection of one of the plurality of objects having dimensional data that matches the data associated with the selected dimensional filter.

Responsive to receiving an input associated with selection of one of the plurality of objects, the process 2100 may continue with causing display of the selected object associated with the selected dimensional filter within the virtual reality environment, as at 2126. For example, the selected object may be automatically placed, positioned, or oriented within the selected dimensional filter within the virtual reality environment. In some embodiments, the selected object may be rotated to a particular position and orientation within the selected dimensional filter based on various data associated with adjacent environment surfaces, adjacent surfaces of other objects or fixtures, and/or front, side, back, top, or bottom surfaces associated with the selected object.

In this manner, a selected object may be intuitively and efficiently placed, positioned, and oriented within the selected dimensional filter, thereby minimizing or reducing manipulations or interactions by a user to place the selected object in a desired position and orientation.

In example embodiments, the various commands, inputs, or instructions described herein may be explicit commands or inputs related to manipulations, selections, or other actions associated with user interfaces within a virtual reality environment. However, in other example embodiments, the various commands, inputs, or instructions described herein may be implied commands or inputs based on programming logic and/or various actions performed or initiated by a user or by an application within the virtual reality environment related to manipulations, selections, or other actions associated with user interfaces within the virtual reality environment. In further example embodiments, the various commands, inputs, or instructions may comprise voice inputs received via audio input devices, gesture inputs received via visual input devices, and/or eye gaze detection inputs received via visual input devices and/or virtual reality devices, headsets, or goggles.

Although the example embodiments are described herein in the context of virtual reality environments and virtual reality objects, in other example embodiments, the systems, methods, and processes described herein may be implemented in other environments having corresponding objects, such as augmented reality environments and augmented reality objects, mixed reality environments and mixed reality objects, extended reality environments and extended reality objects, or other similar environments and objects. For example, mixed reality environments or extended reality environments may comprise various combinations of augmented reality environments and objects and virtual reality environments and objects. Further, the various processes, functions, and operations described herein may be performed and executed by various types of virtual reality, augmented reality, and/or extended reality systems and devices, including Oculus systems and devices by Facebook®, Hololens systems and devices by Microsoft®, virtual reality systems and devices by Intel®, Daydream systems and devices by Google®, and other related or similar systems and devices.

Further, although the example embodiments described herein are generally related to manipulations and/or interactions of a single user within a virtual reality environment, in other example embodiments, a plurality of users may manipulate and/or interact with user interfaces and virtual reality objects concurrently as described herein within a virtual reality environment. For example, multiple users may be viewing, manipulating, and/or interacting concurrently with user interfaces and various objects within the same virtual reality environment. Each of the multiple users may manipulate and/or interact with user interfaces and various objects within the virtual reality environment independently from each other. In addition, the multiple users may hand off manipulation and/or interaction with user interfaces and objects between themselves. Further, the multiple users may communicate with each other within the environment, such as via audio communications using microphones and speakers and/or visual communications using gestures, motions, pointers, or other visual indications. Moreover, each of the multiple users may be presented with selectable menu options, selection elements, and/or other user interface elements independently from other users. However, various operations associated with such selectable menu options, selection elements, and/or other user interface elements may affect aspects of the environment as a whole, including other users within the environment, such that multiple users within the environment may interact collaboratively in the environment that is shared and viewable by the multiple users.

In further example embodiments, one of the multiple users within the same virtual reality environment may be designated as a primary user, and the primary user may have relatively more control over various interactions within the environment. For example, user interfaces as described herein may be presented or displayed for viewing by the primary user, e.g., positioned or oriented toward a user position of the primary user within the environment. Other secondary users within the environment may therefore need to modify their positions within the environment in order to view such user interfaces that are positioned or oriented toward the position of the primary user. This directed presentation toward the primary user may facilitate collaborative discussion and interaction between the multiple users within the environment, such that visual communications using gestures, motions, or pointers, as well as audio communications, may be understood by the multiple users with reference to a common reference point, i.e., the user interfaces positioned or oriented toward the primary user. In addition, various operations associated with selectable menu options, selection elements, and/or other user interface elements may require confirmation or acceptance by the primary user before modifying aspects of the environment as a whole, including for other users within the environment, such that multiple users within the environment may interact collaboratively in the environment that is shared and viewable by the multiple users, while still allowing primary control over changes and modifications by the primary user. Moreover, the designation of the primary user among multiple users within an environment may be transferred between the multiple users as desired.

In other example embodiments, one or more of the multiple users may view, manipulate, and/or interact with the environment using various computing devices that present visual data as two-dimensional visual data, instead of three-dimensional visual data, models, and objects of virtual reality environments. For example, some of the multiple users may view the environment using desktop computers, laptop computers, tablet computers, mobile computing devices, or other computing devices that may include two-dimensional display devices, audio input devices, audio output devices, and/or other input/output devices such as a keyboard, mouse, trackpad, stylus, pointer, touch-sensitive input device or surface, or other devices. Using such example computing devices, some of the multiple users, such as secondary users, may view and/or interact with two-dimensional visual data of the environment from various viewpoints. For example, a secondary user may view and/or interact with the environment from a viewpoint of the user, or primary user, interacting within the virtual reality environment using a headset, goggles, other wearable computing device, etc. In addition, a secondary user may view and/or interact with the environment from a viewpoint of one or more fixed or stationary viewpoints or cameras placed within the environment, e.g., an overhead view, a view from an elevated corner of the room, a view from a center of a wall of the room, or other views. Further, a secondary user may be able to pan, zoom, rotate, or otherwise modify such views from various viewpoints or cameras, as well as switch or move between views from various viewpoints or cameras. Moreover, a secondary user may view and/or interact with the environment from one or more viewpoints that may be stored and transmitted to the secondary user for viewing, e.g., based on a selection by the primary user.

In accordance with the example embodiments described herein, a plurality of users may efficiently and intuitively communicate and collaborate with each other within a virtual reality environment. In addition, a plurality of users within a virtual reality environment may simply and intuitively manipulate and/or interact with environment surfaces, fixtures, user interfaces, virtual reality objects, and/or other aspects of the virtual reality environments concurrently within the same virtual reality environment.

Figure 22:
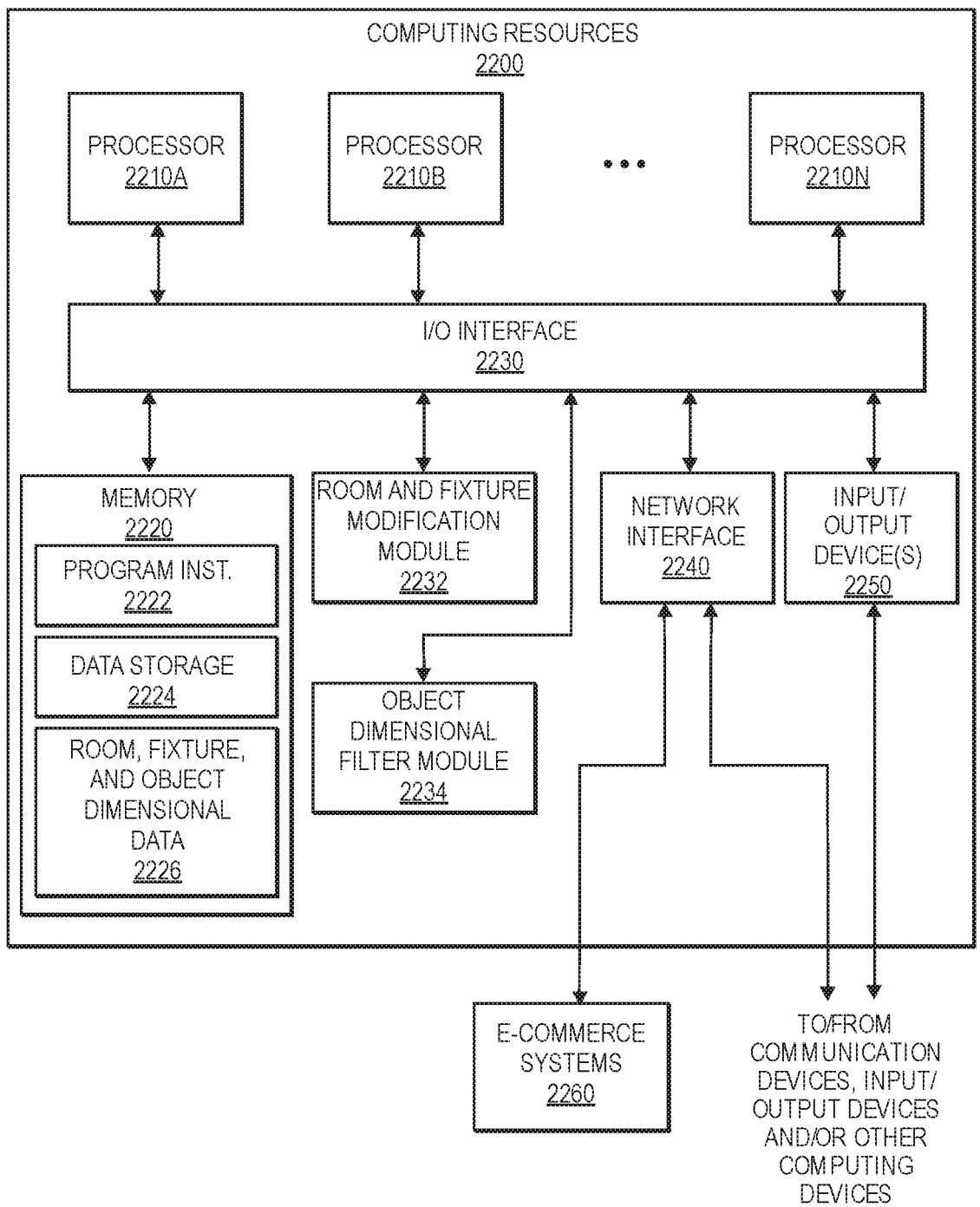
FIG. 22 is a block diagram illustrating various components of example computing resources associated with room building and dimensional object filtering for virtual reality environments, in accordance with implementations of the present disclosure.

FIG. 22 is a block diagram illustrating various components of example computing resources 2200 associated with room generation and modification, as well as dimensional object filtering and recommendation, within virtual reality environments, in accordance with implementations of the present disclosure.

In various examples, the block diagram may be illustrative of one or more aspects of computing resources 2200 that may be used to implement the various systems and processes discussed above. In the illustrated implementation, the computing resources 2200 may include one or more processors 2210, coupled to a non-transitory computer readable storage medium 2220 via an input/output (I/O) interface 2230. The computing resources 2200 may also include a room and fixture modification module 2232, an object dimensional filter module 2234, a network interface 2240, and one or more input/output devices 2250.

The computing resources 2200 may be included as part of a computing device or system, a display device or system, a virtual reality computing device or system, a smart or connected home device or system, other input/output devices or systems, and/or other computing systems, or combinations thereof. In various implementations, the computing resources 2200 may be a uniprocessor system including one processor 2210, or a multiprocessor system including several processors 2210A-2210N (e.g., two, four, eight, or another suitable number). The processor(s) 2210 may be any suitable processor capable of executing instructions. For example, in various implementations, the processor(s) 2210 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 2210 may commonly, but not necessarily, implement the same ISA.

The non-transitory computer readable storage medium 2220 may be configured to store executable instructions, data, virtual reality environment data, virtual reality device and/or controller data, user interface data, environment surface data, furniture, furnishing, fixture, and object data, dimensional filter data, object dimensional data, two-dimensional image or object data, three-dimensional model or object data, functions, commands, actions, or instructions data, inputs or selections data, user and user account data, and/or any other data items accessible by the processor(s) 2210. In various implementations, the non-transitory computer readable storage medium 2220 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable storage medium 2220 as program instructions 2222, data storage 2224 and room, fixture, and object dimensional data 2226, respectively. In other implementations, program instructions, data and/or room, fixture, and object dimensional data may be received, sent or stored upon different types of computer-accessible media, such as non-transitory media, or on similar media separate from the non-transitory computer readable storage medium 2220 or the computing resources 2200.

Generally speaking, a non-transitory, computer readable storage medium may include storage media or memory media such as magnetic or optical media, e.g., disk or CD/DVD-ROM, coupled to the computing resources 2200 via the I/O interface 2230. Program instructions and data stored via a non-transitory computer readable medium may be transmitted by transmission media or signals, such as electrical, electromagnetic, or digital signals, which may be conveyed via a communication medium such as a network and/or a wireless link, such as may be implemented via the network interface 2240.

In one implementation, the I/O interface 2230 may be configured to coordinate I/O traffic between the processor(s) 2210, the non-transitory computer readable storage medium 2220, and any peripheral devices, the network interface 2240 or other peripheral interfaces, such as input/output devices 2250. In some implementations, the I/O interface 2230 may perform any necessary protocol, timing or other data transformations to convert data signals from one component (e.g., non-transitory computer readable storage medium 2220) into a format suitable for use by another component (e.g., processor(s) 2210). In some implementations, the I/O interface 2230 may include support for devices attached through various types of peripheral buses, such as a variant of the Peripheral Component Interconnect (PCI) bus standard or the Universal Serial Bus (USB) standard, for example. In some implementations, the function of the I/O interface 2230 may be split into two or more separate components, such as a north bridge and a south bridge, for example. Also, in some implementations, some or all of the functionality of the I/O interface 2230, such as an interface to the non-transitory computer readable storage medium 2220, may be incorporated directly into the processor(s) 2210.

The room and fixture modification module 2232, potentially in combination with one or more processors 2210 and/or one or more remote processors or computers, may perform the various processes, functions, and operations described herein with respect to virtual reality environments, environment surfaces, environment surface positions, orientations, and dimensions, fixtures, fixture positions, orientations, and dimensions, modifiable aspects of environment surfaces and fixtures, virtual reality objects, user interfaces, user interactions with environment surfaces, fixtures, virtual reality objects, and/or user interfaces, and/or other aspects of virtual reality environments described herein.

The object dimensional filter module 2234, potentially in combination with one or more processors 2210 and/or one or more remote processors or computers, may perform the various processes, functions, and operations described herein with respect to virtual reality environments, virtual reality objects, dimensional object filters, object dimensional data, additional data associated with virtual reality environments, environment surfaces, fixtures, objects, and/or users, additional filter data, user interfaces, user interactions with virtual reality objects, dimensional object filters, additional filters, and/or user interfaces, and/or other aspects of virtual reality environments described herein.

The network interface 2240 may be configured to allow data to be exchanged between the computing resources 2200, other devices attached to a network, such as other computer systems, display devices, virtual reality devices, connected devices, smart home devices, audio/video systems or devices, social media systems or devices, search systems, sensors, other input/output elements, e-commerce computing systems 2260 including one or more object, product, and/or item catalog systems, purchase, lease, rent, and/or acquisition systems, and associated shipping and/or distribution systems, and/or other computing resources. For example, the network interface 2240 may enable wireless communication between the computing resources 2200 and one or more virtual reality devices and/or display or presentation devices that present virtual reality environments, objects, and/or user interfaces. In various implementations, the network interface 2240 may support communication via wireless general data networks, such as a Wi-Fi network. For example, the network interface 2240 may support communication via telecommunications networks such as cellular communication networks, satellite networks, and the like.

Input/output devices 2250 may, in some implementations, include one or more visual input/output devices, audio input/output devices, virtual reality devices and/or peripherals, headsets, goggles, wearable devices, controllers, joysticks, connected devices, smart home devices, input devices such as touchscreens, keyboards, mice, or remote controllers, image capture devices, audio sensors, temperature sensors, other sensors described herein, etc. Multiple input/output devices 2250 may be present and controlled by the computing resources 2200.

As shown in FIG. 22, the memory may include program instructions 2222 which may be configured to implement the example processes and/or sub-processes described above. The data storage 2224 and room, fixture, and object dimensional data 2226 may include various data stores for maintaining data items that may be provided for presentation, modification, interaction, and/or manipulation of virtual reality environments, user interfaces, environment surfaces, fixtures, furniture, furnishings, objects, object dimensional filters, two-dimensional images or objects, three-dimensional models or objects, and/or any other functions, operations, interactions, manipulations, or processes described herein.

In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Each process described herein may be implemented by the architectures described herein or by other architectures. The processes are illustrated as a collection of blocks in a logical flow. Some of the blocks represent operations that can be implemented in hardware, software, or a combination thereof. In the context of software, the blocks represent computer-executable instructions stored on one or more computer readable media that, when executed by one or more processors, perform the recited operations. Generally, computer-executable instructions include routines, programs, objects, components, data structures, and the like that perform particular functions or implement particular abstract data types.

The computer readable media may include non-transitory computer readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations, the computer readable media may include a transitory computer readable signal (in compressed or uncompressed form). Examples of computer readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the processes. Additionally, one or more of the operations may be considered optional and/or not utilized with other operations.

Those skilled in the art will appreciate that the computing resources 2200 are merely illustrative and are not intended to limit the scope of the present disclosure. In particular, the computing systems and devices may include any combination of hardware or software that can perform the indicated functions, including computers, network devices, internet appliances, PDAs, wireless phones, etc. The computing resources 2200 may also be connected to other devices that are not illustrated, or instead may operate as stand-alone systems. In addition, the functionality provided by the illustrated components may, in some implementations, be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the computing resources 2200. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the computing resources 2200 may be transmitted to the computing resources 2200 via transmission media or signals, such as electrical, electromagnetic, or digital signals, conveyed via a communication medium, such as a network and/or a wireless link. Various implementations may further include receiving, sending or storing instructions and/or data implemented in accordance with the foregoing description upon a computer-accessible medium. Accordingly, the techniques described herein may be practiced with other computing resource configurations.

Those skilled in the art will appreciate that, in some implementations, the functionality provided by the processes and systems discussed above may be provided in alternative ways, such as being split among more software modules or routines or consolidated into fewer modules or routines. Similarly, in some implementations, illustrated processes and systems may provide more or less functionality than is described, such as when other illustrated processes instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that, in other implementations, the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some implementations, illustrated data structures may store more or less information than is described, such as when other illustrated data structures instead lack or include such information respectively, or when the amount or types of information that is stored is altered. The various processes and systems as illustrated in the figures and described herein represent example implementations. The processes and systems may be implemented in software, hardware, or a combination thereof in other implementations. Similarly, the order of any process may be changed, and various elements may be added, reordered, combined, omitted, modified, etc., in other implementations.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, communications, virtual reality, mixed reality, extended reality, and/or augmented reality systems and processes should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the modules and engines may be implemented in firmware or hardware.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts shown in FIGS. 12A-12B and 21A-21B, orders in which such methods or processes are presented are not intended to be construed as any limitation on the claimed inventions, and any number of the method or process steps or boxes described herein can be omitted, reordered, or combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A computer-implemented method to generate a room in an extended reality environment, comprising:
    causing, via a display device, presentation of a floor, a plurality of walls, and a ceiling within the extended reality environment;
    causing, via the display device, presentation of a plurality of dimensions associated with the floor, the plurality of walls, and the ceiling;
    receiving, via an input device, a first input associated with moving a first wall of the plurality of walls, wherein the first input comprises selection of a first grab point positioned along the first wall, the first grab point having associated logic with respect to movement of the first wall;
    causing, via the display device, presentation of a first dimension of the plurality of dimensions that is associated with the first wall;
    causing, via the display device, stopping of presentation of other dimensions of the plurality of dimensions associated with the floor, the plurality of walls, and the ceiling;
    causing, via the display device, movement of the first wall responsive to the first input received via the input device based on the associated logic of the first grab point;
    causing, via the display device, modification of presentation of the first dimension that is associated with the first wall responsive to movement of the first wall;
    receiving, via the input device, a second input associated with moving the ceiling, wherein the second input comprises selection of a second grab point positioned along the ceiling, the second grab point having associated logic with respect to movement of the ceiling;
    causing, via the display device, presentation of a second dimension of the plurality of dimensions that is associated with the ceiling;
    causing, via the display device, stopping of presentation of other dimensions of the plurality of dimensions associated with the floor, the plurality of walls, and the ceiling;
    causing, via the display device, movement of the ceiling responsive to the second input received via the input device based on the associated logic of the second grab point; and
    causing, via the display device, modification of presentation of the second dimension that is associated with the ceiling responsive to movement of the ceiling.

2. The computer-implemented method of claim 1, wherein dimensions associated with the plurality of walls comprise widths of respective walls; and
    wherein dimensions associated with the ceiling comprise a height between the ceiling and the floor.

3. The computer-implemented method of claim 1, wherein the first grab point comprises at least one of a two-dimensional shape or a three-dimensional shape that is positioned substantially at a center of a first interface between the first wall and the floor; and
    wherein the second grab point comprises at least one of a two-dimensional shape or a three-dimensional shape that is positioned substantially at a center of a second interface between the ceiling and an adjacent wall.

4. The computer-implemented method of claim 1, further comprising:
receiving, via the input device, a third input associated with moving a fixture associated with the first wall, wherein the third input comprises selection of the fixture positioned along the first wall;
causing, via the display device, presentation of a plurality of dimensions that are associated with distances between the fixture and portions of the floor, the plurality of walls, and the ceiling;
causing, via the display device, movement of the fixture responsive to the third input received via the input device; and
causing, via the display device, modification of presentation of the plurality of dimensions that are associated with the distances between the fixture and portions of the floor, the plurality of walls, and the ceiling responsive to movement of the fixture.

5. The computer-implemented method of claim 4, further comprising:
receiving, via the input device, a fourth input associated with resizing a portion of the fixture associated with the first wall, wherein the fourth input comprises selection of a fourth grab point positioned along the portion of the fixture, the fourth grab point having associated logic with respect to movement of the portion of the fixture;
causing, via the display device, presentation of a third dimension of the plurality of dimensions that is associated with a size of the portion of the fixture;
causing, via the display device, presentation of a fourth dimension of the plurality of dimensions that is associated with a distance between the portion of the fixture and a portion of the floor, the plurality of walls, or the ceiling;
causing, via the display device, stopping of presentation of other dimensions of the plurality of dimensions associated with the distances between the fixture and portions of the floor, the plurality of walls, and the ceiling;
causing, via the display device, resizing of the portion of the fixture responsive to the fourth input received via the input device based on the associated logic of the fourth grab point; and
causing, via the display device, modification of presentation of the third and fourth dimensions that are associated with the portion of the fixture responsive to resizing of the portion of the fixture.

6. A computer-implemented method, comprising:
causing, via a display device, presentation of a plurality of surfaces that define boundaries of a space, the plurality of surfaces including a lower surface, a plurality of dividing surfaces, and an upper surface, and an associated plurality of dimensions within an extended reality environment;
receiving, via an input device, a first input associated with moving a first surface of the plurality of surfaces, wherein the first input comprises selection of a first grab point positioned along the first surface, the first grab point having associated rules with respect to movement of the first surface;
causing, via the display device, presentation of a first dimension associated with the first surface;
causing, via the display device, stopping of presentation of other dimensions of the plurality of dimensions associated with the plurality of surfaces;
causing, via the display device, movement of the first surface responsive to the first input received via the input device based at least in part on the associated rules of the first grab point; and
causing, via the display device, modification of presentation of the first dimension associated with the first surface responsive to movement of the first surface.

7. The computer-implemented method of claim 6, wherein the plurality of dimensions associated with the lower surface, the plurality of dividing surfaces, and the upper surface comprise lengths of portions of the lower surface, widths of portions of the lower surface, widths of respective dividing surfaces, heights of respective dividing surfaces, lengths of portions of the upper surface, widths of portions of the upper surface, or heights of portions of the upper surface.

8. The computer-implemented method of claim 6, wherein the first surface comprises a first wall of the plurality of dividing surfaces, and the first dimension associated with the first surface comprises a distance between the first wall and an opposing wall of the plurality of dividing surfaces.

9. The computer-implemented method of claim 6, wherein the first surface comprises the upper surface that is a ceiling, the lower surface comprises a floor, and the first dimension associated with the first surface comprises a distance between the ceiling and the floor.

10. The computer-implemented method of claim 6, wherein the first grab point comprises at least one of a two-dimensional shape or a three-dimensional shape that is positioned at an interface between the first surface and an adjacent surface of the plurality of surfaces.

11. The computer-implemented method of claim 10, wherein the first grab point comprises at least one of a circle, a semi-circle, an oval, a triangle, a rectangle, a cylinder, a semi-cylinder, an oval prism, a triangular prism, or a rectangular prism.

12. The computer-implemented method of claim 6, further comprising:
receiving, via the input device, a second input associated with placing a fixture in association with one of the plurality of surfaces;
causing, via the display device, presentation of a plurality of dimensions that are associated with distances between the fixture and portions of the plurality of surfaces; and
causing, via the display device, placement of the fixture responsive to the second input received via the input device based at least in part on associated rules with respect to placement of the fixture.

13. The computer-implemented method of claim 12, further comprising:
receiving, via the input device, a third input associated with moving the fixture associated with one of the plurality of surfaces, wherein the third input comprises selection of the fixture;
causing, via the display device, presentation of the plurality of dimensions that are associated with distances between the fixture and portions of the plurality of surfaces;
causing, via the display device, movement of the fixture responsive to the third input received via the input device based at least in part on associated rules with respect to movement of the fixture; and causing, via the display device, modification of presentation of at least some of the plurality of dimensions that are associated with the distances between the fixture and portions of the plurality of surfaces responsive to movement of the fixture.

14. The computer-implemented method of claim 12, further comprising:
receiving, via the input device, a fourth input associated with resizing a portion of the fixture associated with one of the plurality of surfaces, wherein the fourth input comprises selection of a second grab point positioned along the portion of the fixture, the second grab point having associated rules with respect to movement of the portion of the fixture;
causing, via the display device, presentation of a second dimension of the plurality of dimensions that is associated with a size of the portion of the fixture;
causing, via the display device, presentation of a third dimension of the plurality of dimensions that is associated with a distance between the portion of the fixture and a portion of the plurality of surfaces;
causing, via the display device, stopping of presentation of other dimensions of the plurality of dimensions associated with the distances between the fixture and portions of the plurality of surfaces;
causing, via the display device, resizing of the portion of the fixture responsive to the fourth input received via the input device based at least in part on the associated rules of the second grab point; and
causing, via the display device, modification of presentation of the second and third dimensions that are associated with the portion of the fixture responsive to resizing of the portion of the fixture.

15. The computer-implemented method of claim 12, further comprising:
causing, via the display device, movement of the fixture that is placed in association with the one of the plurality of surfaces, responsive to the first input associated with moving the first surface received via the input device.

16. The computer-implemented method of claim 15, wherein the fixture is moved to a position relative to at least one dimension of the one of the plurality of surfaces on which the fixture is placed.

17. The computer-implemented method of claim 12, wherein the fixture comprises at least one of a door, window, baseboard, fireplace, cased opening, stairs, column, island, countertop, shelf, built-in storage, ceiling rafter, vaulted ceiling, crown molding, electrical outlet, switch, appliance, vent, radiator, or lighting associated with the extended reality environment.

18. The computer-implemented method of claim 6, further comprising:
receiving, via the input device, a fifth input associated with modifying at least one aspect associated with one of the plurality of surfaces or an outside environment; and
causing, via the display device, modification of presentation of the one of the plurality of surfaces or the outside environment responsive to the fifth input.

19. The computer-implemented method of claim 18, wherein the at least one aspect associated with the one of the plurality of surfaces comprises at least one of a paint, a color, a material, or a texture; and
wherein the at least one aspect associated with the outside environment comprises at least one of a cube, a grid, a suburban scene, or an urban scene.

20. A system, comprising:
an input device;
a presentation device;
a processor communicatively coupled to the presentation device; and
a memory communicatively coupled to the processor, the memory storing program instructions that, when executed by the processor, cause the processor to at least:
present, via the presentation device, a plurality of surfaces including a floor, a plurality of walls, and a ceiling within an extended reality environment;
present, via the presentation device, a plurality of dimensions associated with the plurality of surfaces within the extended reality environment;
receive, via the input device, an input associated with moving a first surface of the plurality of surfaces, wherein the input comprises selection of a first grab point positioned along the first surface, the first grab point having associated rules with respect to movement of the first surface;
responsive to the input:
present, via the presentation device, a first dimension associated with the first surface;
stop presenting, via the presentation device, other dimensions of the plurality of dimensions associated with the plurality of surfaces;
present, via the presentation device, movement of the first surface responsive to the input based at least in part on the associated rules of the first grab point; and
present, via the presentation device, modification of the first dimension associated with the first surface responsive to movement of the first surface.

* * * * *